(12) United States Patent
Chebotareva et al.

(10) Patent No.: US 8,138,303 B2
(45) Date of Patent: Mar. 20, 2012

(54) POLYMERS

(75) Inventors: Natalia Chebotareva, Hagenthal le Bas (FR); Roger Prétôt, Basel (CH); Paul Adriaan Van der Schaaf, Hagenthal-le-Haut (FR); Thomas Schäfer, Liestal (CH); Beat Schmidhalter, Bubendorf (CH); Peter Murer, Oberwil (CH)

(73) Assignee: BASF SE, Ludwigshafen (DE)

( * ) Notice: Subject to any disclaimer, the term of this patent is extended or adjusted under 35 U.S.C. 154(b) by 525 days.

(21) Appl. No.: 12/223,139

(22) PCT Filed: Jan. 31, 2007

(86) PCT No.: PCT/EP2007/050934
§ 371 (c)(1),
(2), (4) Date: Jul. 23, 2008

(87) PCT Pub. No.: WO2007/090773
PCT Pub. Date: Aug. 16, 2007

(65) Prior Publication Data
US 2010/0249349 A1  Sep. 30, 2010

(30) Foreign Application Priority Data

Feb. 10, 2006 (EP) .................................. 06101542
Sep. 14, 2006 (EP) .................................. 06120616

(51) Int. Cl.
*C08G 73/06* (2006.01)
(52) U.S. Cl. ........ 528/423; 428/544; 428/620; 428/624; 428/655; 428/539.5
(58) Field of Classification Search .................. 528/423; 428/544, 620, 624, 655, 539.5
See application file for complete search history.

(56) References Cited

U.S. PATENT DOCUMENTS

| | | | |
|---|---|---|---|
| 5,457,564 A | 10/1995 | Leventis et al. | 359/271 |
| 2005/0106418 A1 | 5/2005 | Kim et al. | 428/690 |
| 2005/0156516 A1 | 7/2005 | Wang et al. | 313/504 |
| 2007/0043204 A1* | 2/2007 | Rogers et al. | 528/314 |
| 2007/0060736 A1 | 3/2007 | Becker et al. | 528/86 |
| 2007/0120112 A1* | 5/2007 | Morita et al. | 257/40 |
| 2007/0205714 A1* | 9/2007 | Busing et al. | 313/504 |
| 2009/0105447 A1* | 4/2009 | Schafer et al. | 528/403 |

FOREIGN PATENT DOCUMENTS

| | | |
|---|---|---|
| EP | 0 295 676 | 12/1988 |
| JP | 61174225 * | 8/1986 |
| WO | 94/23333 | 10/1994 |
| WO | WO 2004030029 * | 3/2004 |
| WO | WO 2004099285 * | 11/2004 |
| WO | 2005/014689 | 2/2005 |
| WO | 2005/030838 | 4/2005 |
| WO | WO 2005076295 * | 8/2005 |
| WO | 2005/104264 | 11/2005 |
| WO | WO 2007101820 * | 7/2007 |

OTHER PUBLICATIONS

Nurulla et al. (Poly. Bulletin, 44, 231-238, 2000).*
Ashraf et al. (J. of Poly. Sci.: Part A Polymer Chemistry, 44(24), 6952-6961, 2006).*
Mikroyannidis et al. (J. of Poly. Sci.: Part A, Polymer Chemistry, 35(7),1303-1311, 1997).*
Bender et al. (J. of Poly. Sci.: Part A, Polymer Chem., (1998), 36(9), 1349-1353).*
Chen et al. (Polymer International (1997), 44(1), 83-87).*
Wang et al. (Macromolecules (1997), 30(4), 764-769).*
Imai et al. (Macromolecules (1973), 6(2), 158-162).*
Kathirgamanathan et al. (J. Electroanal. Chem., 354, 305-309, 1993).*
English Language abstract of WO 2005/030828 from the esp@cenet web site printed on Aug. 19, 2008.
English Language abstract of EP 0 295 676 from the esp@cenet web site printed on Jul. 24, 2008.

* cited by examiner

*Primary Examiner* — RAndy Gulakowski
*Assistant Examiner* — Shane Fang
(74) *Attorney, Agent, or Firm* — Qi Zhuo

(57) ABSTRACT

The present invention relates to novel polymers comprising a repeating unit of the formula (I) and their use in electronic devices. The polymers according to the invention have excellent solubility in organic solvents and excellent film-forming properties. In addition, high charge carrier mobilities and high stability of the emission color can be observed, if the polymers according to the invention are used in organic light emitting diodes (OLEDs).

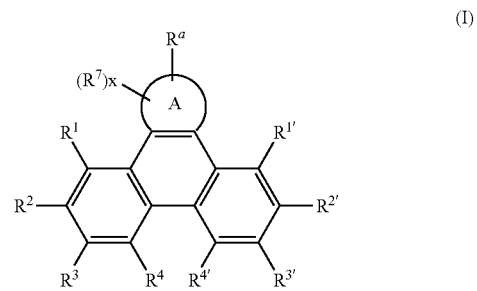

(I)

10 Claims, No Drawings

POLYMERS

The present invention relates to novel polymers comprising a repeating unit of the formula (I) and their use in electronic devices. The polymers according to the invention may have excellent solubility in organic solvents and excellent film-forming properties. In addition, high charge carrier mobilities and high stability of the emission color can be observed, if the polymers according to the invention are used in organic light emitting diodes (OLEDs).

JP05273618 discloses phenanthroimidazole compounds which where used as antiinflammants. WO04016086 relates to the preparation of 2,4,5-trisubstituted imidazoles and their use as antibacterial and/or antifungal agents. Among others the following compound is explicitly mentioned in WO04016086:

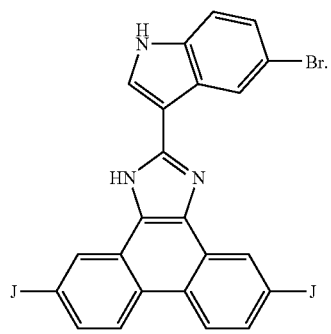

U.S. Pat. No. 4,215,135 relates to 2-substituted-1H-phenanthro[9,10-d]imidazoles, which are useful as antiinflammatory agents. Among others the following compound is explicitly mentioned in U.S. Pat. No. 4,215,135:

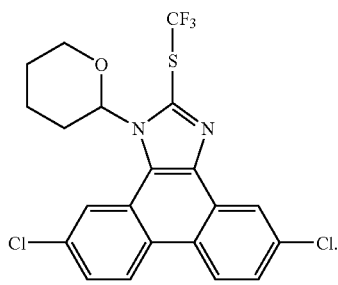

U.S. Pat. No. 3,635,544 relates to a photochromic polymer matrix, comprising the following compound

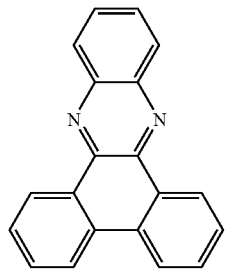

as light absorbing compound. JP09188874, JP09013025, JP07026255, JP06207169, US2004076853, WO2004043937, U.S. Pat. No. 6,713,781, WO2004006352, WO2003058667 and WO2004006355 disclose phenanthrene-fused or phenanthroline-fused phenazines and their use in EL devices.

US2004209117 relates to an EL device, comprising an azole compound of the formula

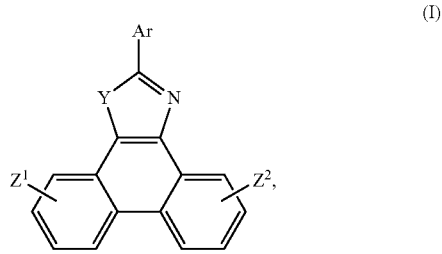

wherein Y is an atom or a group selected from the group consisting of O, S, and —N(R)—, wherein R is a hydrocarbyl group of from 1 to about 30 carbons; $Z^1$ and $Z^2$ are each a substituent selected from the group consisting of hydrogen, an alkyl group of from 1 to about 25 carbon atoms, an aryl group of about 6 to about 30 carbon atoms, an alkoxy group of from 1 to about 25 carbon atoms, a halogen, and a cyano group; and Ar is an aromatic component. JP2004161892, JP2002050473 and JP2001023777 disclose phenanthroimidazol compounds and their use in EL devices.

WO04/030029 relates to a photovoltaic EL cell, comprising polymers containing groups:

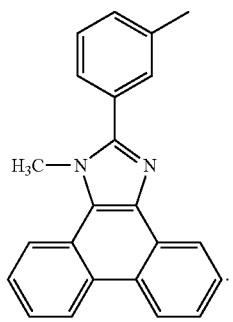

WO03/020790 relates to conjugated polymers comprising spirobifluorene units. The polymers can comprise repeating units derived from the following compound

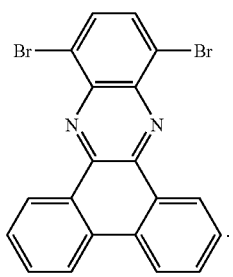

EP0757035A1 relates to phenanthrylenediamine derivatives represented by the general formula

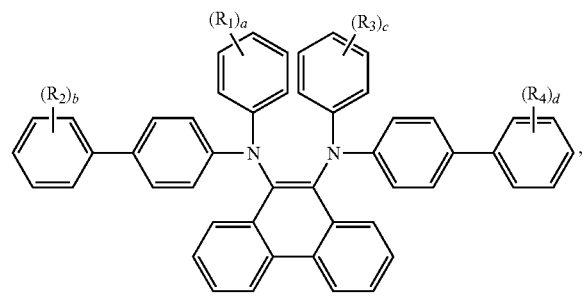

which are excellent in the electric charge transferring capability, the compatibility with a binding resin and the stability, thereby providing a photosensitive material which is highly sensitive and excellent in the durability.

US2001008711 relates to an organic light-emitting device comprising a light-emitting layer or a plurality of organic compound thin layers including a light-emitting layer formed between a pair of electrodes, wherein at least one layer comprises at least one kind of compound represented by the following formula $NR_{11}R_{12}R_{13}$: wherein $R_{11}$, $R_{12}$ and $R_{13}$ each represents a group having a cyclocondensed polycyclic hydrocarbon structure in which three or more rings are cyclocondensed; and a novel cyclocondensed polycyclic hydrocarbon compound.

US2004/0028944 relates to organic electroluminescent devices comprising a triarylamine derivative represented by the general formula $N(Ar_1)(Ar_2)(Ar_3)$, wherein $Ar_1$ to $Ar_3$ are substituted or unsubstituted aryl groups and at least one of $Ar_1$ to $Ar_3$ is a 9-phenanthryl group.

EP1440959A1 relates to a novel soluble compound of formula

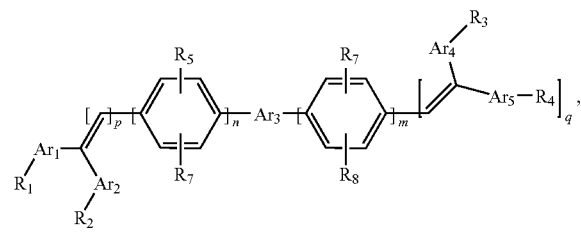

wherein $Ar_3$ represents a substituted or unsubstituted anthracenediyl group, or a substituted or unsubstituted fluorendiyl group and to its use in an electroluminescent device.

WO03/064373 relates to triarylamine derivatives and the use thereof as hole transport material in organic electroluminescent and electrophotographic devices.

WO04/005288 relates to charge transport compositions comprising a phenanthroline derivative having formula

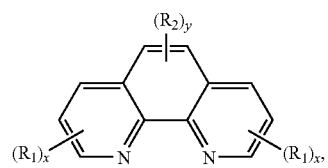

wherein: $R_1$ and $R_2$ are the same or different at each occurrence and are selected from H, F, Cl, Br, alkyl, heteroalkyl, alkenyl, alkynyl, aryl, heteroaryl, $C_nH_aF_b$, $OC_nH_aF_b$, $C_6H_cF_d$, and $OC_6H_cF_d$; a, b, c, and d are 0 or an integer such that a+b=2n+1, and c+d=5, n is an integer; x is 0 or an integer from 1 through 3; y is 0, 1 or 2; with the proviso that there is at least one substituent on an aromatic group selected from F, $C_nH_aF_b$, $OC_nH_aF_b$, $C_gH_cF_d$, and $OC_6H_cF_a$.

WO05/014689 relates to conjugated polymers containing dihydrophenanthrene units of formula

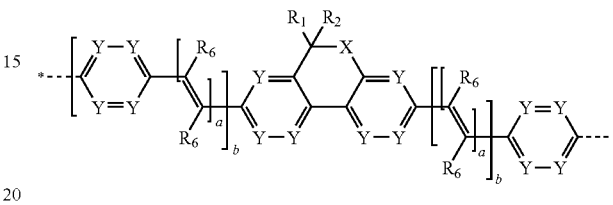

and their use in polymer organic light emitting diodes.

US2005/0156516 relates to soluble poly(aryl-oxadiazole) conjugated polymers comprising at least about 20 repeat units, which may independently be the same or different, the repeat units represented by formula:

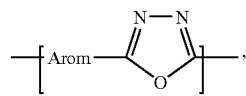

wherein Arom is a moiety selected from Formulae (1) and (2):

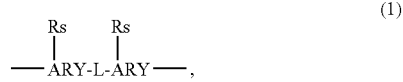

(1)

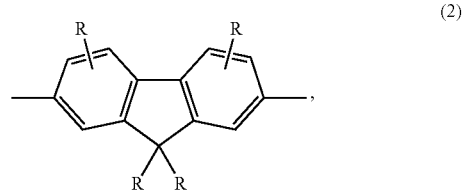

(2)

wherein each ARY, which may independently be the same or different, is selected from an aromatic hydrocarbon ring and a $C_{2+}$ aromatic heterocyclic ring, wherein the aromatic hydrocarbon ring is selected from fluorenyl, terphenyl, tetraphenyl, pyrenyl, and phenanthryl, and the $C_{2+}$ heterocyclic ring is selected from pyrrolyl, furanyl, imidazolyl, triazolyl, isoxazolyl, oxadiazolyl, furazanyl, pyridazinyl, pyrimidyl, pyrazinyl, triazinyl, tetrazinyl, benzofuranyl, benzothiophenyl, indolyl, isoindazolyl, benzimidazolyl, benzotriazolyl, benzoxazolyl, quinolyl, isoquinolyl, cinnolyl, quinazolyl, naphthyridyl, phthalazyl, phentriazyl, benzotetrazyl, carbazolyl, dibenzofuranyl, dibenzothiophenyl, acridyl, and phenazyl; wherein L is selected from an ethynyl group and a substituted or unsubstituted ethenyl group; wherein each R, which may independently be the same or different and which may be unsubstituted or substituted by a substituent selected from cyano, nitro, and halogen, is selected from the group consisting of hydrogen, aryl, alkylaryl, arylalkyl, and alkyl, wherein none or one or more —CH$_2$— units of the alkyl are replaced by a moiety selected from —O—, —S—, $C_{2-14}$aryl, and —NR'— wherein each R', which may independently be the same or different, comprises a $C_{1-100}$ saturated acyclic hydrocarbyl group; and wherein each x is the number of hydrogen atoms of Ary capable of substitution by R.

WO2005030828 relates to conjugated polymers containing structural units according to formula

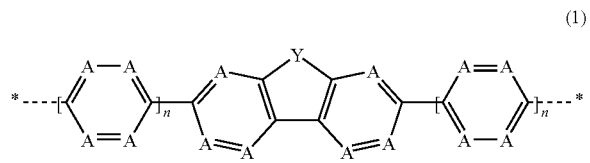

(1)

and formula

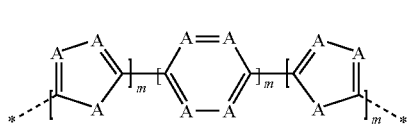

(2)

and their use in a polymer organic light-emitting diode (PLED).

US20050106418 relates to cyclopentaphenanthrene-based compounds and their use in organoelectroluminescent devices.

WO05/104264 relates to polymers comprising structural units of formula

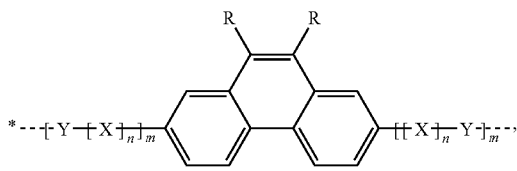

wherein both groups R among others can form together a mono- or polycyclic, aliphatic ring system.

WO2006/097419, which enjoys an earlier priority date than the present invention, but has been published after the priority date of the present invention, relates to polymers comprising a repeating unit(s) of the formula

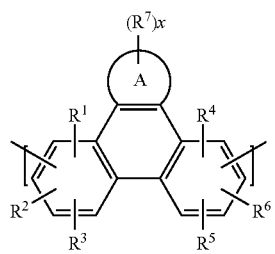

and their use in EL devices.

There are a number of challenges faced with the introduction of organic EL displays when their performance is compared with existing technologies. Obtaining the exact color coordinates required by specific guidelines (i.e. NTSC) has been problematic. The operational lifetime of the EL device is still lower when contrasted to the existing inorganic technology for cathode ray tubes (CRTs) and liquid crystal displays (LCDs). In addition, producing a device with a pure blue, green, red color and a long lifetime is one of the greatest problems for this industry.

Accordingly, it is the object of the present invention to provide novel materials, which, when incorporated in electro-optical devices, cause significant advantages in color purity, device efficiency and/or operational lifetime.

Said object is solved by the polymers of the present invention comprising repeating units of formula I. Organic light emitting devices (OLEDs) based on the polymers of the present invention, can show significant advantages in color purity, device efficiency and/or operational lifetime. In addition, the polymers can have good solubility characteristics and relatively high glass transition temperatures, which facilitates their fabrication into coatings and thin films, that are thermally and mechanically stable and relatively free of defects.

Hence, the present invention relates to polymers comprising repeating unit(s) of the formula

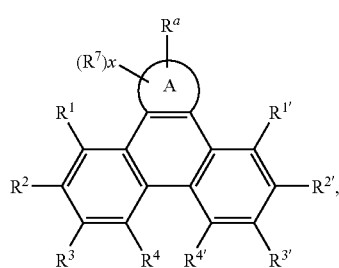

(I)

wherein A is a 5-, 6-, or 7-membered heteroaromatic ring, containing at least one heteroatom selected from nitrogen, oxygen and sulfur, especially one nitrogen atom and at least one further heteroatom selected from nitrogen, substituted nitrogen, oxygen and sulfur, $R^a$, $R^1$, $R^2$, $R^3$, $R^4$, $R^{1'}$, $R^{2'}$, $R^{3'}$ and $R^{4'}$ are independently of each other hydrogen, halogen, especially fluorine, or an organic substituent, or $R^a$, $R^1$, $R^2$, $R^3$, $R^4$, $R^{1'}$, $R^{2'}$, $R^{3'}$ and $R^{4'}$, if possible, together form an aromatic, or heteroaromatic ring, or ring system, which can optionally be substituted, $R^7$ is halogen, especially fluorine, or an organic substituent, wherein two or more substituents $R^7$ in the same molecule may have different meanings, or can form together an aromatic, or heteroaromatic ring, or ring system, wherein at least one of $R^a$, $R^1$, $R^2$, $R^3$, $R^4$, $R^{1'}$, $R^{2'}$, $R^{3'}$ and $R^{4'}$ is a group $R^{10}$, wherein $R^{10}$ is a group -$(Sp)_{x1}$-[PG']<, wherein Sp is a spacer unit, PG' is a group derived from a polymerisable group, x1 is 0, or 1, and x is 0, or an integer of 1 to 4.

A is a 5-, 6-, or 7-membered heteroaromatic ring, containing at least one heteroatom selected from nitrogen, oxygen and sulphur, which can be substituted and/or can be part of a fused aromatic or heteroaromatic ring system. Non-limiting examples of A are:

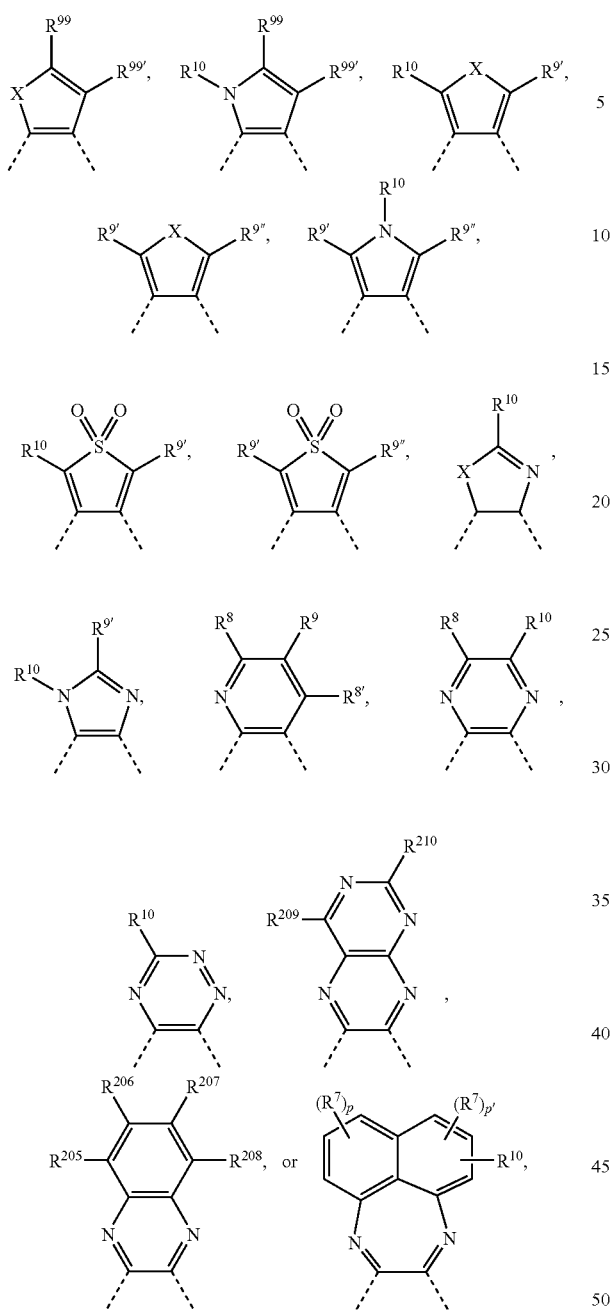

Preferably, the polymers of the present invention comprise a repeating unit(s) of the formula

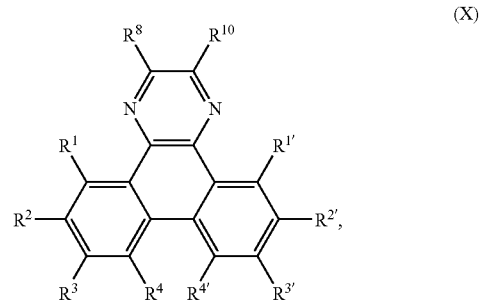

(X)

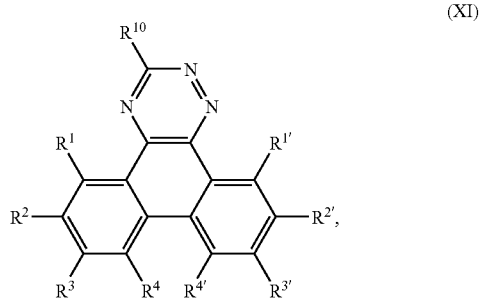

(XI)

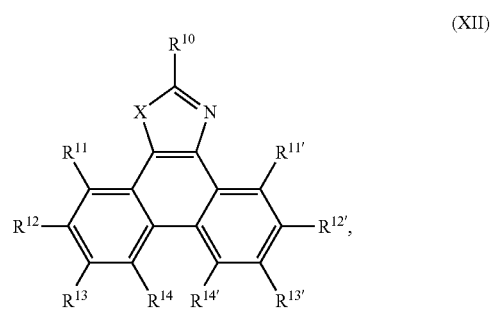

(XII)

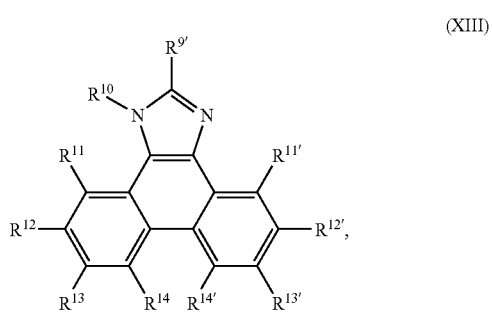

(XIII)

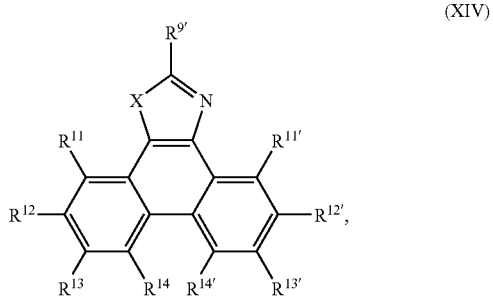

(XIV)

wherein $R^7$ has the meaning of $R^8$, $R^{8'}$ has the meaning of $R^8$, X is O, S, N—$R^{17}$, wherein $R^{205}$, $R^{206}$, $R^{207}$, $R^{208}$, $R^{209}$, $R^{210}$, $R^8$, $R^9$, $R^{9'}$, $R^{9''}$, $R^{99}$, $R^{99'}$, $R^{10}$ and $R^{17}$ are as defined below, p' is 0, 1, or 2 and the dotted line - - -indicates the bonding to the benzene ring.

Preferably, A is one of the above 5-, 6-, or 7-membered heteroaromatic rings, containing one nitrogen atom and at least one further heteroatom selected from nitrogen, oxygen and sulphur. If the heteroatom is nitrogen, it can be a group =N—, or —NR—, especially —N—$R^{17}$, or —N$R^{10}$—, wherein R is an organic substituent, $R^{17}$ and $R^{10}$ are as defined below.

The polymers of the present invention should have a glass transition temperature above 100° C.

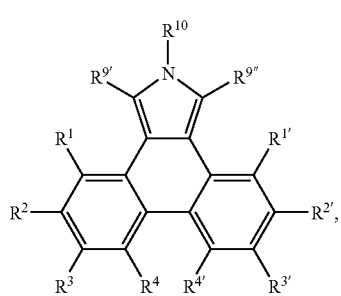
(XV)

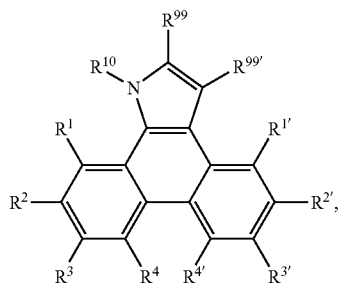
(XVI)

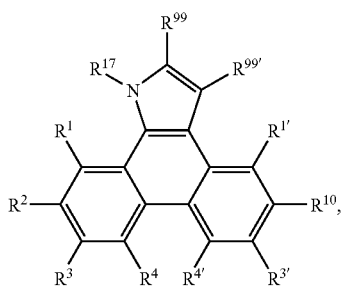
(XVII)

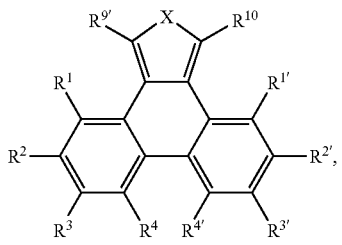
(XVIII)

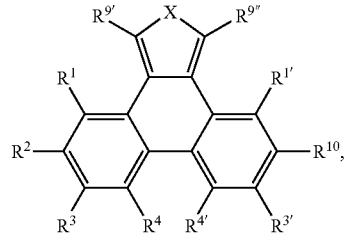
(XIX)

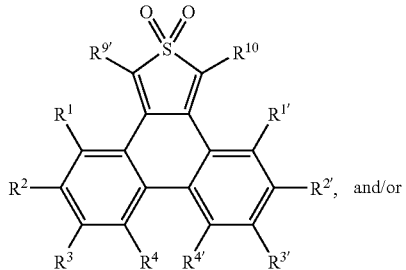
(XX)

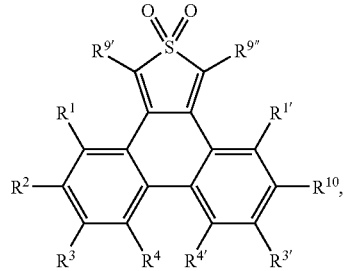
(XXI)

wherein $R^1$ and $R^{1'}$ are independently of each other hydrogen, halogen, $C_1$-$C_{18}$alkyl, $C_1$-$C_{18}$alkyl which is substituted by E and/or interrupted by D, $C_1$-$C_{18}$perfluoroalkyl, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, CN, or —CO—$R^{28}$, $R^2$, $R^3$, $R^4$, $R^{2'}$, $R^{3'}$ and $R^{4'}$, are independently of each other H, halogen, $C_1$-$C_{18}$alkyl, $C_1$-$C_{18}$alkyl which is substituted by E and/or interrupted by D, $C_1$-$C_{18}$perfluoroalkyl, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, $C_7$-$C_{25}$aralkyl, CN, or —CO—$R^{28}$, $R^8$ is H, $C_1$-$C_{18}$alkyl, $C_1$-$C_{18}$alkyl which is substituted by E and/or interrupted by D, $C_1$-$C_{18}$perfluoroalkyl, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, $C_7$-$C_{25}$aralkyl, CN, or —CO—$R^{28}$, $R^{9'}$, $R^{9''}$, $R^{99}$ and $R^{99'}$ is H, $C_1$-$C_{18}$alkyl, $C_1$-$C_{18}$alkyl which is substituted by E and/or interrupted by D, $C_1$-$C_{18}$perfluoroalkyl, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_{1}$-$_{18}$alkoxy, $C_1$-$C_{18}$alkoxy which is substituted by E and/or interrupted by D, $C_7$-$C_{25}$aralkyl, or —CO—$R^{28}$, $R^{10}$ is a group -(Sp)$_{x1}$-[PG']<, wherein Sp is a spacer unit, PG' is a group derived from a polymerisable group, and x1 is 0, or 1, or $R^8$ and $R^{10}$ together form a group

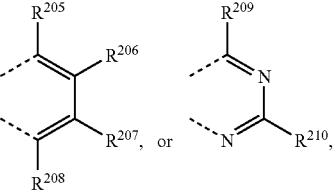

wherein one of the substituents $R^{205}$, $R^{206}$, $R^{207}$ and $R^{208}$, and one of the substituents $R^{208}$ and $R^{210}$ is a group $R^{10}$ and the other substituents are independently of each other H, $C_1$-$C_{18}$alkyl, $C_1$-$C_{18}$alkyl which is substituted by E and/or interrupted by D, $C_1$-$C_{18}$alkoxy, or $C_1$-$C_{18}$alkoxy which is substituted by E and/or interrupted by D, $R^{11}$ and $R^{11'}$ are independently of each other hydrogen, halogen, especially fluorine, $C_1$-$C_{18}$alkyl, $C_1$-$C_{18}$alkyl which is substituted by E and/or interrupted by D, $C_1$-$C_{18}$perfluoroalkyl, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, CN, or —CO—$R^{28}$, $R^{12}$, $R^{13}$, $R^{14}$, $R^{12'}$, $R^{13'}$ and $R^{14'}$ are independently of each other H, halogen, especially fluorine, $C_1$-$C_{18}$alkyl, $C_1$-$C_{18}$alkyl which is substituted by E and/or interrupted by D, $C_1$-$C_{18}$perfluoroalkyl, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, $C_7$-$C_{25}$aralkyl, CN or —CO—$R^{28}$, X is O, S, or $NR^{17}$, wherein $R^{17}$ is $C_1$-$C_{18}$alkyl, $C_1$-$C_{18}$alkyl which is substituted by E and/or interrupted by D, $C_1$-$C_{18}$perfluoroalkyl, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_7$-$C_{25}$aralkyl, or —CO—$R^{28}$;

or two substituents $R^1$, $R^2$, $R^3$ and $R^4$; $R^{1'}$, $R^{2'}$, $R^{3'}$ and $R^{4'}$; $R^{11}$, $R^{12}$, $R^{13}$ and $R^{14}$; $R^{11'}$, $R^{12'}$, $R^{13'}$ and $R^{14'}$, which are adjacent to each other, together form a group

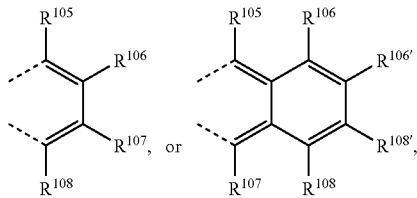

or two substituents $R^{99}$ and $R^{99'}$, which are adjacent to each other, together form a group

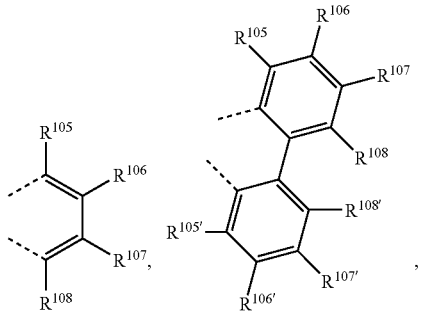

or two substituents $R^4$ and $R^{4'}$, and/or $R^{14}$ and $R^{14'}$, which are adjacent to each other, together form a group

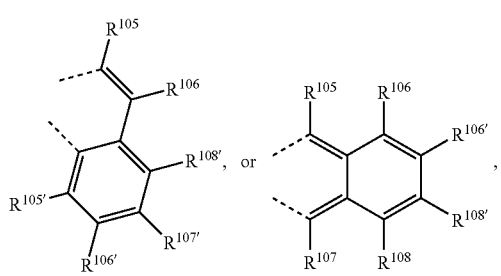

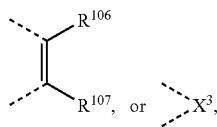

wherein $X^3$ is O, S, $C(R^{119})(R^{120})$, or $NR^{17}$, wherein $R^{17}$ is as defined above, $R^{105}$, $R^{106}$, $R^{107}$, $R^{108}$, $R^{105'}$, $R^{106'}$, $R^{107'}$ and $R^{108'}$ are independently of each other H, $C_1$-$C_{18}$alkyl, $C_1$-$C_{18}$alkyl which is substituted by E and/or interrupted by D, $C_1$-$C_{18}$alkoxy, or $C_1$-$C_{18}$alkoxy which is substituted by E and/or interrupted by D, $R^{119}$ and $R^{120}$ are independently of each other H, $C_1$-$C_{18}$alkyl, $C_1$-$C_{18}$alkyl which is substituted by E and/or interrupted by D, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, or $C_7$-$C_{25}$aralkyl, or $R^{119}$ and $R^{120}$ together form a five or six membered ring, which optionally can be substituted by $C_1$-$C_{18}$alkyl, $C_1$-$C_{18}$alkyl which is substituted by E and/or interrupted by D, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, $C_7$-$C_{25}$aralkyl, or —C(=O)—$R^{127}$, or $R^{119}$ and $R^{120}$ together form a group of formula =$CR^{121}R^{122}$, wherein $R^{121}$ and $R^{122}$ are independently of each other H, $C_1$-$C_{18}$alkyl, $C_1$-$C_{18}$alkyl which is substituted by E and/or interrupted by D, $C_6$-$C_{24}$aryl, $C_6$-$C_{24}$aryl which is substituted by G, or $C_2$-$C_{20}$heteroaryl, or $C_2$-$C_{20}$heteroaryl which is substituted by G, $R^{127}$ is H; $C_6$-$C_{18}$aryl; $C_6$-$C_{18}$aryl which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—, D is —CO—; —COO—; —S—; —SO—; —$SO_2$—; —O—; —$NR^{25}$—; —$SiR^{30}R^{31}$—; —$POR^{32}$—; —$CR^{23}$=$CR^{24}$—; or —C≡C—; and E is —$OR^{29}$; —$SR^{29}$; —$NR^{25}R^{26}$; —$COR^{28}$; —$COOR^{27}$; —$CONR^{25}R^{26}$; —CN; or halogen; G is E, $C_1$-$C_{18}$alkyl, $C_1$-$C_{18}$alkyl which is interrupted by D, $C_1$-$C_{18}$perfluoroalkyl, or $C_1$-$C_{18}$alkoxy which is substituted by E and/or interrupted by D, wherein $R^{23}$, $R^{24}$, $R^{25}$ and $R^{26}$ are independently of each other H; $C_6$-$C_{18}$aryl; $C_6$-$C_{18}$aryl which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—; or $R^{25}$ and $R^{26}$ together form a five or six membered ring, in particular

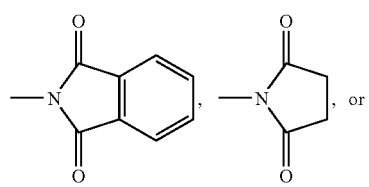

-continued (structure: N-methylmaleimide)

$R^{27}$ and $R^{28}$ are independently of each other H; $C_6$-$C_{18}$aryl; $C_6$-$C_{18}$aryl which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—, $R^{29}$ is H; $C_6$-$C_{18}$aryl; $C_6$-$C_{18}$aryl, which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—, $R^{30}$ and $R^{31}$ are independently of each other $C_1$-$C_{18}$alkyl, $C_6$-$C_{18}$aryl, or $C_6$-$C_{18}$aryl, which is substituted by $C_1$-$C_{18}$alkyl, and $R^{32}$ is $C_1$-$C_{18}$alkyl, $C_6$-$C_{18}$aryl, or $C_6$-$C_{18}$aryl, which is substituted by $C_1$-$C_{18}$alkyl, or $R^{9'}$, $R^{12}$, $R^{13}$, $R^{14}$, $R^{12'}$, $R^{13'}$ and $R^{14'}$ are a group -(Sp)$_{x1}$-HEI, wherein Sp is a spacer unit, HEI is a group (HEI$^I$), which increases the hole-injection or hole-transport properties of the polymers; or a group (HEI$^{II}$), which increases the electron-injection or electron-transport properties of the polymers, x1 is 0, or 1, with the proviso that in case of the compound of the formula XIV at least one of the substituents $R^{12}$, $R^{13}$, $R^{12'}$ and $R^{13'}$ is a group $R^{10}$.

$R^{9'}$, $R^{12}$, $R^{13}$, $R^{14}$, $R^{12'}$, $R^{13'}$ and $R^{14'}$ can be a group -(Sp)$_{x1}$-HEI, wherein Sp, HEI and x1 are as defined above.

Preferred HEI$^I$, which increase the hole-injection or hole-transport properties of the polymers, are:

(IIa) (structure with $A^1$, $A^2$, $A^{1'}$ on N)

(IIb) (structure with $(R^{41})_n$)

(IIc) (biphenyl diamine structure with $(R^{41})_n$)

(IId) (phenothiazine with $(R^{42})_m$)

(IIe) (phenoxazine with $(R^{42})_m$)

(IIf) (structure with $R^{45}$ and $(R^{42})_m$)

(IIg) (thianthrene with $(R^{42})_m$)

(IIh) (phenoxathiine with $(R^{42})_m$)

(IIi) (dibenzodioxin with $(R^{42})_m$)

(IIj) (carbazole with $(R^{42})_m$)

(IIk) (azulene structure with $R^{44}$ and $(R^{42})_m$)

wherein $R^{41}$ can be the same or different at each occurrence and is Cl, F, CN, N($R^{45}$)$_2$, a $C_1$-$C_{25}$alkyl group, a $C_4$-$C_{18}$cycloalkyl group, a $C_1$-$C_{25}$alkoxy group, in which one or more carbon atoms which are not in neighbourhood to each other could be replaced by —NR$^{45}$—, —O—, —S—, —C(=O)—O—, or —O—C(=O)—O—, and/or wherein one or more hydrogen atoms can be replaced by F, a $C_6$-$C_{24}$aryl group, or a $C_6$-$C_{24}$aryloxy group, wherein one or more carbon atoms can be replaced by O, S, or N, and/or which can be substituted by one or more non-aromatic groups $R^{41}$, or two or more groups $R^{41}$ form a ring system;

$R^{42}$ can be the same or different at each occurrence and is CN, a $C_1$-$C_{25}$alkyl group, a $C_4$-$C_{18}$cycloalkyl group, a $C_1$-$C_{25}$alkoxy group, in which one or more carbon atoms which are not in neighbourhood to each other could be replaced by —NR$^{45}$—, —O—, —S—, —C(=O)—O—, or —O—C(=O)—O—, and/or wherein one or more hydrogen atoms can be replaced by F, a $C_6$-$C_{24}$aryl group, or a $C_6$-$C_{24}$aryloxy group, wherein one or more carbon atoms can be replaced by O, S, or N, and/or which can be substituted by one or more non-aromatic groups $R^{41}$, or two or more groups $R^{41}$ form a ring system;

$R^{44}$ can be the same or different at each occurrence and are a hydrogen atom, a $C_1$-$C_{25}$alkyl group, a $C_4$-$C_{18}$cycloalkyl group, a $C_1$-$C_{25}$alkoxy group, in which one or more carbon atoms which are not in neighbourhood to each other could be replaced by —$NR^{45}$—, —O—, —S—, —C(=O)—O—, or, —O—C(=O)—O—, and/or wherein one or more hydrogen atoms can be replaced by F, a $C_6$-$C_{24}$aryl group, or a $C_6$-$C_{24}$aryloxy group, wherein one or more carbon atoms can be replaced by O, S, or N, and/or which can be substituted by one or more non-aromatic groups $R^{41}$, or CN, or two or more groups $R^{44}$, which are in neighbourhood to each other, form a ring;

$R^{45}$ is H, a $C_1$-$C_{25}$alkyl group, a $C_4$-$C_{18}$cycloalkyl group, a $C_1$-$C_{25}$alkoxy group, in which one or more carbon atoms which are not in neighbourhood to each other could be replaced by —$NR^{45}$—, —O—, —S—, —C(=O)—O—, or, —O—C(=O)—O—, and/or wherein one or more hydrogen atoms can be replaced by F, a $C_6$-$C_{24}$aryl group, or a $C_6$-$C_{24}$aryloxy group, wherein one or more carbon atoms can be replaced by O, S, or N, and/or which can be substituted by one or more non-aromatic groups $R^{41}$;

m can be the same or different at each occurrence and is 0, 1, 2, or 3, especially 0, 1, or 2, very especially 0 or 1;

n can be the same or different at each occurrence and is 0, 1, 2, or 3, especially 0, 1, or 2, very especially 0 or 1;

$A^1$ and $A^{1'}$ are independently of each other a $C_6$-$C_{24}$aryl group, a $C_2$-$C_{30}$heteroaryl group, which can be substituted by one or more non-aromatic groups $R^{41}$, or $NO_2$, especially phenyl, naphthyl, anthryl, biphenylyl, 2-fluorenyl, phenanthryl, or perylenyl, which can be substituted by one or more non-aromatic groups $R^{41}$, such as

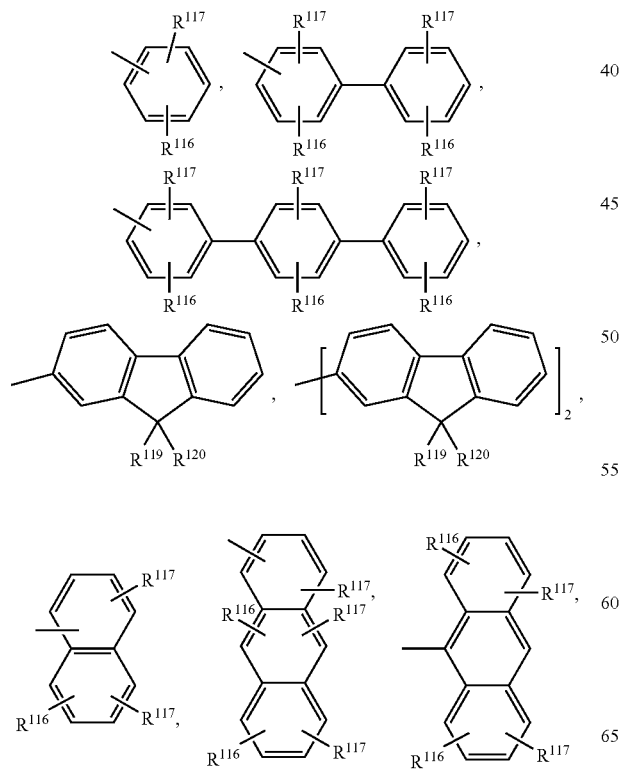

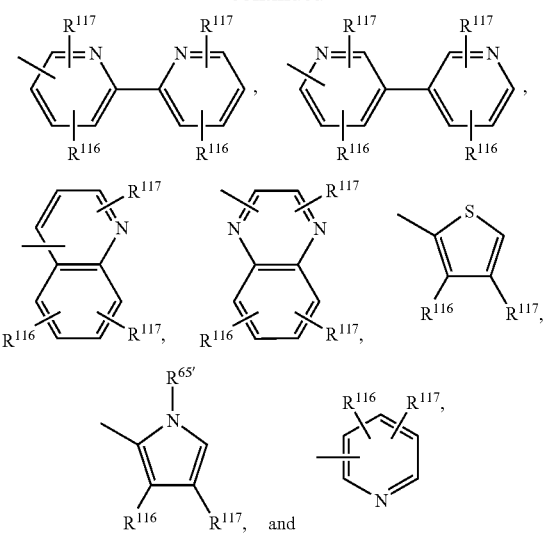

$A^2$ is a $C_6$-$C_{30}$arylene group, or a $C_2$-$C_{24}$heteroarylene group, which can optionally be substituted, especially

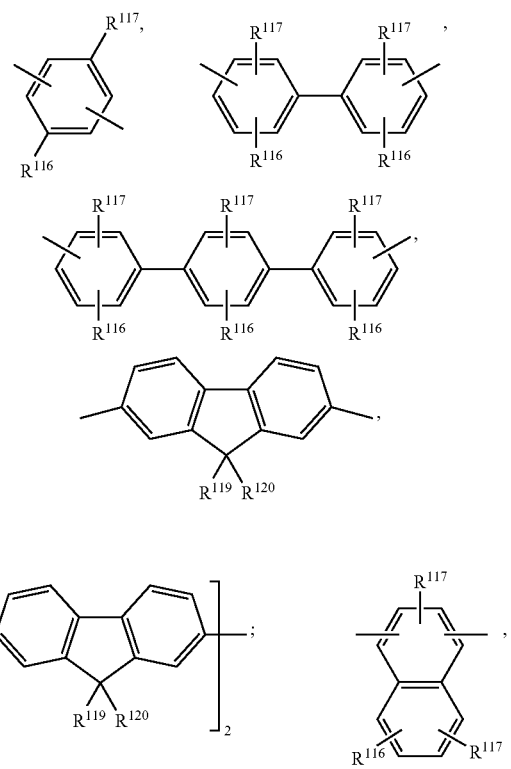

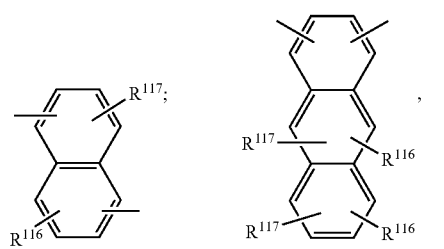

-continued

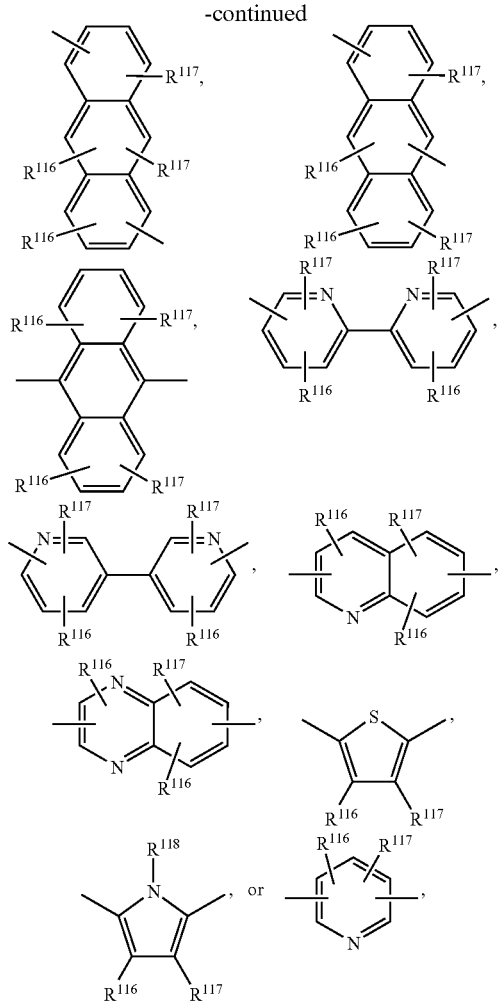

wherein $R^{116}$ and $R^{117}$ are independently of each other H, halogen, —CN, $C_1$-$C_{18}$alkyl, $C_1$-$C_{18}$alkyl which is substituted by E and/or interrupted by D, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, $C_7$-$C_{25}$aralkyl, —C(=O)—$R^{127}$, —C(=O)O$R^{127}$, or —C(=O)N$R^{127}R^{126}$, $R^{119}$ and $R^{120}$ are independently of each other H, $C_1$-$C_{18}$alkyl, $C_1$-$C_{18}$alkyl which is substituted by E and/or interrupted by D, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, or $C_7$-$C_{25}$aralkyl, or $R^{119}$ and $R^{120}$ together form a group of formula =$CR^{121}R^{122}$, wherein $R^{121}$ and $R^{122}$ are independently of each other H, $C_1$-$C_{18}$alkyl, $C_1$-$C_{18}$alkyl which is substituted by E and/or interrupted by D, $C_6$-$C_{24}$aryl, $C_6$-$C_{24}$aryl which is substituted by G, or $C_2$-$C_{20}$heteroaryl, or $C_2$-$C_{20}$heteroaryl which is substituted by G, or $R^{119}$ and $R^{120}$ together form a five or six membered ring, which optionally can be substituted by $C_1$-$C_{18}$alkyl, $C_1$-$C_{18}$alkyl which is substituted by E and/or interrupted by D, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, $C_7$-$C_{25}$aralkyl, or —C(=O)—$R^{127}$, and $R^{126}$ and $R^{127}$ are independently of each other H; $C_6$-$C_{18}$aryl; $C_6$-$C_{18}$aryl which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—, D is —CO—, —COO—, —S—, —SO—, —$SO_2$—, —O—, —$NR^{65}$—, —$SiR^{70}R^{71}$—, —$POR^{72}$—, —$CR^{63}$=$CR^{64}$—, or —C≡C—, and E is —$OR^{69}$, —$SR^{69}$, —$NR^{65}R^{66}$, —$COR^{68}$, —$COOR^{67}$, —$CONR^{65}R^{66}$, —CN, or halogen, G is E, or $C_1$-$C_{18}$alkyl, $R^{63}$, $R^{64}$, $R^{65}$ and $R^{66}$ are independently of each other H; $C_6$-$C_{18}$aryl; $C_6$-$C_{18}$aryl which is substituted by $C_1$-$C_{18}$alkyl, $C_1$-$C_{18}$alkoxy; $C_1$-$C_{18}$alkyl; or $C_1$-$C_{18}$alkyl which is interrupted by —O—; or $R^{65}$ and $R^{66}$ together form a five or six membered ring, in particular

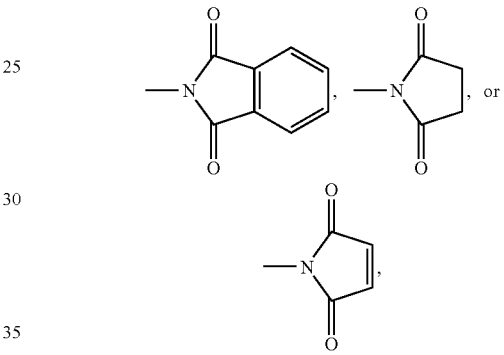

$R^{67}$ and $R^{68}$ are independently of each other H; $C_6$-$C_{18}$aryl; $C_6$-$C_{18}$aryl which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—, $R^{69}$ is H; $C_6$-$C_{18}$aryl; $C_6$-$C_{18}$aryl, which is substituted by $C_1$-$C_{18}$alkyl, $C_1$-$C_{18}$alkoxy; $C_1$-$C_{18}$alkyl; or $C_1$-$C_{18}$alkyl which is interrupted by —O—, $R^{70}$ and $R^{71}$ are independently of each other $C_1$-$C_{18}$alkyl, $C_6$-$C_{18}$aryl, or $C_6$-$C_{18}$aryl, which is substituted by $C_1$-$C_{18}$alkyl, and $R^{72}$ is $C_1$-$C_{18}$alkyl, $C_6$-$C_{18}$aryl, or $C_6$-$C_{18}$aryl, which is substituted by $C_1$-$C_{18}$alkyl.

$A^1$ is preferably a phenyl group, which is substituted by $C_1$-$C_4$alkyl, or $NO_2$, in particular

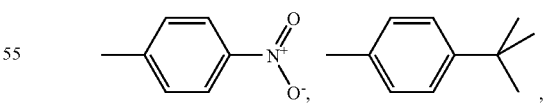

or an anthryl group, in particular an anthr-2-yl group.

Preferably, $R^{116}$ and $R^{117}$ are independently of each other H, $C_1$-$C_{12}$alkyl, such as methyl, ethyl, n-propyl, iso-propyl, n-butyl, isobutyl, sec-butyl, t-butyl, 2-methylbutyl, n-pentyl, isopentyl, n-hexyl, 2-ethylhexyl, or n-heptyl, $C_1$-$C_{12}$alkyl which is substituted by E and/or interrupted by D, such as —$CH_2OCH_3$, —$CH_2OCH_2CH_3$, —$CH_2OCH_2CH_2OCH_3$, or —$CH_2OCH_2CH_2OCH_2CH_3$, $C_6$-$C_{14}$aryl, such as phenyl, naphthyl, or biphenylyl, $C_5$-$C_{12}$cycloalkyl, such as cyclohexyl, $C_6$-$C_{14}$aryl which is substituted by G, such as —$C_6H_4OCH_3$, —$C_6H_4OCH_2CH_3$, —$C_6H_3(OCH_3)_2$, or —$C_6H_3(OCH_2CH_3)_2$, —$C_6H_4CH_3$, —$C_6H_3(CH_3)_2$, —$C_6H_2(CH_3)_3$, or —$C_6H_4tBu$.

$R^{65}$ is preferably H, $C_1$-$C_{12}$alkyl, such as methyl, ethyl, n-propyl, iso-propyl, n-butyl, isobutyl, sec-butyl, t-butyl, 2-methylbutyl, n-pentyl, isopentyl, n-hexyl, 2-ethylhexyl, n-heptyl, or $C_6$-$C_{14}$aryl, such as phenyl, naphthyl, or biphenylyl, which can optionally be substituted.

Preferably, $R^{119}$ and $R^{120}$ are independently of each other H, $C_1$-$C_{12}$alkyl, such as methyl, ethyl, n-propyl, iso-propyl, n-butyl, sec-butyl, hexyl, octyl, or 2-ethyl-hexyl, $C_1$-$C_{12}$alkyl which is substituted by E and/or interrupted by D, such as —$CH_2(OCH_2CH_2)_wOCH_3$, w=1, 2, 3, or 4, $C_6$-$C_{14}$aryl, such as phenyl, naphthyl, or biphenylyl, $C_6$-$C_{14}$aryl which is substituted by G, such as —$C_6H_4OCH_3$, —$C_6H_4OCH_2CH_3$, —$C_6H_3(OCH_3)_2$, —$C_6H_3(OCH_2CH_3)_2$, —$C_6H_4CH_3$, —$C_6H_3(CH_3)_2$, —$C_6H_2(CH_3)_3$, or —$C_6H_4tBu$, or $R^9$ and $R^{10}$ together form a 4 to 8 membered ring, especially a 5 or 6 membered ring, such as cyclohexyl, or cyclopentyl, which can optionally be substituted by $C_1$-$C_8$alkyl.

D is preferably —CO—, —COO—, —S—, —SO—, —$SO_2$—, —O—, —$NR^{65}$—, wherein $R^{65}$ is $C_1$-$C_{12}$alkyl, such as methyl, ethyl, n-propyl, iso-propyl, n-butyl, isobutyl, or sec-butyl, or $C_6$-$C_{14}$aryl, such as phenyl, naphthyl, or biphenylyl.

E is preferably —$OR^{69}$; —$SR^{69}$; —$NR^{65}R^{65}$; —$COR^{68}$; —$COOR^{67}$; —$CONR^{65}R^{65}$; or —CN; wherein $R^{65}$, $R^{67}$, $R^{68}$ and $R^{69}$ are independently of each other $C_1$-$C_{12}$alkyl, such as methyl, ethyl, n-propyl, iso-propyl, n-butyl, isobutyl, sec-butyl, hexyl, octyl, or 2-ethyl-hexyl, or $C_6$-$C_{14}$ aryl, such as phenyl, naphthyl, or biphenylyl.

G has the same preferences as E, or is $C_1$-$C_{18}$alkyl, especially $C_1$-$C_{12}$alkyl, such as methyl, ethyl, n-propyl, iso-propyl, n-butyl, isobutyl, sec-butyl, hexyl, octyl, or 2-ethyl-hexyl.

Preferred units of group $HEI^{II}$, which increase the electron-injection or electron-transport properties of the polymers, are:

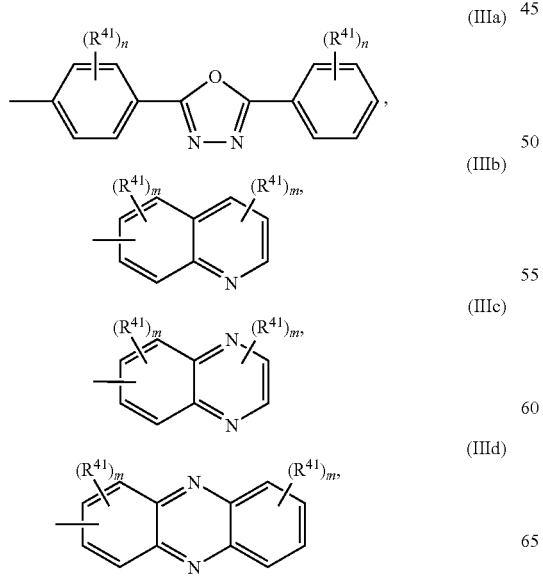

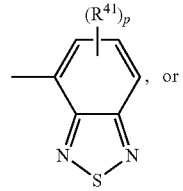

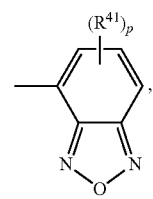

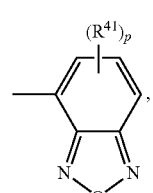

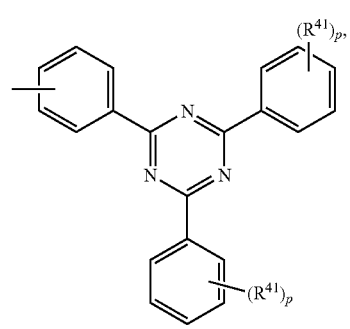

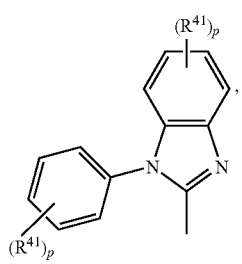

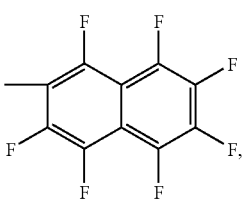

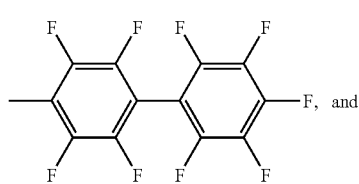

-continued

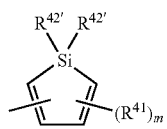
(IIIII)

wherein $R^{41}$ and m and n are as defined above and p is 0, 1, or 2, especially 0 or 1, $R^{42'}$ is H, or $R^{42}$. Among the above units of group III the units of formula IIIa, IIIi, IIIj, and IIIk are more preferred.

Examples of the compound of formula XIV are:

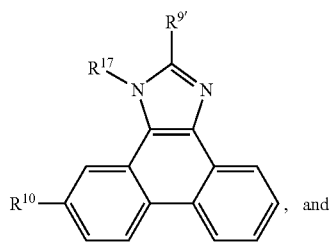, and

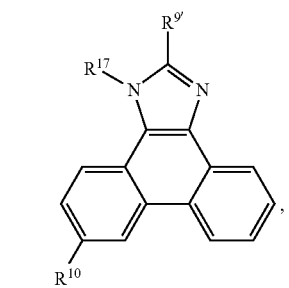, wherein $R^{10}$, $R^{17}$ and $R^{9'}$ are as defined above, such as

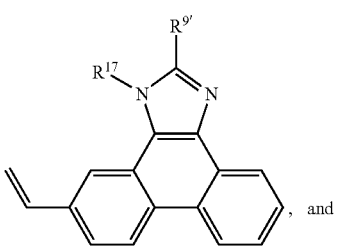, and

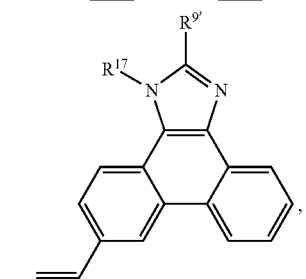, wherein $R^{17}$ and $R^{9'}$ are $C_1$-$C_{18}$alkyl.

In one embodiment of the present invention polymers are preferred, comprising a repeating unit of the formula X, or XI, wherein $R^1$ and $R^{1'}$ are hydrogen, $R^2$, $R^3$, $R^4$, $R^{2'}$, $R^{3'}$ and $R^{4'}$ are independently of each other H, $C_1$-$C_{18}$alkyl, $C_1$-$C_{18}$alkyl which is interrupted by D, $C_1$-$C_{18}$perfluoroalkyl, $C_1$-$C_{18}$alkoxy, $C_1$-$C_{18}$alkoxy which is interrupted by D, or $C_7$-$C_{25}$aralkyl, $R^8$ is H, $C_1$-$C_{18}$alkyl, $C_1$-$C_{18}$alkyl which is interrupted by D, $C_1$-$C_{18}$perfluoroalkyl, $C_1$-$C_{18}$alkoxy, or $C_1$-$C_{18}$alkoxy which is interrupted by D, or two substituents $R^1$, $R^2$, $R^3$, $R^4$, $R^{1'}$, $R^{2'}$, $R^{3'}$ and $R^{4'}$, which are adjacent to each other, together form a group

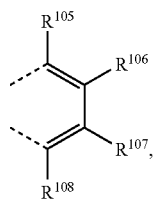

or two substituents $R^4$ and $R^{4'}$, which are adjacent to each other, together form a group

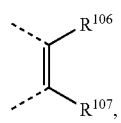

wherein $R^{105}$, $R^{106}$, $R^{107}$ and $R^{108}$ are independently of each other H, or $C_1$-$C_8$alkyl, $R^{10}$ is a group -(Sp)$_{x1}$-[PG']<, wherein Sp is a spacer unit, PG' is a group derived from a polymerisable group, and x1 is 0, or 1, D is —CO—; —COO—; —S—; —SO—; —SO$_2$—; —O—; —NR$^{25}$—; —CR$^{23}$=CR$^{24}$—; or —C≡C—; wherein $R^{23}$, $R^{24}$, $R^{25}$ and $R^{26}$ are independently of each other H; $C_6$-$C_{18}$aryl; $C_6$-$C_{18}$aryl which is substituted by $C_1$-$C_8$alkyl, or $C_1$-$C_8$alkoxy; $C_1$-$C_8$alkyl; or $C_1$-$C_8$alkyl which is interrupted by —O—, or $R^{25}$ and $R^{26}$ together form a five or six membered ring, in particular

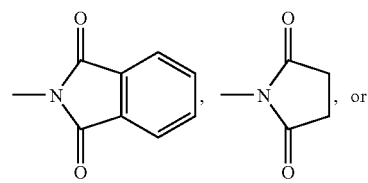, or

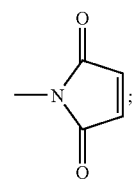

or polymers are preferred, comprising a repeating unit of the formula

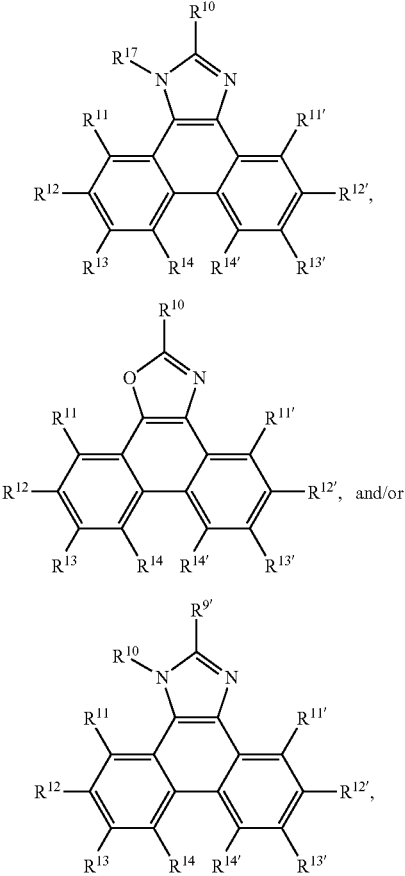

(XIIa)

(XIIb)

(XIII)

wherein
$R^{9'}$ is H, $C_6$-$C_{18}$aryl, which can be substituted by G, $C_2$-$C_{18}$heteroaryl, which can be substituted by G, $C_1$-$C_{18}$alkyl, $C_1$-$C_{18}$alkyl which is interrupted by D, $C_1$-$C_{18}$perfluoroalkyl, $C_1$-$C_{18}$alkoxy, or $C_1$-$C_{18}$alkoxy which is substituted by E and/or interrupted by D, $R^{11}$ and $R^{11'}$ are hydrogen, $R^{12}$, $R^{13}$, $R^{14}$, $R^{12'}$, $R^{13'}$ and $R^{14'}$ are hydrogen, $R^{17}$ is $C_6$-$C_{18}$aryl; $C_6$-$C_{18}$aryl which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—; or two substituents $R^{11}$, $R^{12}$, $R^{13}$, $R^{14}$, $R^{11'}$, $R^{12'}$, $R^{13'}$ and $R^{14'}$, which are adjacent to each other, together form a group

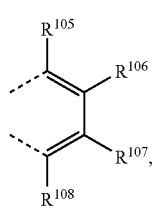

or two substituents $R^{14}$ and $R^{14'}$, which are adjacent to each other, together form a group

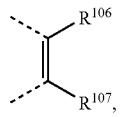

wherein $R^{105}$, $R^{106}$, $R^{107}$, $R^{108}$, D, E and $R^{10}$ are as defined above.

In addition, $R^{12}$, $R^{13}$, $R^{14}$, $R^{12'}$, $R^{13'}$ and $R^{14'}$ can be selected from groups $HEI^I$ and $HEI^{II}$.

Sp is selected from —Ar—, —ArY—, —YAr—, —YAr$(CR^{47}R^{48})_n$—, —$(CR^{47}R^{48})_n$—, —$(YCR^{47}R^{18})_n$—, or —$(CR^{47}R^{48}Y)_n$—, wherein Y is $NR^5$, O, S, C=O, C(=O)O, wherein $R^5$ is H; $C_8$-$C_{18}$aryl; $C_6$-$C_{18}$aryl which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—;

$R^{47}$ and $R^{48}$ are independently of each other hydrogen, fluorine, or $C_1$-$C_{28}$alkyl, n is an integer of 1 to 20, Ar is alkylen, cycloalkylen, arylen, aralkylene, or heteroarylen, which can optionally be substituted.

PG' is a group derived from a polymerisable group and is preferably selected from —C($R^{44}$)=$CH_2$, —NHC(O)—C($R^{45}$)=$CH_2$, —$OCH_2CH_2OC(O)$—C($R^{45}$)=$CH_2$, —OC(O)—C($R^{45}$)=$CH_2$, —C(O)—C($R^{46}$)=$CH_2$, —C≡C—, —N≡C, —O—CH($CH_2CH_2CH$=$CH_2)_2$; $C_5$-$C_8$cycloalkenyl, bicycloalkenyl (a substituted or unsubstituted bicycloalkenyl group having 5 to 30 carbon atoms),

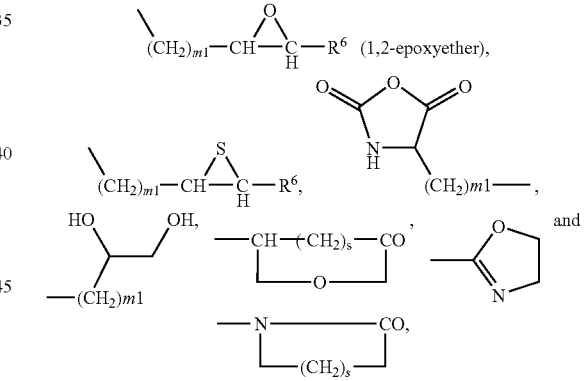

wherein
s is an integer from 1 to 6, m1 is an integer from 1 to 6,
$R^6$ is hydrogen, or $C_1$-$C_{20}$alkyl,
$R^{44}$ is hydrogen, or $C_1$-$C_4$alkyl, or halogen,
$R^{45}$ is hydrogen, $C_1$-$C_4$alkyl, or halogen, and
$R^{46}$ is hydrogen, $C_1$-$C_4$alkyl, or $C_6$-$C_{12}$aryl, or
PG' is a group derived from a polymerisable group

wherein AHG is an aromatic, or heteroaromatic residue, which can optionally be substituted, such as

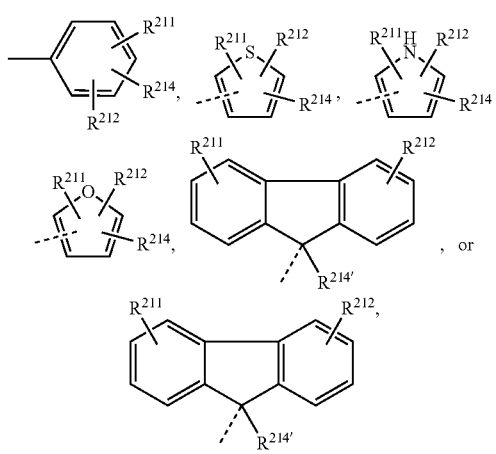

$R^{211}$ and $R^{212}$ are independently of each other halogen, —C≡CH, boronic acid, or boronic esters, —Mg-Hal, —Zn-Hal, —Sn$(R^{213})_3$, wherein Hal is halogen, and $R^{213}$ is $C_1$-$C_{18}$alkyl, $R^{214}$ and $R^{214'}$ are independently of each other H, $C_1$-$C_{18}$alkyl, $C_1$-$C_{18}$alkyl which is interrupted by D, $C_1$-$C_{18}$perfluoroalkyl, $C_1$-$C_{18}$alkoxy, $C_1$-$C_{18}$alkoxy which is interrupted by D, or $C_7$-$C_{25}$aralkyl.

If PG' is a group derived from a polymerisable group

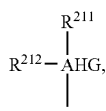

the following processes can be used for the production of polymers:

Polymerization processes involving only dihalo-functional reactants may be carried out using nickel coupling reactions. One such coupling reaction was described by Colon et al. in J. Pol. Sci., Part A, Polymer Chemistry Edition 28 (1990) 367, and by Colon et al. in J. Org. Chem. 51 (1986) 2627. The reaction is typically conducted in a polar aprotic solvent (e.g., dimethylacetamide) with a catalytic amount of nickel salt, a substantial amount of triphenylphosphine and a large excess of zinc dust. A variant of this process is described by Ioyda et al. in Bull. Chem. Soc. Jpn, 63 (1990) 80 wherein an organo-soluble iodide was used as an accelerator.

Another nickel-coupling reaction was disclosed by Yamamoto in Progress in Polymer Science 17 (1992) 1153 wherein a mixture of dihaloaromatic compounds was treated with an excess amount of nickel (1,5-cyclooctadiene) complex in an inert solvent. All nickel-coupling reactions when applied to reactant mixtures of two or more aromatic dihalides yield essentially random copolymers. Such polymerization reactions may be terminated by the addition of small amounts of water to the polymerization reaction mixture, which will replace the terminal halogen groups with hydrogen groups. Alternatively, a monofunctional aryl halide may be used as a chain-terminator in such reactions, which will result in the formation of a terminal aryl group.

Nickel-coupling polymerizations yield essentially homopolymers or random copolymers comprising units of formula I and units derived from other co-monomers.

Homopolymers of formula

(VII)

can be obtained, for example, by the Suzuki reaction, wherein $X^{10}$ is a repeating unit of formula I, especially X, XI, XIII and XIV; $Ar^3$ is selected from the following groups:

group II: units, which increase the hole-injection or hole-transport properties of the polymers;

group III: units, which increase the electron-injection or electron-transport properties of the polymers;

group IV: units, which are combinations of units of group II and III;

group V:

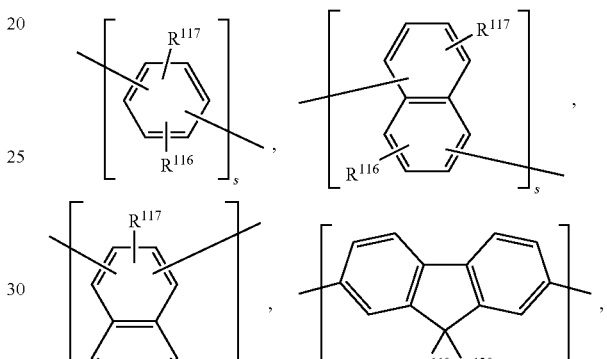

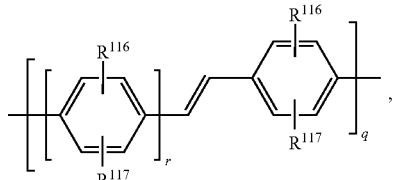

, especially

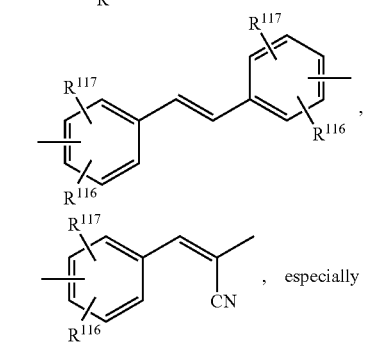

(Va)

(Vb)

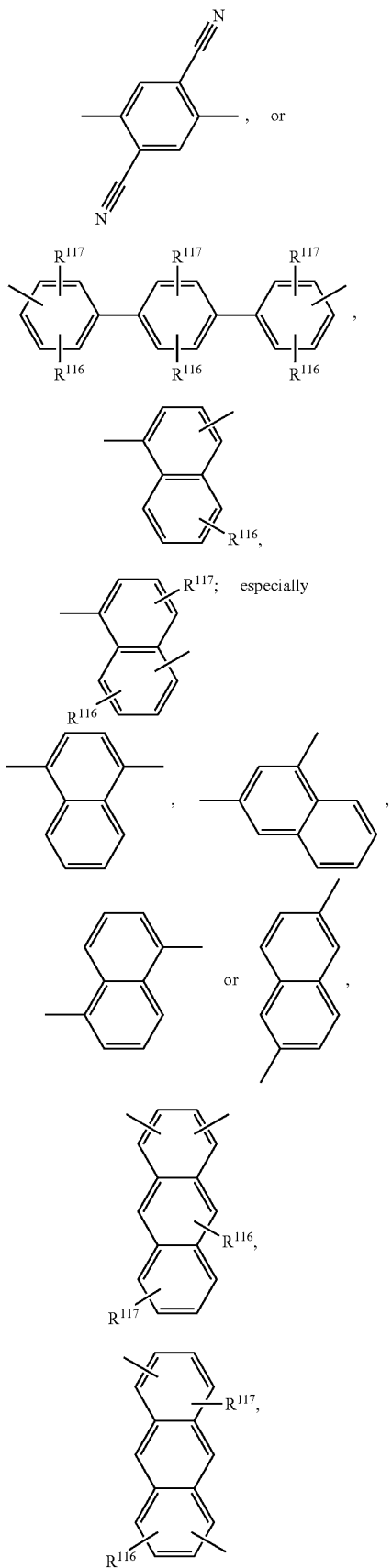
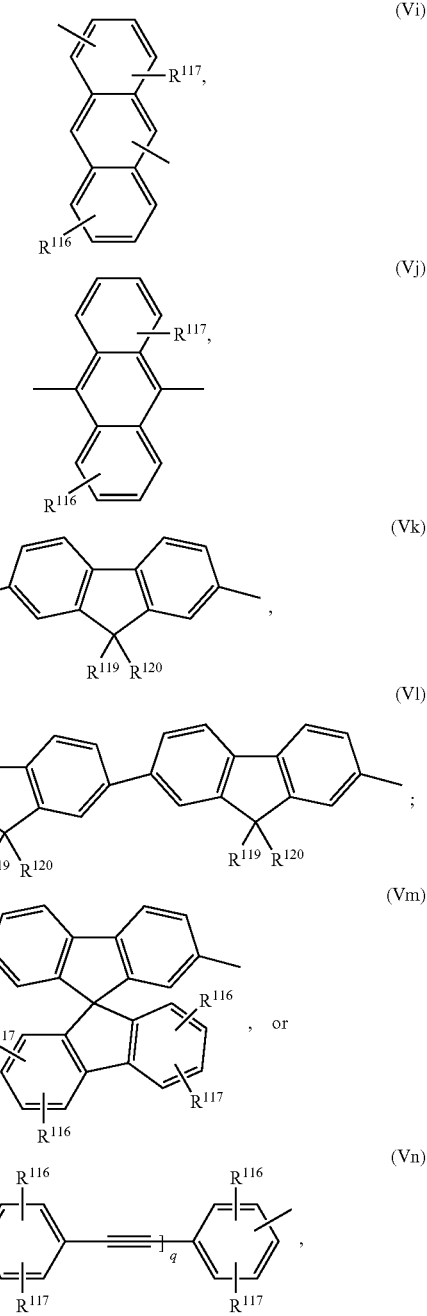

wherein
r is an integer from 1 to 10, especially 1, 2 or 3,
q is an integer from 1 to 10, especially 1, 2 or 3,
s is an integer from 1 to 10, especially 1, 2 or 3,
$R^{116}$ and $R^{117}$ are independently of each other H, halogen, —CN, $C_1$-$C_{18}$alkyl, $C_1$-$C_{18}$alkyl which is substituted by E and/or interrupted by D, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, $C_7$-$C_{25}$aralkyl, —C(=O)—$R^{127}$, —C(=O)O$R^{127}$, or —C(=O)N$R^{127}R^{126}$,
$R^{119}$ and $R^{120}$ are independently of each other H, $C_1$-$C_{18}$alkyl, $C_1$-$C_{18}$alkyl which is substituted by E and/or interrupted by D, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, or $C_7$-$C_{25}$aralkyl, or $R^{119}$ and $R^{120}$ together form a group of formula $=CR^{121}R^{122}$, wherein $R^{121}$ and $R^{122}$ are independently of each other H, $C_1$-$C_{18}$alkyl, $C_1$-$C_{18}$alkyl which is substituted by E and/or interrupted by D, $C_6$-$C_{24}$aryl, $C_6$-$C_{24}$aryl which is substituted by G, or $C_2$-$C_{20}$heteroaryl, or $C_2$-$C_{20}$heteroaryl which is substituted by G, or $R^{119}$ and $R^{120}$ together form a five or six membered ring, which optionally can be substituted by $C_1$-$C_{18}$alkyl, $C_1$-$C_{18}$alkyl which is substituted by E and/or interrupted by D, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, $C_7$-$C_{25}$aralkyl, or —C(=O)—$R^{127}$, and $R^{126}$ and $R^{127}$ are independently of each other H; $C_6$-$C_{18}$aryl; $C_6$-$C_{18}$aryl which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—, D is —CO—, —COO—, —S—, —SO—, —SO$_2$—, —O—, —NR$^{65}$—, —SiR$^{70}$R$^{71}$—, —POR$^{72}$—, —CR$^{63}$=CR$^{64}$—, or —C≡C—, and E is —OR$^{69}$, —SR$^{69}$, —NR$^{65}$R$^{66}$, —COR$^{68}$, —COOR$^{67}$, —CONR$^{65}$R$^{66}$, —CN, or halogen, G is E, or $C_1$-$C_{18}$alkyl, $R^{63}$, $R^{64}$, $R^{65}$ and $R^{66}$ are independently of each other H; $C_6$-$C_{18}$aryl; $C_6$-$C_{18}$aryl which is substituted by $C_1$-$C_{18}$alkyl, $C_1$-$C_{18}$alkoxy; $C_1$-$C_{18}$alkyl; or $C_1$-$C_{18}$alkyl which is interrupted by —O—; or $R^{65}$ and $R^{66}$ together form a five or six membered ring, in particular

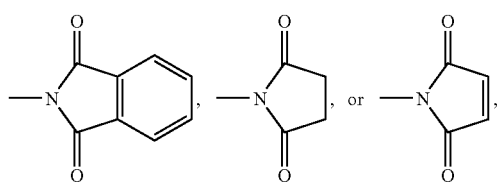

$R^{67}$ and $R^{68}$ are independently of each other H; $C_6$-$C_{18}$aryl; $C_6$-$C_{18}$aryl which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—, $R^{69}$ is H; $C_6$-$C_{18}$aryl; $C_6$-$C_{18}$aryl, which is substituted by $C_1$-$C_{18}$alkyl, $C_1$-$C_{18}$alkoxy; $C_1$-$C_{18}$alkyl; or $C_1$-$C_{18}$alkyl which is interrupted by —O—, $R^{70}$ and $R^{71}$ are independently of each other $C_1$-$C_{18}$alkyl, $C_6$-$C_{18}$aryl, or $C_6$-$C_{18}$aryl, which is substituted by $C_1$-$C_{18}$alkyl, and $R^{72}$ is $C_1$-$C_{18}$alkyl, $C_6$-$C_{18}$aryl, or $C_6$-$C_{18}$aryl, which is substituted by $C_1$-$C_{18}$alkyl.

Examples of units of groups II, III and IV are contained in WO2005/049695, page 11, line 13 to page 22, line 9.

In a preferred embodiment of the present invention the polymer comprises repeating units of formula

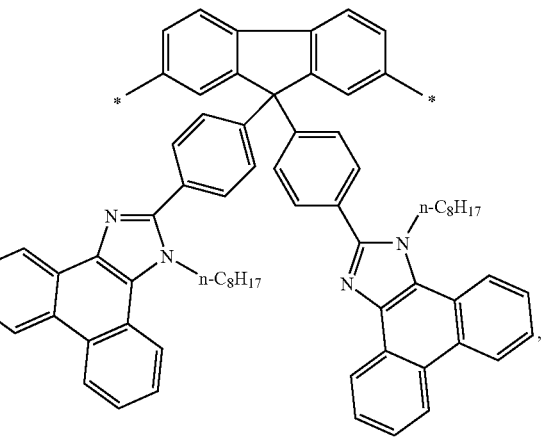

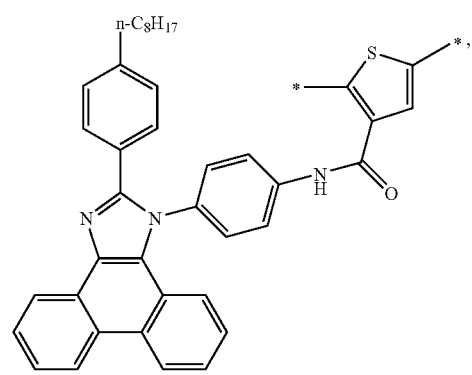

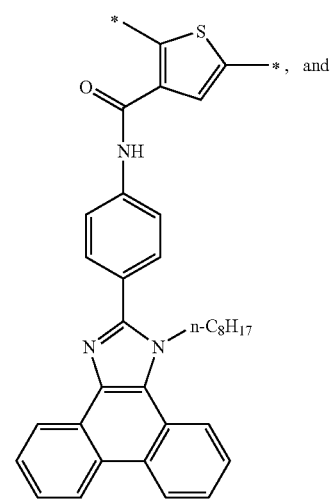

-continued

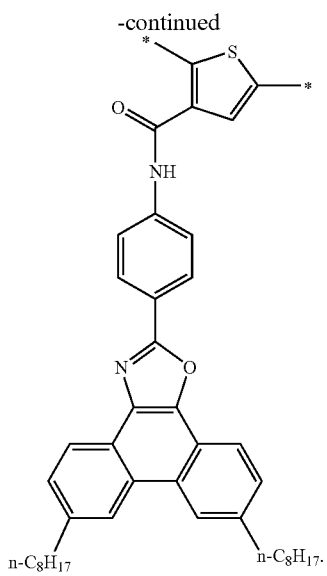

The condensation reaction of an aromatic boronate and a halogenide, especially a bromide, commonly referred to as the "Suzuki reaction", is tolerant of the presence of a variety of organic functional groups as reported by N. Miyaua and A. Suzuki in Chemical Reviews, Vol. 95, pp. 457-2483 (1995). This reaction can be applied to preparing high molecular weight polymers and copolymers.

To prepare polymers corresponding to formula VII, a dihalogenide, such as a dibromide or dichloride, especially a dibromide corresponding to formula

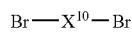

is reacted with an equimolar amount of a diboronic acid or diboronate corresponding to formula

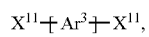

wherein $X^{11}$ is independently in each occurrence —$B(OH)_2$, —$B(OY^1)_2$ or

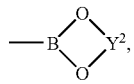

wherein $Y^1$ is independently in each occurrence a $C_1$-$C_{10}$alkyl group and $Y^2$ is independently in each occurrence a $C_2$-$C_{10}$alkylene group, such as —$CY^3Y^4$—$CY^5Y^6$—, or —$CY^7Y^8$—$CY^9Y^{10}$—$CY^{11}Y^{12}$—, wherein $Y^3$, $Y^4$, $Y^5$, $Y^6$, $Y^7$, $Y^8$, $Y^9$, $Y^{10}$, $Y^{11}$ and $Y^{12}$ are independently of each other hydrogen, or a $C_1$-$C_{10}$alkyl group, especially —$C(CH_3)_2C$ $(CH_3)_2$—, or —$C(CH_3)_2CH_2C(CH_3)_2$—, under the catalytic action of Pd and triphenylphosphine. The reaction is typically conducted at about 70° C. to 180° C. in an aromatic hydrocarbon solvent such as toluene. Other solvents such as dimethylformamide and tetrahydrofuran can also be used alone, or in mixtures with an aromatic hydrocarbon. An aqueous base, preferably sodium carbonate or bicarbonate, is used as the HBr scavenger. Depending on the reactivities of the reactants, a polymerization reaction may take 2 to 100 hours. Organic bases, such as, for example, tetraalkylammonium hydroxide, and phase transfer catalysts, such as, for example TBAB, can promote the activity of the boron (see, for example, Leadbeater & Marco; Angew. Chem. Int. Ed. Eng. 42 (2003) 1407 and references cited therein). Other variations of reaction conditions are given by T. I. Wallow and B. M. Novak in J. Org. Chem. 59 (1994) 5034-5037; and M. Remmers, M. Schulze, and G. Wegner in Macromol. Rapid Commun. 17 (1996) 239-252.

If desired, a monofunctional aryl halide or aryl boronate may be used as a chain-terminator in such reactions, which will result in the formation of a terminal aryl group.

It is possible to control the sequencing of the monomeric units in the resulting copolymer by controlling the order and composition of monomer feeds in the Suzuki reaction.

If PG' is different from a polymerisable group

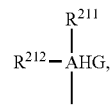

the polymers can contain in addition to the repeating units of formula X-XXI one or more repeating units $RG^I$ and/or $RG^{II}$:

$RG^I$: units, which increase the hole-injection or hole-transport properties of the polymers;

$RG^{II}$: units, which increase the electron-injection or electron-transport properties of the polymers.

Preferred units of $RG^I$, which increase the hole-injection or hole-transport properties of the polymers, are:

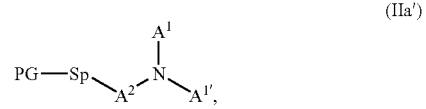
(IIa')

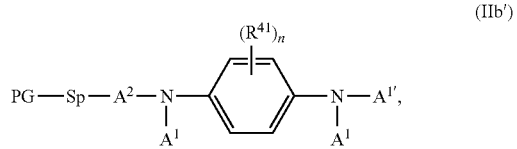
(IIb')

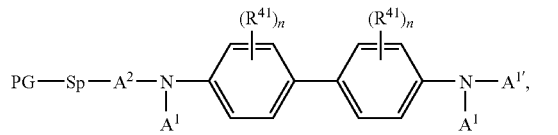
(IIc')

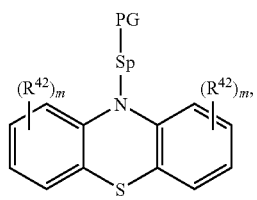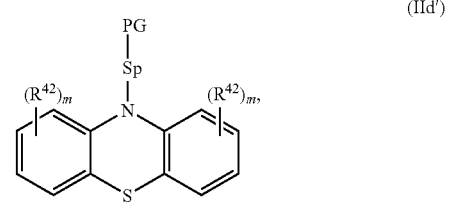
(IId')

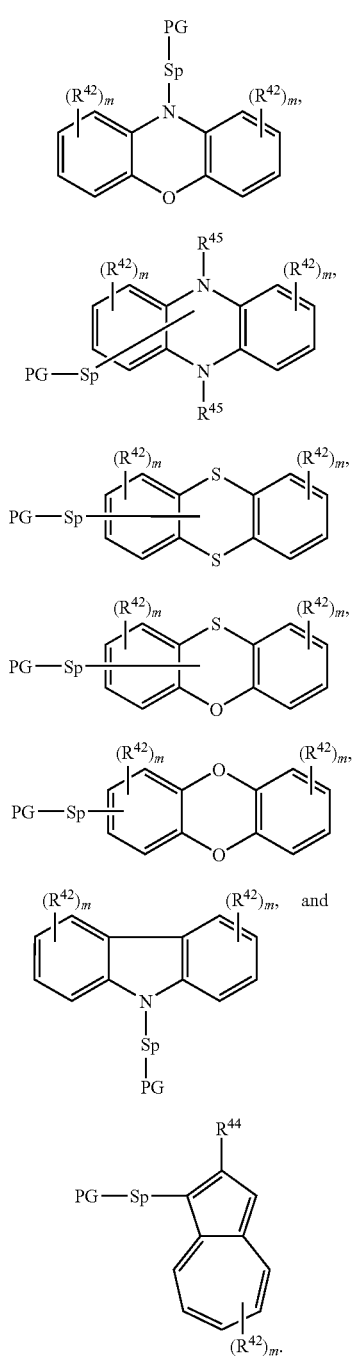
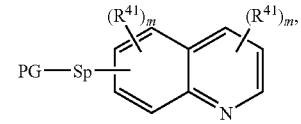
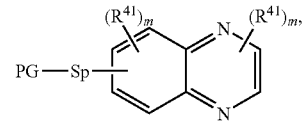
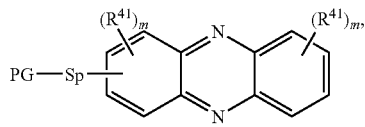
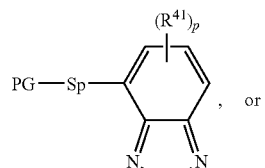
, or
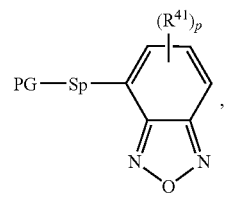
,
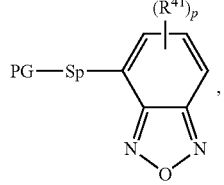
,
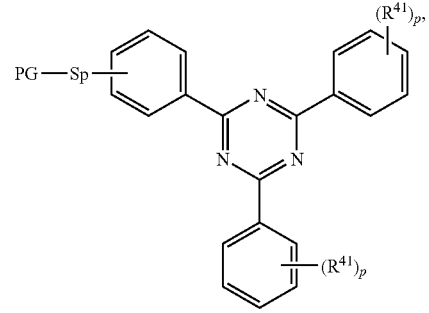
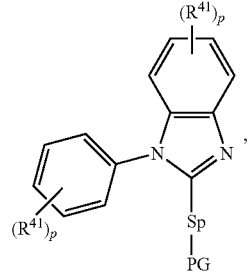
$R^{41}$, $R^{42}$, $R^{44}$, $R^{45}$, $A^1$, $A^{1'}$, $A^2$, m, n, PG, and Sp are as defined above.
Preferred units of $RG^{II}$, which increase the electron-injection or electron-transport properties of the polymers, are:
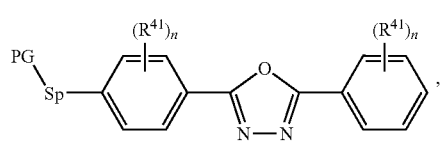

-continued

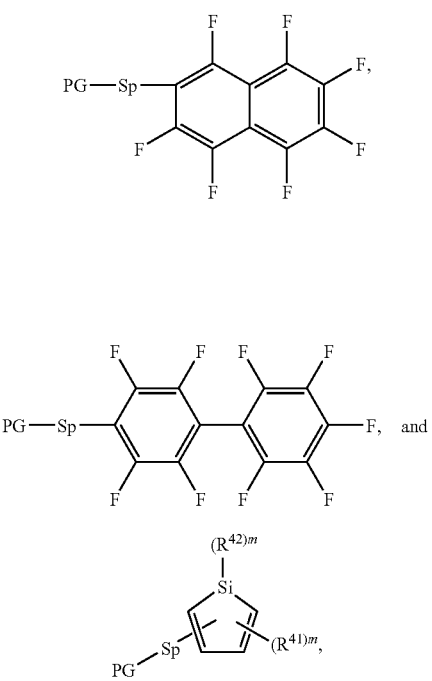

(IIIj')

(IIIk')

(IIIl')

wherein $R^{41}$, $R^{42}$, Sp, PG and m and n are as defined above and p is 0, 1, or 2, especially 0 or 1.

According to the present invention homopolymers A-1, A-2, A-3, A-4, A-5, A-6, A-7, A-8, A-9, A-10, A-11, A-12, A-13, A-14, A-15, A-16, A-17, A-18, A-19, A-20, A-21, A-22, A-23, A-24, A-25, A-26, A-27, A-28, A-29, A-30, A-31, A-32, A-33, A-34, A-35, A-36, A-37, A-38, A-39, A-40, A-41, A-42, A-43, A-44, A-45, A-46, A-47, A-48, A-49, A-50, A-51, A-52, A-53, A-54, A-55, A-56, A-57, A-58, A-59, A-60, A-61, A-62, A-63, A-64, A-65, A-66, A-67, A-68, A-69, A-70, A-71, A-72, A-73, A-74, A-75, A-76, A-77, A-78, A-79, B-1, B-2, B-3, B-4, B-5, B-6, B-7, B-8, B-9, B-10, B-11, B-12, B-13, B-14, B-15, B-16, B-17, B-18, B-19, B-20, B-21, B-22, B-23, B-24, B-25, B-26, B-27, B-28, B-29, B-30, B-31, B-32, B-33, B-34, B-35, B-36, B-37, B-38, B-39, C-1, C-2, C-3, C-4, C-5, C-6, C-7, C-8, C-9, C-10, C-11, C-12, C-13, C-14, C-15, C-16, C-17, C-18, C-19, C-20, C-21, C-22, C-23, C-24, C-25, C-26, C-27, C-28, C-29, C-30, C-31, C-32, C-33, C-34, C-35, C-36, C-37, C-38, C-39, C-40, C-41, C-42, C-43, C-44, C-45, C-46, C-47, C-48, C-49, C-50, C-51, C-52, C-53, C-54, C-55, C-56, C-57, C-58, C-59, C-60, C-61, C-62, C-63, C-64, C-65, C-66, C-67, C-68, C-69, C-70, C-71, C-72, C-73, C-74, C-75, C-76, C-77, C-78, D-1, D-2, D-3, D-4, D-5, D-6, D-7, D-8, D-9, D-10, D-11, D-12, D-13, D-14, D-15, D-16, D-17, D-18, D-19, D-20, D-21, D-22, D-23, D-24, D-25, D-26, D-27, D-28, D-29, D-30, D-31, D-32, D-33, D-34, D-35, D-36, D-37, D-38, D-39, D-40, D-41, D-42, D-43, D-44, D-45, D-46, D-47, D-48, D-49, D-50, D-51, D-52, E-1, E-2, E-3, E-4, E-5, E-6, E-7, E-8, E-9, E-10, E-11, E-12, E-13, E-14, E-15, E-16, E-17, E-18, E-19, E-20, E-21, E-22, E-23, E-24, E-25, E-26, E-27, E-28, E-29, E-30, E-31, E-32, E-33, E-34, E-35, E-36, E-37, E-38, E-39, E-40, E-41, E-42, E-43, E-44, E-45, E-46, E-47, E-48, E-49, E-50, E-51, and E-52, F-1 to F-36, G-1 to G-37, H-1 to H-42, I-1 to I-8, J-1 to J-31, and K-1 to K-34 are especially preferred. Reference is made to claim 5.

In one embodiment, the polymer comprise repeating units of formula

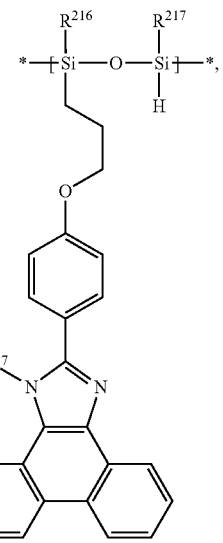

wherein
$R^{216}$ and $R^{217}$ are independently of each other $C_1$-$C_{18}$alkyl, or $C_6$-$C_8$aryl, which can optionally be substituted by one, or more $C_1$-$C_{18}$alkyl groups, and $R^{17}$ is $C_6$-$C_{18}$aryl; $C_6$-$C_{18}$aryl which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—.

In one embodiment, the polymers according to the invention consist only of one or more type of repeating units of formula I. In a preferred embodiment, the polymers according to the invention consist of precisely one type of repeating unit of formula I (homopolymers).

According to the present invention the term "polymer" comprises polymers as well as oligomers, wherein a polymer is a molecule of high relative molecular mass, the structure of which essentially comprises the repetition of units derived, actually or conceptually, from molecules of low relative molecular mass and an oligomer is a molecule of intermediate molecular mass, the structure of which essentially comprises a small plurality of units derived, actually or conceptually, from molecules of lower relative molecular mass. A molecule is regarded as having a high relative molecular mass if it has properties which do not vary significantly with the removal of one or a few of the units. A molecule is regarded as having an intermediate molecular mass if it has properties which do vary significantly with the removal of one or a few of the units.

According to the present invention a homopolymer is a polymer derived from one species of (real, implicit, or hypothetical) monomer. Many polymers are made by the mutual reaction of complementary monomers. These monomers can readily be visualized as reacting to give an "implicit monomer", the homopolymerisation of which would give the actual product, which can be regarded as a homopolymer. Some polymers are obtained by chemical modification of other polymers, such that the structure of the macromolecules that constitute the resulting polymer can be thought of having been formed by the homopolymerisation of a hypothetical monomer.

Accordingly a copolymer is a polymer derived from more than one species of monomer, e.g. bipolymer, terpolymer, quaterpolymer, etc.

The oligomers of this invention have a weight average molecular weight of <2,000 Daltons. The polymers of this invention preferably have a weight average molecular weight of 2,000 Daltons or greater, especially 2,000 to 250,000 Daltons, more preferably 10,000 to 250,000 and most preferably 20,000 to 200,000 Daltons. Molecular weights are determined according to gel permeation chromatography using polystyrene standards and/or light scattering detectors.

A further embodiment of the present invention is represented by the compounds (monomers) of the formula

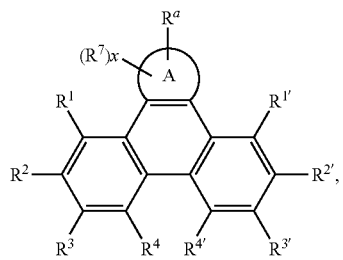
(I')

wherein x, A, $R^a$, $R^1$, $R^2$, $R^3$, $R^4$, $R^{1'}$, $R^{2'}$, $R^{3'}$, $R^{4'}$ and $R^7$ are as defined above, at least one of $R^a$, $R^1$, $R^2$, $R^3$, $R^4$, $R^{1'}$, $R^{2'}$, $R^{3'}$ and $R^{4'}$ is a group $R^{10'}$, wherein $R^{10'}$ is a group $-(Sp)_{x1}-[PG]<$, wherein Sp is a spacer unit, PG is a polymerisable group, x1 is 0, or 1, and x is 0, or an integer of 1 to 5, with the proviso that the following compounds are excluded:

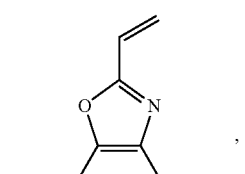

,

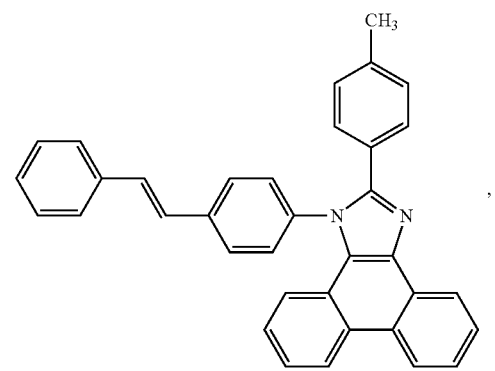

,

-continued

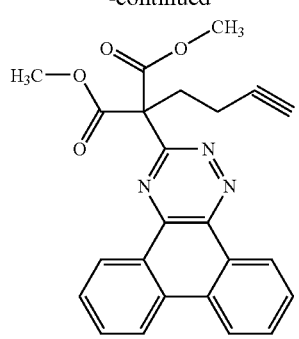

,

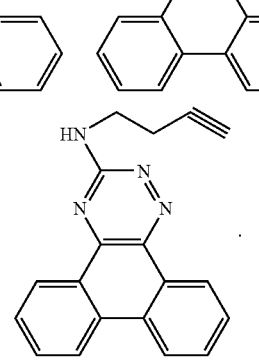

, and

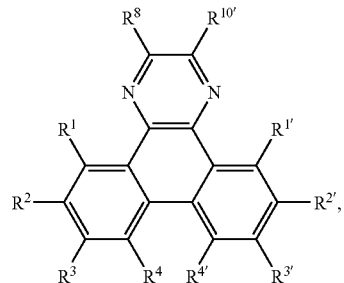

Compounds of the formula

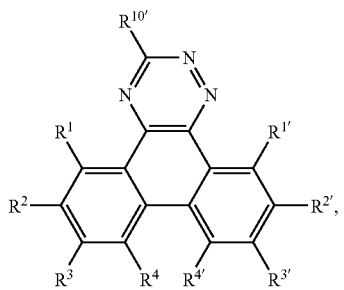

(X')

(XI')

US 8,138,303 B2
-continued
(XII′)
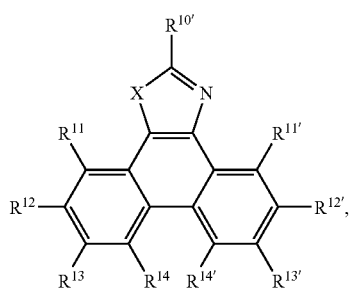
(XIII′)
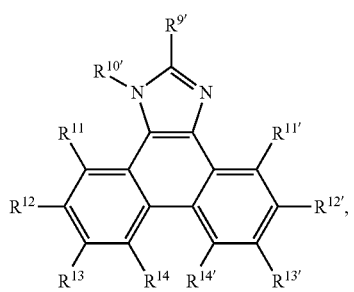
(XIV′)
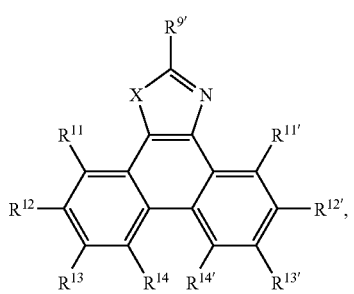
(XV′)
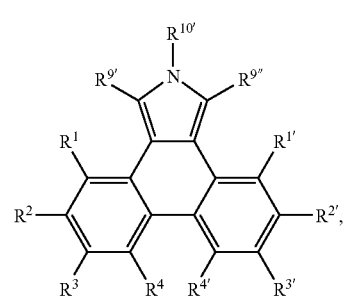
(XVI′)
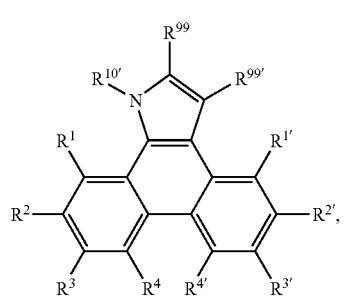
-continued
(XVII′)
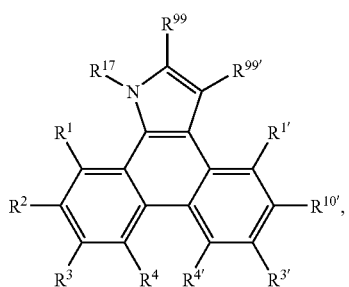
(XVIII′)
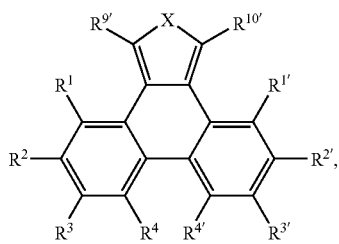
(XIX′)
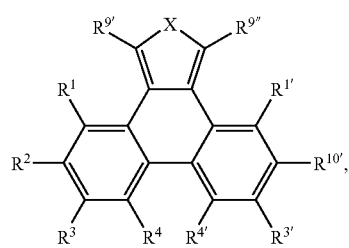
(XX′)
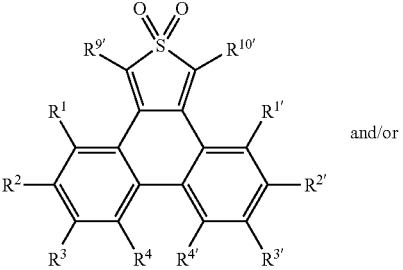
and/or
(XXI′)
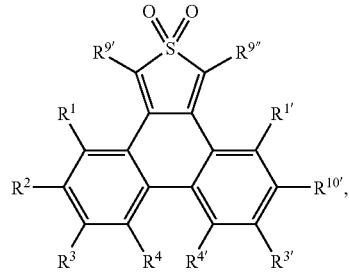
wherein
X, $R^1$, $R^{1'}$, $R^2$, $R^3$, $R^4$, $R^{2'}$, $R^{3'}$, $R^{4'}$, $R^8$, $R^9$, $R^{9''}$, $R^{99}$, $R^{99'}$, $R^{17}$, $R^{11}$, $R^{11'}$, $R^{12}$, $R^{13}$, $R^{14}$, $R^{12'}$, $R^{13'}$ and $R^{14'}$ are as defined above, $R^{10'}$ is a group -(Sp)$_{x1}$-[PG], wherein Sp is a spacer unit, PG is a polymerisable group, and x1 is 0, or 1, or $R^8$ and $R^{10''}$ together form a group

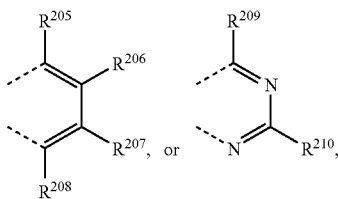

wherein one of the substituents $R^{205}$, $R^{206}$, $R^{207}$ and $R^{208}$, and one of the substituents $R^{208}$ and $R^{210}$ is a group $R^{10'}$ and the other substituents are independently of each other H, $C_1$-$C_{18}$alkyl, $C_1$-$C_{18}$alkyl which is substituted by E and/or interrupted by D, $C_1$-$C_{18}$alkoxy, or $C_1$-$C_{18}$alkoxy which is substituted by E and/or interrupted by D, with the proviso that in case of the compound of the formula XIV at least one of the substituents $R^{12}$, $R^{13}$, $R^{12'}$ and $R^{13'}$ is a group $R^{10'}$.

Sp is preferably selected from —Ar—, —ArY—, —YAr—, —YAr($CR^{47}R^{48}$)$_n$—, —ArY($CR^{47}R^{48}$)$_n$Ar—, —ArY($CR^{47}R^{48}$)$_n$—, —($CR^{47}R^{48}$)$_n$—, —(Y$CR^{47}R^{48}$)$_n$—, or —($CR^{47}R^{48}$Y)$_n$—, wherein Y is $NR^5$, O, S, C=O, C(=O)O, wherein $R^5$ is H; $C_6$-$C_{18}$aryl; $C_6$-$C_{18}$aryl which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—;

$R^{47}$ and $R^{48}$ are independently of each other hydrogen, fluorine, or $C_1$-$C_{20}$alkyl, n is an integer of 1 to 20, Ar is alkylen, cycloalkylen, arylen, aralkylene, or heteroarylen, which can optionally be substituted.

PG is a polymerisable group and is preferably selected from —C($R^{44}$)=$CH_2$, —NHC(O)—C($R^{45}$)=$CH_2$, —O$CH_2CH_2$OC(O)—C($R^{45}$)=$CH_2$, —OC(O)—C($R^{45}$)=$CH_2$, —C(O)—C($R^{46}$)=$CH_2$, —C≡C—, —N=C, —O—CH($CH_2CH_2$CH=$CH_2$)$_2$; $C_5$-$C_8$cycloalkenyl, bicycloalkenyl (a substituted or unsubstituted bicycloalkenyl group having 5 to 30 carbon atoms),

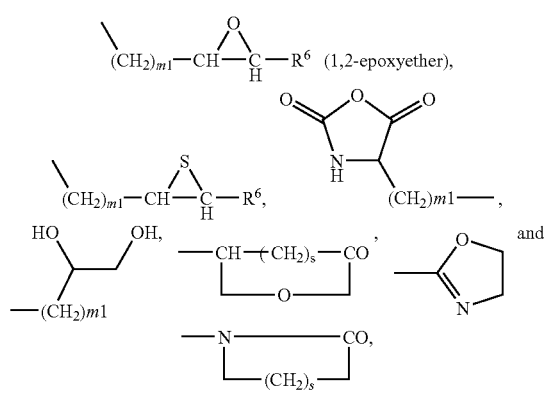

wherein s is an integer from 1 to 6, m1 is an integer from 1 to 6, $R^6$ is hydrogen, or $C_1$-$C_{20}$alkyl, $R^{44}$ is hydrogen, or $C_1$-$C_4$alkyl, or halogen, $R^{45}$ is hydrogen, $C_1$-$C_4$alkyl, or halogen, and $R^{46}$ is hydrogen, $C_1$-$C_4$alkyl, or $C_6$-$C_{12}$aryl, or PG is a polymerisable group

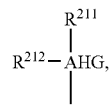

wherein

AHG is an aromatic, or heteroaromatic residue, which can optionally be substituted, such as

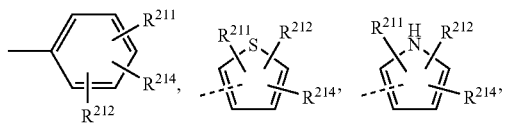

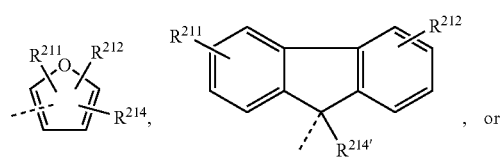

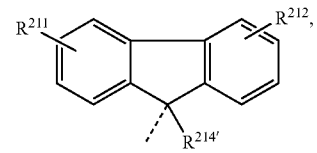

$R^{211}$ and $R^{212}$ are independently of each other halogen, —C≡CH, boronic acid, or boronic esters, —Mg-Hal, —Zn-Hal, —Sn($R^{213}$)$_3$, wherein Hal is halogen, and $R^{213}$ is $C_1$-$C_{18}$alkyl, $R^{214}$ and $R^{214'}$ are independently of each other H, $C_1$-$C_{18}$alkyl, $C_1$-$C_{18}$alkyl which is interrupted by D, $C_1$-$C_{18}$perfluoroalkyl, $C_1$-$C_{18}$alkoxy, $C_1$-$C_{18}$alkoxy which is interrupted by D, or $C_7$-$C_{25}$aralkyl.

Monomers are preferred, wherein at least one of the substituents $R^3$, $R^{3'}$, $R^{13}$, $R^{13'}$, $R^8$ and/or $R^{9'}$ and $R^{10}$ are different from a hydrogen atom and are in particular a solubilizing substituent which is especially selected from $C_6$-$C_{18}$aryl, which can be substituted by G, $C_2$-$C_{18}$heteroaryl, which can be substituted by G, $C_1$-$C_{18}$alkyl, $C_1$-$C_{18}$alkyl which is interrupted by D, $C_1$-$C_{18}$perfluoroalkyl, $C_1$-$C_{18}$alkoxy, or $C_1$-$C_{18}$alkoxy which is substituted by E and/or interrupted by D.

$R^{17}$ is preferably different from a hydrogen atom and is very especially $C_1$-$C_{18}$alkyl, or $C_1$-$C_{18}$alkyl which is interrupted by D.

In particular $R^8$, $R^{9'}$ and/or $R^{17}$ are a solubilizing substituent and are in particular selected from $C_6$-$C_{18}$aryl, which can be substituted by G, $C_2$-$C_{18}$heteroaryl, which can be substituted by G, $C_1$-$C_{18}$alkyl, $C_1$-$C_{18}$alkyl which is interrupted by D, $C_1$-$C_{18}$perfluoroalkyl, $C_1$-$C_{18}$alkoxy, or $C_1$-$C_{18}$alkoxy which is substituted by E and/or interrupted by D.

Halogen is fluorine, chlorine, bromine and iodine.

Conjugated polymers can be obtained by using monomers having —≡ groups, such as

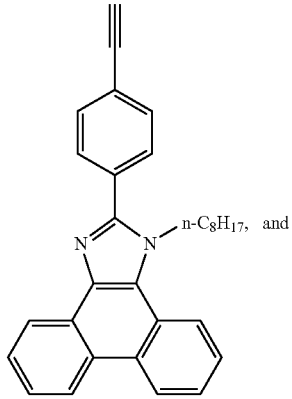

and

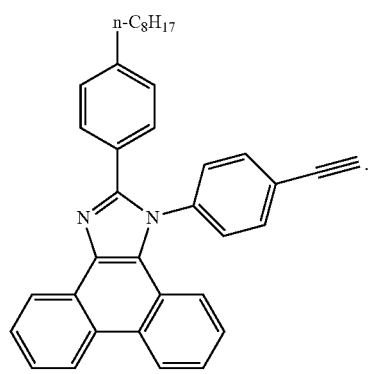

The actual preparation of polymers is known from the state of the art (described, inter alia, in Houben-Weyl "Methoden der Organischen Chemie", "Makromolekulare Stoffe", Vol. E20, parts 1-3 (1986, 1987).

Possible polymerisation methods and suitable compounds therefore are listed below:

a) Radical Polymerisation:

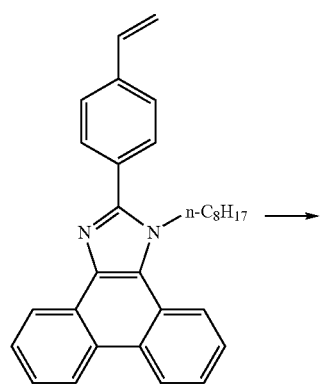
⟶

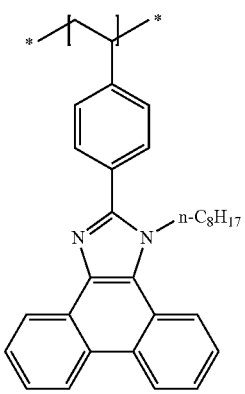

If the monomers of formula I' contain —CH=CH$_2$—, acrylate or methacrylate groups, the polymerisation can be carried out e.g. photochemically, one of the customary photoinitiators (see e.g. "Chemistry & Technology of UV & EB Formulations for Coatings, Inks and Paints, Vol. 3: Photoinitiators for Free Radical and Cationic Polymerization" 1991, p. 1115-325) usually being added to the reaction mixture in an amount in the range from typically 0.5 to 5% by weight, based on the sum of all monomers used.

Examples of additional particularly suitable monomers are shown below:

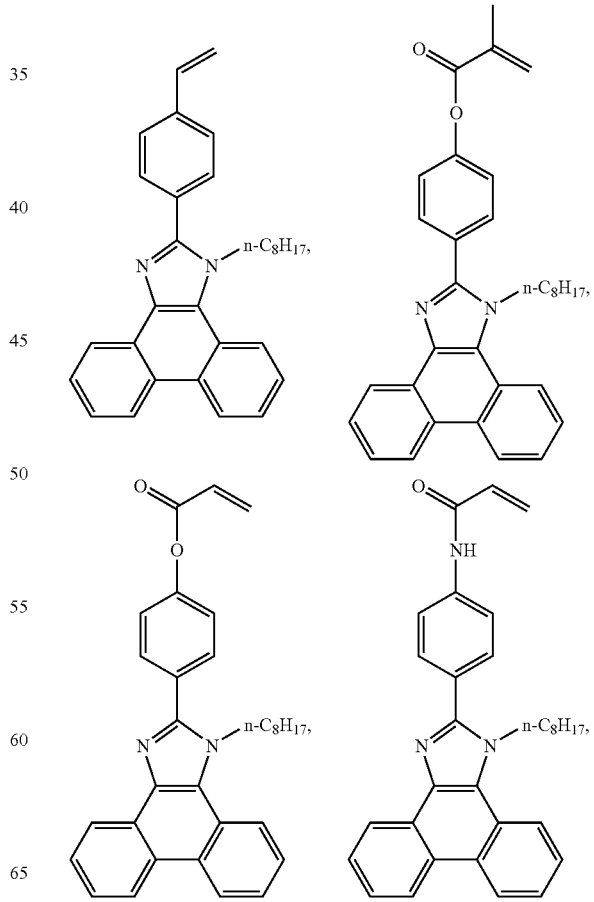

-continued
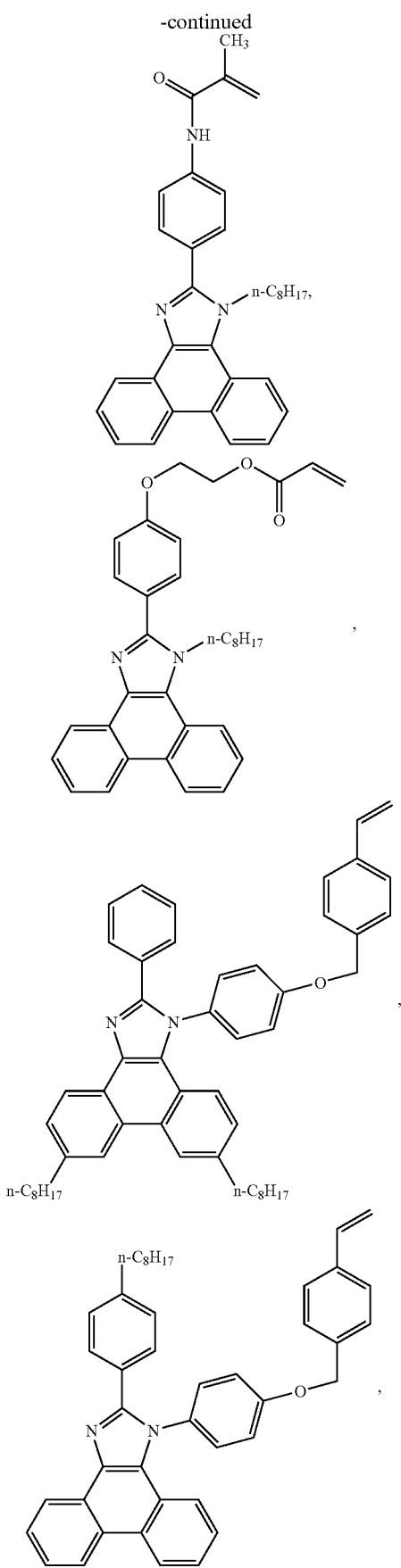
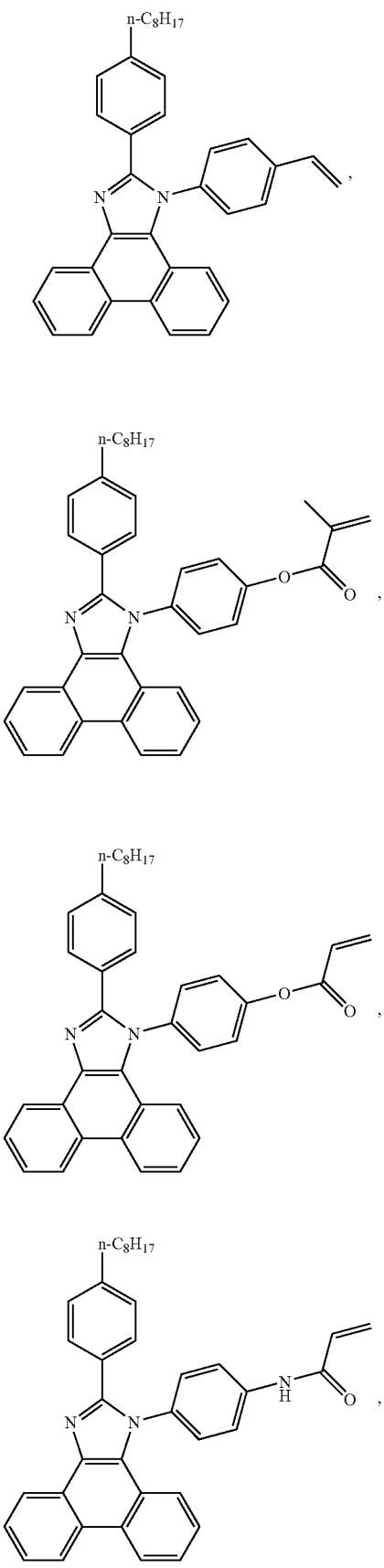

-continued
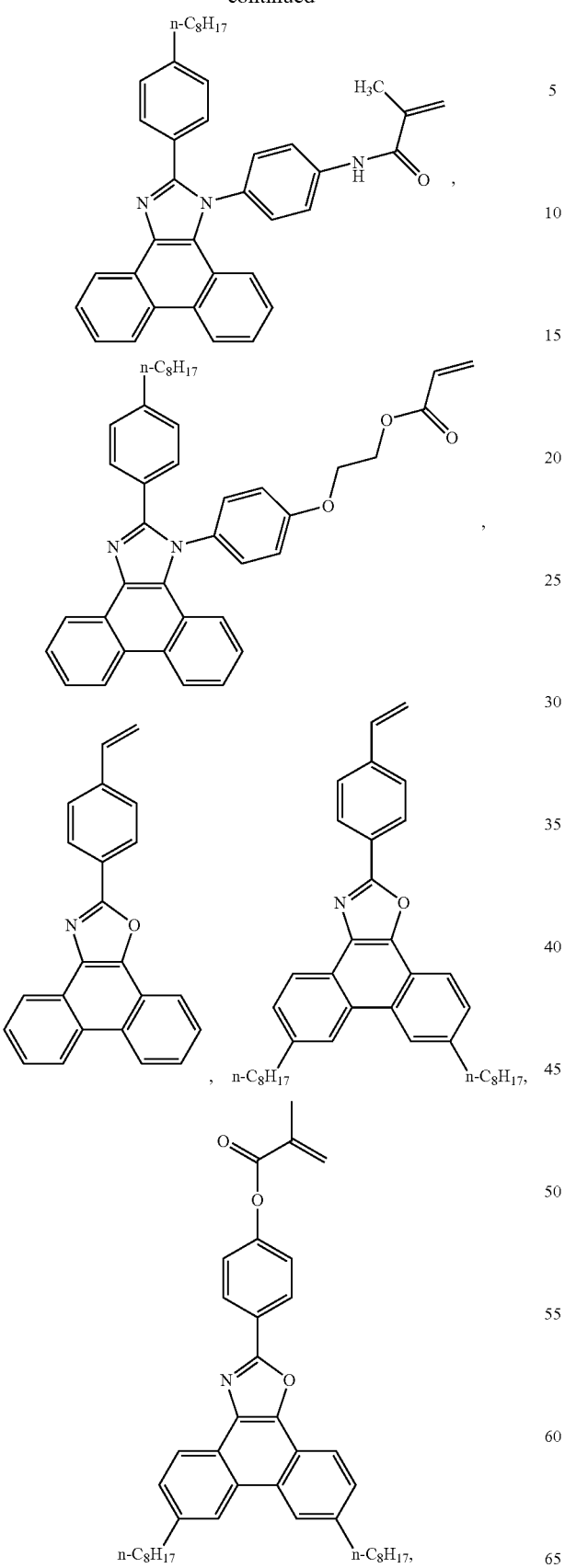
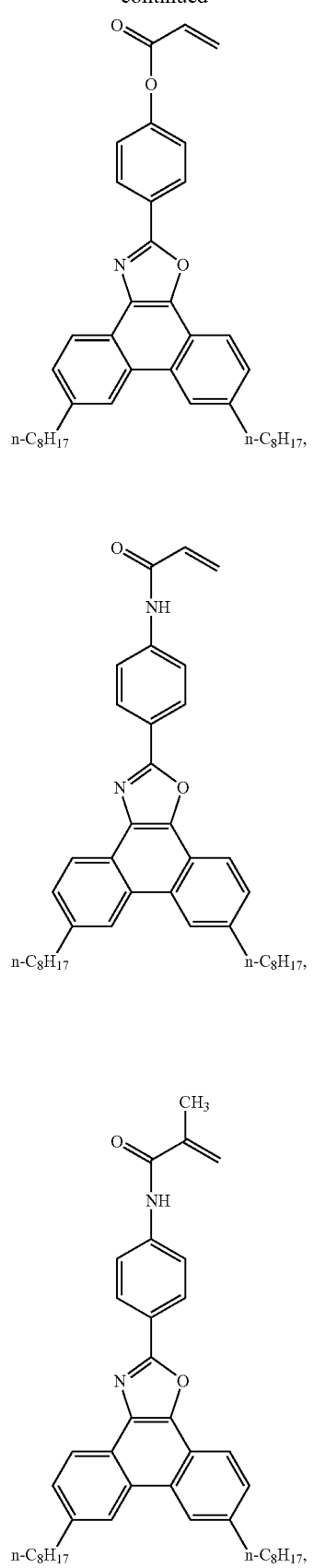

-continued
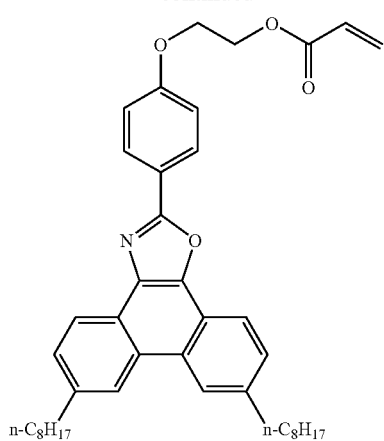
b) Epoxy Polymerisation:
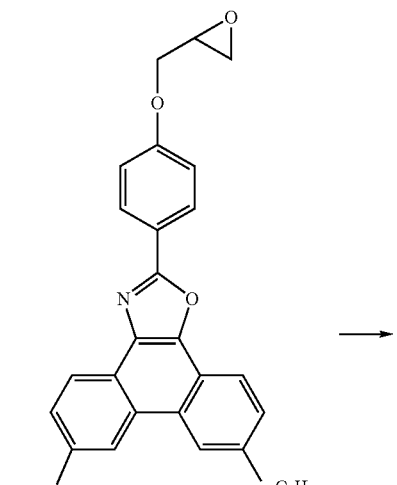
→
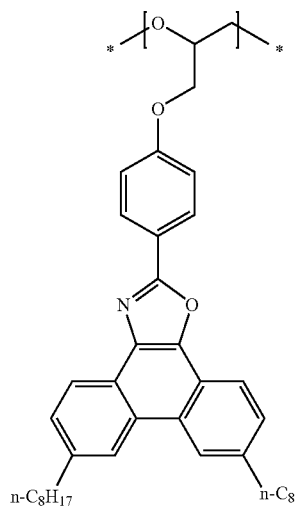
Examples of additional particularly suitable monomers are shown below:
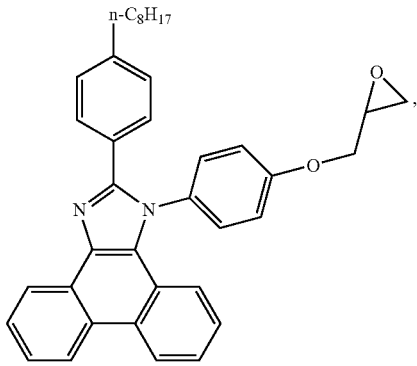
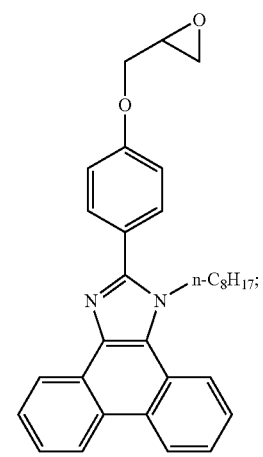
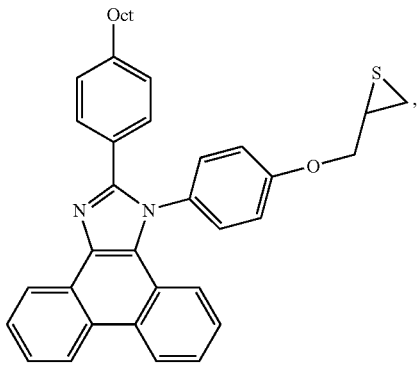

-continued
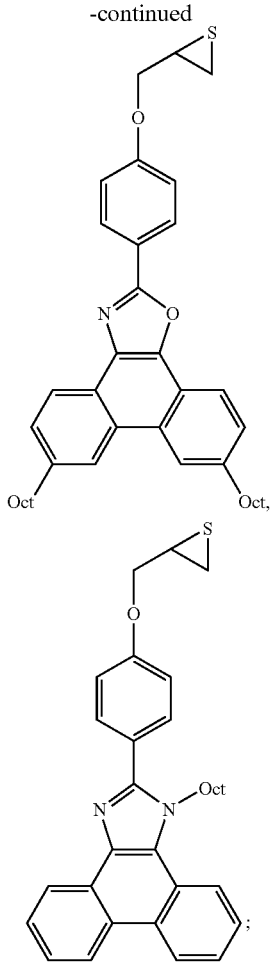
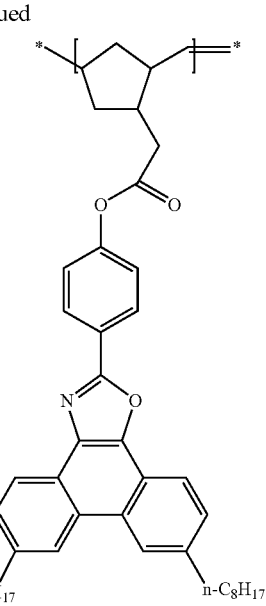
Examples of additional particularly suitable monomers are shown below:
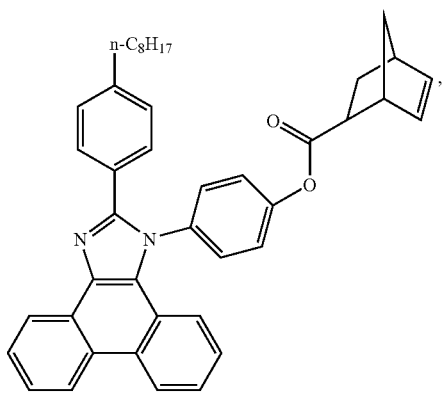
c) Various Metathesis Reactions are Described in Ivin, K. J. and Mol, J. C., Olefin Metathesis and Metathesis Polymerization (Academic Press 1997).
ROMP (Ring Opening Metathesis Polymerisation):
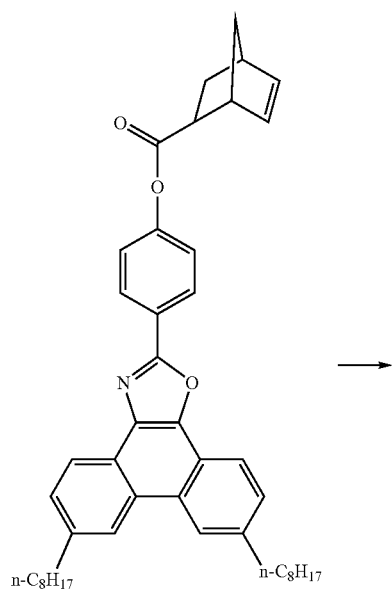
→
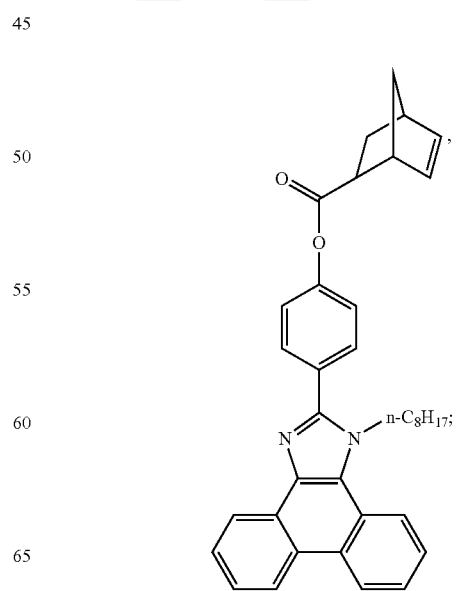

-continued
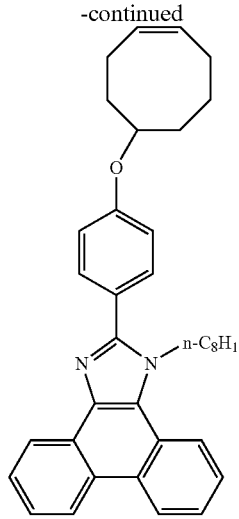
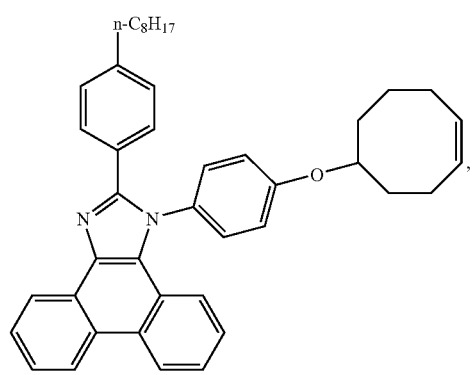
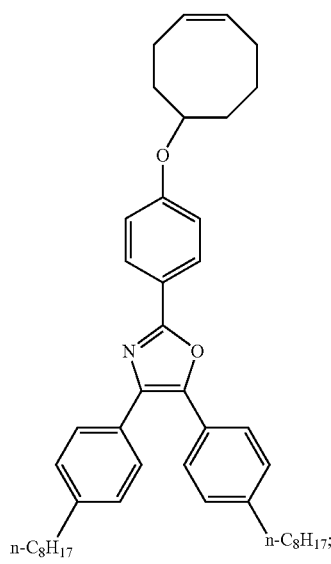
ADMET (Acyclic Diene Olefin Metathesis):
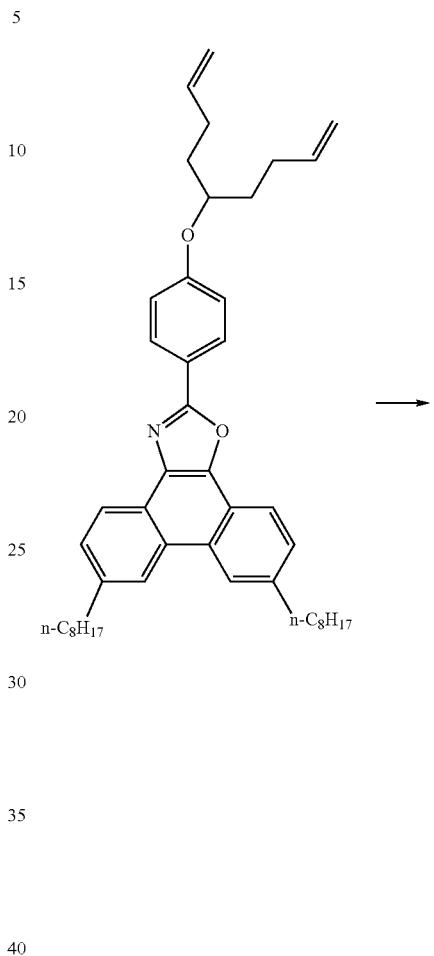

Examples of additional particularly suitable monomers are shown below:

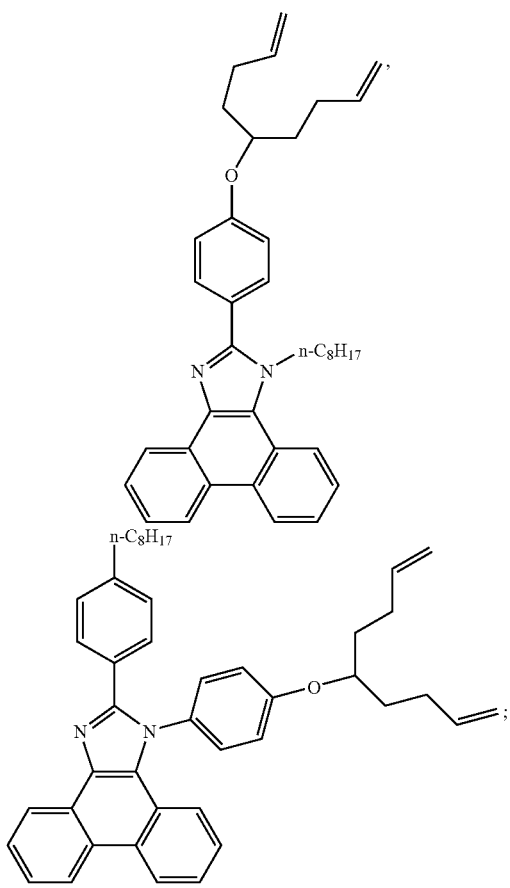

d) Hydrosilylation:

The hydrosilylation can be initiated by UV radiation and can be catalysed by radical formers, transition metal complexes, or Lewis bases. Examples of hydrosilylation catalysts are $H_2PtCl_6$, $RhCl(PPh_3)_3$ or trans-$IrCl(CO)(PPh_3)_2$.

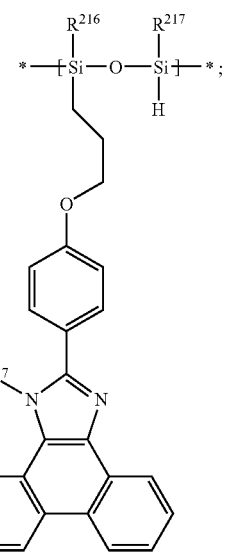

wherein $R^{216}$ and $R^{217}$ are independently of each other a $C_1$-$C_8$alkyl group, a $C_6$-$C_{24}$aryl group or a $C_7$-$C_{12}$aralkyl group.

Progress in Polymer Science 28 (2003) 1297-1353:

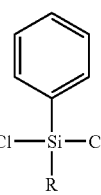

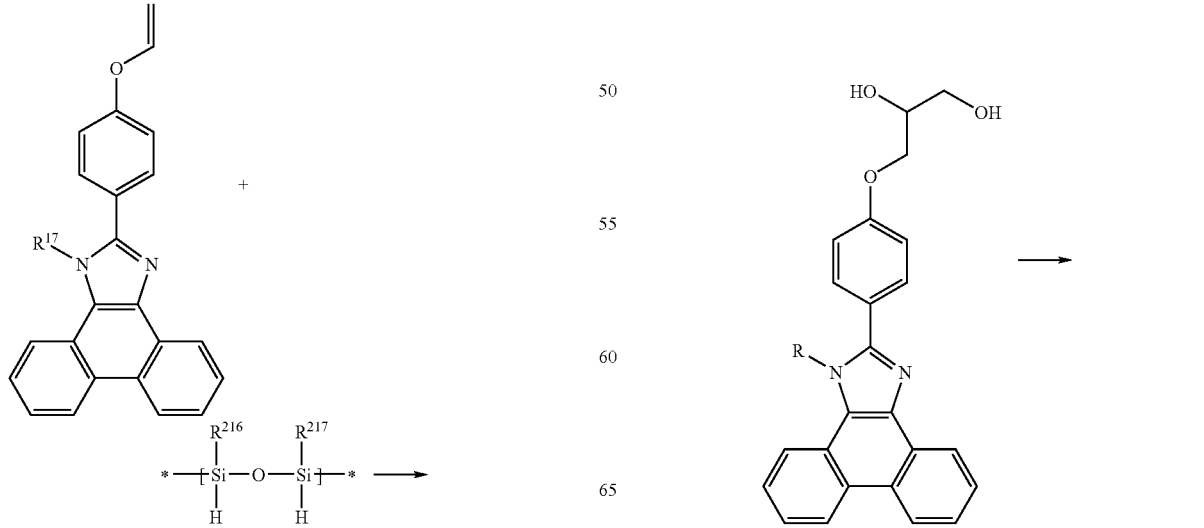

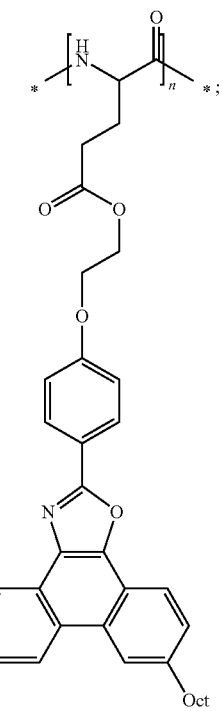
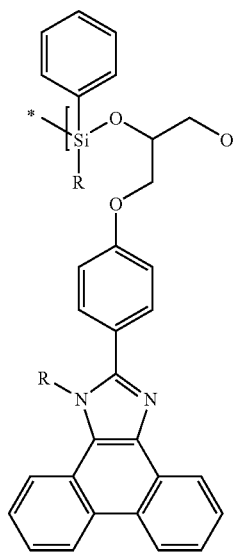
Journal of Polymer Science: Part A, vol. 41 (2003) 1167-1187:
Examples of additional particularly suitable monomers are shown below:
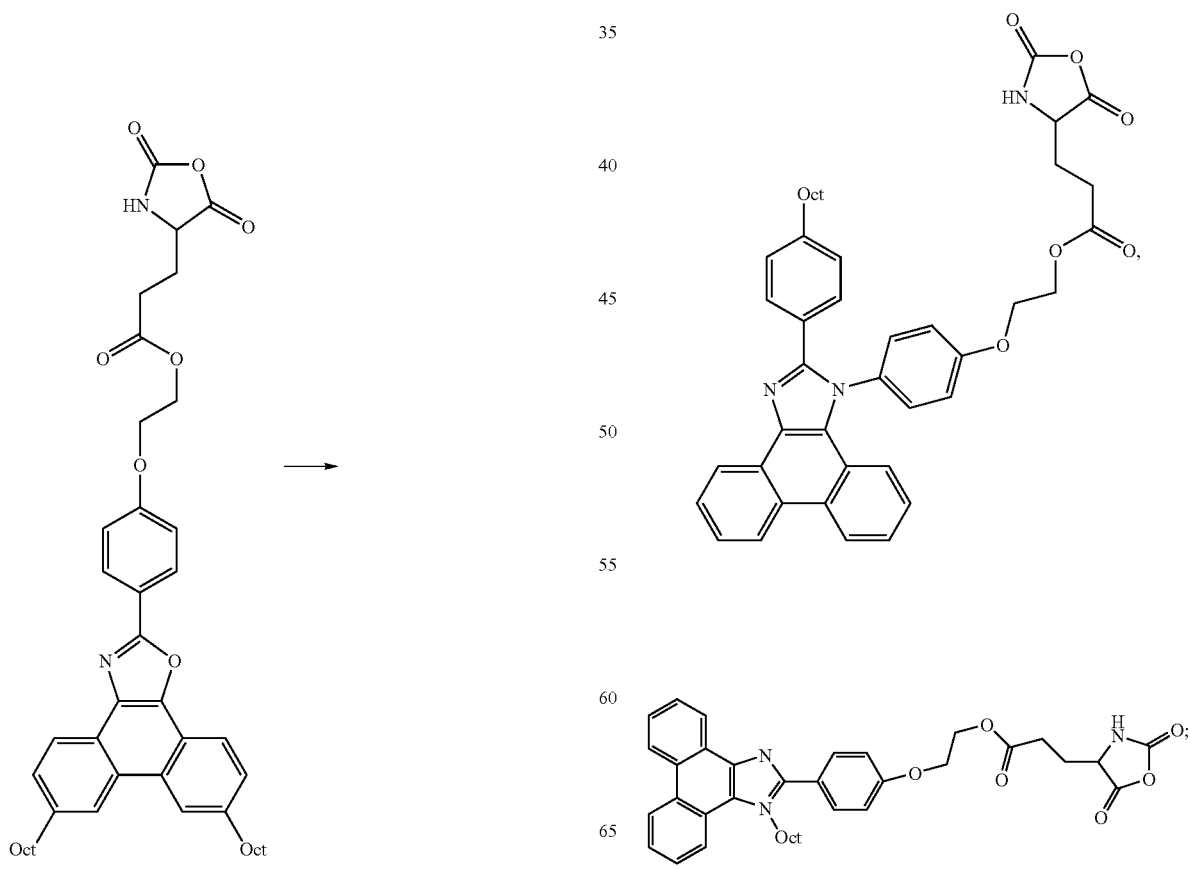

-continued

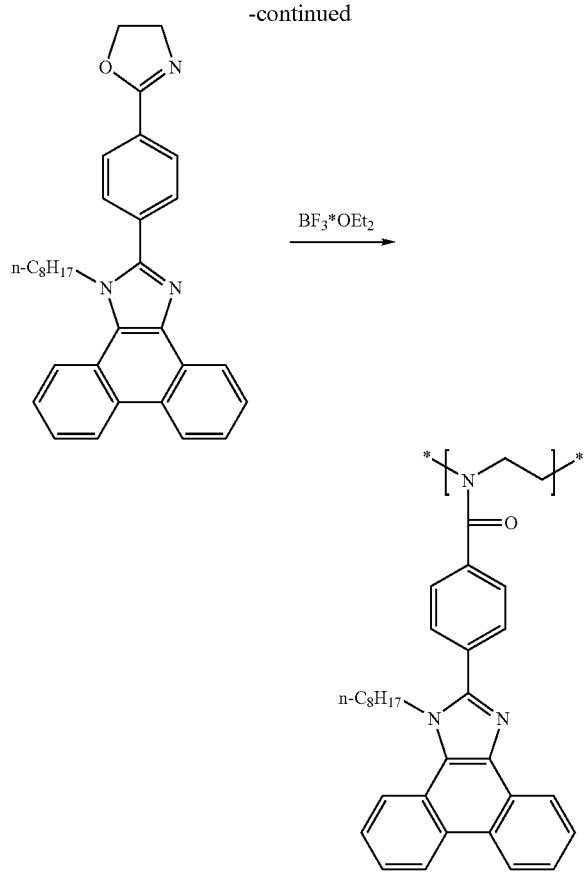

$C_1$-$C_{25}$alkyl is typically linear or branched, where possible. Examples are methyl, ethyl, n-propyl, isopropyl, n-butyl, sec.-butyl, isobutyl, tert.-butyl, n-pentyl, 2-pentyl, 3-pentyl, 2,2-dimethylpropyl, 1,1,3,3-tetramethylpentyl, n-hexyl, 1-methylhexyl, 1,1,3,3,5,5-hexamethylhexyl, n-heptyl, isoheptyl, 1,1,3,3-tetramethylbutyl, 1-methylheptyl, 3-methylheptyl, n-octyl, 1,1,3,3-tetramethylbutyl and 2-ethylhexyl, n-nonyl, decyl, undecyl, dodecyl, tridecyl, tetradecyl, pentadecyl, hexadecyl, heptadecyl, octadecyl, eicosyl, heneicosyl, docosyl, tetracosyl or pentacosyl. $C_1$-$C_8$alkyl is typically methyl, ethyl, n-propyl, isopropyl, n-butyl, sec.-butyl, isobutyl, tert.-butyl, n-pentyl, 2-pentyl, 3-pentyl, 2,2-dimethylpropyl, n-hexyl, n-heptyl, n-octyl, 1,1,3,3-tetramethylbutyl and 2-ethylhexyl. $C_1$-$C_4$alkyl is typically methyl, ethyl, n-propyl, isopropyl, n-butyl, sec.-butyl, isobutyl, tert.-butyl.

$C_1$-$C_{25}$alkoxy groups are straight-chain or branched alkoxy groups, e.g. methoxy, ethoxy, n-propoxy, isopropoxy, n-butoxy, sec-butoxy, tert-butoxy, amyloxy, isoamyloxy or tert-amyloxy, heptyloxy, octyloxy, isooctyloxy, nonyloxy, decyloxy, undecyloxy, dodecyloxy, tetradecyloxy, pentadecyloxy, hexadecyloxy, heptadecyloxy and octadecyloxy. Examples of $C_1$-$C_8$alkoxy are methoxy, ethoxy, n-propoxy, isopropoxy, n-butoxy, sec.-butoxy, isobutoxy, tert.-butoxy, n-pentyloxy, 2-pentyloxy, 3-pentyloxy, 2,2-dimethylpropoxy, n-hexyloxy, n-heptyloxy, n-octyloxy, 1,1,3,3-tetramethylbutoxy and 2-ethylhexyloxy, preferably $C_1$-$C_4$alkoxy such as typically methoxy, ethoxy, n-propoxy, isopropoxy, n-butoxy, sec.-butoxy, isobutoxy, tert.-butoxy. The term "alkylthio group" means the same groups as the alkoxy groups, except that the oxygen atom of the ether linkage is replaced by a sulfur atom.

$C_2$-$C_{25}$alkenyl groups are straight-chain or branched alkenyl groups, such as e.g. vinyl, allyl, methallyl, isopropenyl, 2-butenyl, 3-butenyl, isobutenyl, n-penta-2,4-dienyl, 3-methyl-but-2-enyl, n-oct-2-enyl, n-dodec-2-enyl, isododecenyl, n-dodec-2-enyl or n-octadec-4-enyl.

$C_{2-24}$alkynyl is straight-chain or branched and preferably $C_{2-8}$alkynyl, which may be unsubstituted or substituted, such as, for example, ethynyl, 1-propyn-3-yl, 1-butyn-4-yl, 1-pentyn-5-yl, 2-methyl-3-butyn-2-yl, 1,4-pentadiyn-3-yl, 1,3-pentadiyn-5-yl, 1-hexyn-6-yl, cis-3-methyl-2-penten-4-yn-1-yl, trans-3-methyl-2-penten-4-yn-1-yl, 1,3-hexadiyn-5-yl, 1-octyn-8-yl, 1-nonyn-9-yl, 1-decyn-10-yl, or 1-tetracosyn-24-yl.

$C_1$-$C_{18}$perfluoroalkyl, especially $C_1$-$C_4$perfluoroalkyl, is a branched or unbranched radical such as for example —$CF_3$, —$CF_2CF_3$, —$CF_2CF_2CF_3$, —$CF(CF_3)_2$, —$(CF_2)_3CF_3$, and —$C(CF_3)_3$.

The terms "haloalkyl, haloalkenyl and haloalkynyl" mean groups given by partially or wholly substituting the above-mentioned alkyl group, alkenyl group and alkynyl group with halogen, such as trifluoromethyl etc. The "aldehyde group, ketone group, ester group, carbamoyl group and amino group" include those substituted by an alkyl group, a cycloalkyl group, an aryl group, an aralkyl group or a heterocyclic group, wherein the alkyl group, the cycloalkyl group, the aryl group, the aralkyl group and the heterocyclic group may be unsubstituted or substituted. The term "silyl group" means a group of formula —$SiR^{62}R^{63}R^{64}$, wherein $R^{62}$, $R^{63}$ and $R^{64}$ are independently of each other a $C_1$-$C_8$alkyl group, in particular a $C_1$-$C_4$ alkyl group, a $C_6$-$C_{24}$aryl group or a $C_7$-$C_{12}$aralkyl group, such as a trimethylsilyl group. The term "siloxanyl group" means a group of formula —O—$SiR^{62}R^{63}R^{64}$, wherein $R^{62}$, $R^{63}$ and $R^{64}$ are as defined above, such as a trimethylsiloxanyl group.

The term "cycloalkyl group" is typically $C_5$-$C_{12}$cycloalkyl, such as cyclopentyl, cyclohexyl, cycloheptyl, cyclooctyl, cyclononyl, cyclodecyl, cycloundecyl, cyclododecyl, preferably cyclopentyl, cyclohexyl, cycloheptyl, or cyclooctyl, which may be unsubstituted or substituted. The term "cycloalkenyl group" means an unsaturated alicyclic hydrocarbon group containing one or more double bonds, such as cyclopentenyl, cyclopentadienyl, cyclohexenyl and the like, which may be unsubstituted or substituted. The cycloalkyl group, in particular a cyclohexyl group, can be condensed one or two times by phenyl which can be substituted one to three times with $C_1$-$C_4$-alkyl, halogen and cyano. Examples of such condensed cyclohexyl groups are

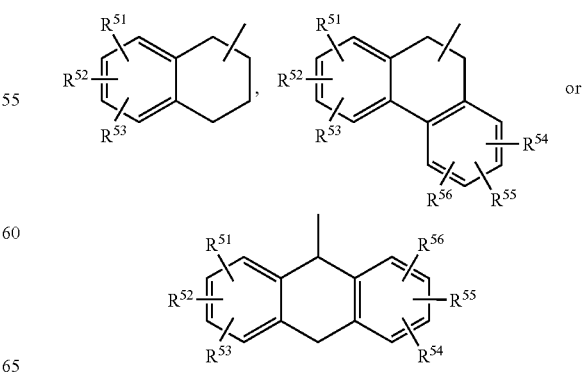

or in particular

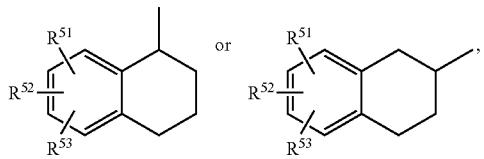

wherein $R^{51}$, $R^{52}$, $R^{53}$, $R^{54}$, $R^{55}$ and $R^{56}$ are independently of each other $C_1$-$C_8$-alkyl, $C_1$-$C_8$-alkoxy, halogen and cyano, in particular hydrogen.

Aryl is usually $C_6$-$C_{30}$aryl, preferably $C_6$-$C_{24}$aryl, which optionally can be substituted, such as, for example, phenyl, 4-methylphenyl, 4-methoxyphenyl, naphthyl, especially 1-naphthyl, or 2-naphthyl, biphenylyl, terphenylyl, pyrenyl, 2- or 9-fluorenyl, phenanthryl, anthryl, tetracyl, pentacyl, hexacyl, or quaderphenylyl, which may be unsubstituted or substituted.

The term "aralkyl group" is typically $C_7$-$C_{24}$aralkyl, such as benzyl, 2-benzyl-2-propyl, β-phenyl-ethyl, α,α-dimethylbenzyl, ω-phenyl-butyl, ω,ω-dimethyl-ω-phenyl-butyl, ω-phenyl-dodecyl, ω-phenyl-octadecyl, ω-phenyl-eicosyl or ω-phenyl-docosyl, preferably $C_7$-$C_{18}$aralkyl such as benzyl, 2-benzyl-2-propyl, β-phenyl-ethyl, α,α-dimethylbenzyl, ω-phenyl-butyl, ω,ω-dimethyl-ω-phenyl-butyl, ω-phenyl-dodecyl or ω-phenyl-octadecyl, and particularly preferred $C_7$-$C_{12}$aralkyl such as benzyl, 2-benzyl-2-propyl, β-phenyl-ethyl, α,α-dimethylbenzyl, ω-phenyl-butyl, or ω,ω-dimethyl-ω-phenyl-butyl, in which both the aliphatic hydrocarbon group and aromatic hydrocarbon group may be unsubstituted or substituted.

The term "aryl ether group" is typically a $C_{6-24}$aryloxy group, that is to say O—$C_{6-24}$aryl, such as, for example, phenoxy or 4-methoxyphenyl. The term "aryl thioether group" is typically a $C_{6-24}$arylthio group, that is to say S—$C_{6-24}$aryl, such as, for example, phenylthio or 4-methoxyphenylthio. The term "carbamoyl group" is typically a $C_{1-18}$carbamoyl radical, preferably $C_{1-8}$carbamoyl radical, which may be unsubstituted or substituted, such as, for example, carbamoyl, methylcarbamoyl, ethylcarbamoyl, n-butylcarbamoyl, tert-butylcarbamoyl, dimethylcarbamoyloxy, morpholinocarbamoyl or pyrrolidinocarbamoyl.

The terms "aryl" and "alkyl" in alkylamino groups, dialkylamino groups, alkylarylamino groups, arylamino groups and diaryl groups are typically $C_1$-$C_{25}$alkyl and $C_6$-$C_{24}$aryl, respectively.

Alkylaryl refers to alkyl-substituted aryl radicals, especially $C_7$-$C_{12}$alkylaryl. Examples are tolyl, such as 3-methyl-, or 4-methylphenyl, or xylyl, such as 3,4-dimethylphenyl, or 3,5-dimethylphenyl.

Heteroaryl is typically $C_2$-$C_{26}$heteroaryl, i.e. a ring with five to seven ring atoms or a condensed ring system, wherein nitrogen, oxygen or sulfur are the possible hetero atoms, and is typically an unsaturated heterocyclic group with five to 30 atoms having at least six conjugated π-electrons such as thienyl, benzo[b]thienyl, dibenzo[b,d]thienyl, thianthrenyl, furyl, furfuryl, 2H-pyranyl, benzofuranyl, isobenzofuranyl, dibenzofuranyl, phenoxythienyl, pyrrolyl, imidazolyl, pyrazolyl, pyridyl, bipyridyl, triazinyl, pyrimidinyl, pyrazinyl, pyridazinyl, indolizinyl, isoindolyl, indolyl, indazolyl, purinyl, quinolizinyl, chinolyl, isochinolyl, phthalazinyl, naphthyridinyl, chinoxalinyl, chinazolinyl, cinnolinyl, pteridinyl, carbazolyl, carbolinyl, benzotriazolyl, benzoxazolyl, phenanthridinyl, acridinyl, pyrimidinyl, phenanthrolinyl, phenazinyl, isothiazolyl, phenothiazinyl, isoxazolyl, furazanyl or phenoxazinyl, which can be unsubstituted or substituted.

Examples of a five or six membered ring formed by, for example, $R^{16}$ and $R^{17}$, or $R^{65}$ and $R^{66}$, respectively are heterocycloalkanes or heterocycloalkenes having from 3 to 5 carbon atoms which can have one additional hetero atom selected from nitrogen, oxygen and sulfur, for example

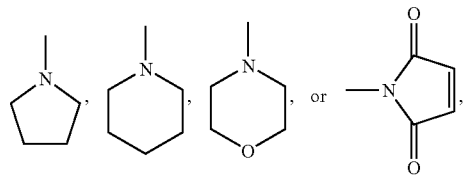

which can be part of a bicyclic system, for example

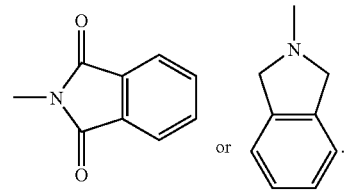

Possible substituents of the above-mentioned groups are $C_1$-$C_8$alkyl, a hydroxyl group, a mercapto group, $C_1$-$C_8$alkoxy, $C_1$-$C_8$alkylthio, halogen, halo-$C_1$-$C_8$alkyl, a cyano group, an aldehyde group, a ketone group, a carboxyl group, an ester group, a carbamoyl group, an amino group, a nitro group or a silyl group.

If a substituent, such as, for example $R^7$ occurs more than one time in a group, it can be different in each occurrence.

The wording "substituted by G" means that one, or more, especially one to three substituents G might be present.

As described above, the aforementioned groups may be substituted by E and/or, if desired, interrupted by D. Interruptions are of course possible only in the case of groups containing at least 2 carbon atoms connected to one another by single bonds; $C_6$-$C_{18}$aryl is not interrupted; interrupted arylalkyl or alkylaryl contains the unit D in the alkyl moiety. $C_1$-$C_{18}$alkyl substituted by one or more E and/or interrupted by one or more units D is, for example, $(CH_2CH_2O)_{1-9}$—$R^x$, where $R^x$ is H or $C_1$-$C_{10}$alkyl or $C_2$-$C_{10}$alkanoyl (e.g. CO—CH($C_2H_5$)$C_4H_9$), $CH_2$—CH(O$R^{y\prime}$)—$CH_2$—O—$R^y$, where $R^y$ is $C_1$-$C_{18}$alkyl, $C_5$-$C_{12}$cycloalkyl, phenyl, $C_7$-$C_{15}$-phenylalkyl, and $R^{y\prime}$ embraces the same definitions as $R^y$ or is H;

$C_1$-$C_8$alkylene-COO—$R^z$, e.g. $CH_2COOR_z$, $CH(CH_3)$CO-OR$^z$, $C(CH_3)_2COOR^z$, where $R^z$ is H, $C_1$-$C_{18}$alkyl, $(CH_2CH_2O)_{1-9}$—$R^x$, and $R^x$ embraces the definitions indicated above;

$CH_2CH_2$—O—CO—CH=$CH_2$; $CH_2CH(OH)CH_2$—O—CO—C($CH_3$)=$CH_2$.

Preferred arylene radicals are 1,4-phenylene, 2,5-tolylene, 1,4-naphthylene, 1,9 anthracylene, 2,7-phenanthrylene and 2,7-dihydrophenanthrylene.

Preferred heteroarylene radicals are 2,5-pyrazinylene, 3,6-pyridazinylene, 2,5-pyridinylene, 2,5-pyrimidinylene, 1,3,4-thiadiazol-2,5-ylene, 1,3-thiazol-2,4-ylene, 1,3-thiazol-2,5-ylene, 2,4-thiophenylene, 2,5-thiophenylene, 1,3-oxazol-2,4- ylene, 1,3-oxazol-2,5-ylene and 1,3,4-oxadiazol-2,5-ylene, 2,5-indenylene and 2,6-indenylene.

The term "alkylene (spacer)" is typically $C_1$-$C_{30}$alkylene, preferably $C_1$-$C_{18}$alkylene, and embraces the linear as well as the branched representatives and can be, for example, —CH$_2$— and $C_2$-$C_{30}$alkylene, such as —(CH$_2$)$_2$—, —CH(Me)-, —(CH$_2$)$_3$—, —CH$_2$—CH(Me)-, —C(Me)$_2$-, —(CH$_2$)$_4$—, —(CH$_2$)$_5$—, —(CH$_2$)$_6$—, —(CH$_2$)$_7$—, —(CH$_2$)$_8$—, —(CH$_2$)$_9$—, —(CH$_2$)$_{10}$—, —(CH$_2$)$_{11}$—, —(CH$_2$)$_{12}$—, —(CH$_2$)$_{13}$—, —(CH$_2$)$_{14}$—, —(CH$_2$)$_{15}$—, —(CH$_2$)$_{16}$—, —(CH$_2$)$_{17}$—, —(CH$_2$)$_{18}$—, —(CH$_2$)$_{19}$—, —(CH$_2$)$_{20}$, —(CH$_2$)$_{21}$—, —(CH$_2$)$_{22}$—, —(CH$_2$)$_{23}$—, —(CH$_2$)$_{24}$—, —(CH$_2$)$_{25}$—, —(CH$_2$)$_{26}$—, —(CH$_2$)$_{27}$—, —(CH$_2$)$_{28}$—, —(CH$_2$)$_{29}$—, —(CH$_2$)$_{30}$—, preferably —CH$_2$—, —(CH$_2$)$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —(CH$_2$)$_9$—, —(CH$_2$)$_{10}$—, —(CH$_2$)$_{11}$—, —(CH$_2$)$_{12}$—, —(CH$_2$)$_{13}$—, —(CH$_2$)$_{14}$—, —(CH$_2$)$_{15}$—, —(CH$_2$)$_{16}$—, —(CH$_2$)$_{17}$—, —(CH$_2$)$_{18}$—, and also —CH($C_2$-$C_{30}$alkylene)-. The "alkylene spacer" can optionally comprise one or more, in particular one or two groups selected from —O—, —S—, —NR$^{43}$—, —CO—, —CONH—, —CON$^{43}$—, or —COO— as linking group. $C_1$-$C_{30}$alkylene can, for example, be interrupted several times by —O—, —S—, —NH— or —C(O)NH—, such as —(CH$_2$)$_2$—O—(CH$_2$)—, —(CH$_2$)$_2$—O—(CH$_2$)$_2$—, —(CH$_2$)$_2$—S—(CH$_2$)$_2$—, —CH$_2$—CH—CH$_2$—O—(CH$_2$)$_{p1}$—CH$_3$, wherein p1 is an integer from 1 to 10; or —CHX$_{13}$CH$_2$—(X$_{14}$)$_{n3}$—OH, wherein X$_{13}$ is $C_1$-$C_8$alkyl, X$_{14}$ is an alkylene oxide monomer, preferably ethylene oxide or propylene oxide, or alkylene amino monomer, preferably amino ethylene or amino propylene, and n3 is an integer from 1 to 10, preferably 1 to 5; or —(CH$_2$)$_2$—NH—(CH$_2$)$_2$— or —(CH$_2$)$_2$—C(O)NH—(CH$_2$)$_2$—.

"Arylene (spacer)" is an unsubstituted or substituted carbocyclic or heterocyclic arylene group, preferably containing 6 to 14 carbon atoms, typically phenylene, naphthylene, anthracenylene, anthraquinonylene, pyridinylene, quinolinylene, preferably a group

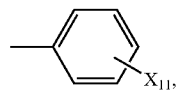

wherein X$_{11}$ is a single bond in ortho-, meta- or para-position, or —O—, —S—, —NR$^{43}$—, —CO—, —CONH—, —CONR$^{43}$—, or —COO— in ortho-, meta- or para-position; para-phenylene and para-phenyleneoxy are preferred, wherein R$^{43}$ has the meaning of R$^{65}$.

"Aralkylene (spacer)" is an unsubstituted or substituted carbocyclic or heterocyclic aralkylene group, preferably containing 6 to 14 carbon atoms, preferably a group

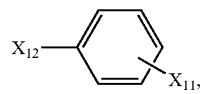

wherein X$_{11}$ is a single bond in ortho-, meta- or para-position, or —O—, —S—, —NR$^{43}$—, —CO—, —CONH—, —CONR$^{43}$—, or —COO— in ortho-, meta- or para-position, and X$_{12}$ is alkylene, or a group

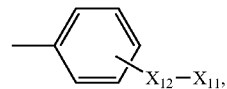

wherein X$_{12}$ is alkylene in ortho-, meta- or para-position and X$_{11}$ is a single bond, —O—, —S—, —NR$^{43}$—, —CO—, —CONH—, —CONR$^{43}$—, or —COO—, wherein R$^{43}$ has the meaning of R$^{65}$.

"Cycloalkylene (spacer)" is an unsubstituted or substituted carbocyclic or heterocyclic cycloalkylene group, preferably containing 6 to 14 carbon atoms, typically cyclohexylene, preferably a group

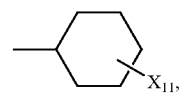

wherein X$_{11}$ is a single bond in 2-, 3- or 4-position, or —O—, —S—, —NR$^{43}$—, —CO—, —CONH—, —CONR$^{43}$—, or —COO— in 2-, 3- or 4-position; 4-cyclohexylene and 4-cyclohexylenoxy are preferred, wherein R$^{43}$ has the meaning of R$^{65}$.

A further embodiment of the present invention is directed to an electronic device or a component therefore, comprising a substrate and a polymer according to the present invention.

In such a device the polymers according to the present invention are used as electroluminescent material. For the purposes of the present invention, the term "electroluminescent material" is taken to mean materials which can be used as or in an active layer in an electroluminescent device. The term "active layer" means that the layer is capable of emitting light (light-emitting layer) on application of an electric field and/or that it improves the injection and/or transport of the positive and/or negative charges (charge injection or charge transport layer). The invention therefore also relates to the use of the polymers according to the invention as electroluminescent material. The invention furthermore relates to an electroluminescent material which comprises the polymers according to the invention. Electroluminescent devices are used, for example, as self-illuminating display elements, such as control lamps, alphanumeric displays, signs and in opto-electronic couplers.

A device according to the present invention may be prepared in accordance with the disclosure of WO99/48160, the contents of which are incorporated by reference.

The EL device emits light in the visible electro-magnetic spectrum between 400 nm and 780 nm, preferably between 430 nm and 470 nm for a blue color, preferably between 520 nm and 560 nm for a green color, preferably between 600 nm and 650 nm for a red color.

It will be appreciated that the light emissive layer may be formed from a blend or mixture of materials including one or more polymers according to the present invention, and optionally further compounds. The non-conjugated polymers of the present invention are especially used as host material for phosphorescent compounds (triplet emitter) in organic light emitting diodes (OLEDs).

An organic EL device typically consists of an organic film sandwiched between an anode and a cathode such that when a positive bias is applied to the device, holes are injected into the organic film from the anode, and electrons are injected into the organic film from the cathode. The combination of a hole and an electron may give rise to an exciton, which may undergo radiative decay to the ground state by liberating a photon. In practice the anode is commonly an mixed oxide of tin and indium for its conductivity and transparency. The mixed oxide (ITO) is deposited on a transparent substrate such as glass or plastic so that the light emitted by the organic film may be observed. The organic film may be the composite of several individual layers each designed for a distinct function. Since holes are injected from the anode, the layer next to the anode needs to have the functionality of transporting holes. Similarly, the layer next to the cathode needs to have the functionality of transporting electrons. In many instances, the hole-(electron) transporting layer also acts as the emitting layer. In some instances one layer can perform the combined functions of hole and electron transport and light emission. The individual layers of the organic film may be all polymeric in nature or combinations of films of polymers and films of small molecules deposited by thermal evaporation. It is preferred that the total thickness of the organic film be less than 1000 nanometers (nm). It is more preferred that the total thickness be less than 500 nm. It is most preferred that the total thickness be less than 300 nm. It is preferred that the thickness of the active (light emitting) layer be less than 400 nanometers (nm). It is more preferred that the thickness is in the range of from 40 to 160 nm.

The ITO-glass, which serves as the substrate and the anode, may be used for coating after the usual cleaning with detergent, organic solvents and UV-ozone treatment. It may also be first coated with a thin layer of a conducting substance to facilitate hole injection. Such substances include copper phthalocyanine, polyaniline (PANI) and poly(3,4-ethylene-dioxy-thiophene) (PEDOT); the last two in their (doped) conductive forms, doped, for example, with $FeCl_3$ or $Na_2S_2O_8$. They contain poly(styrenesulfonic acid) (PSS) as counter-ion to ensure water solubility. It is preferred that the thickness of this layer be 200 nm or less; it is more preferred that the thickness be 100 nm or less.

In the cases where a hole-transporting layer is used, the polymeric arylamines described in U.S. Pat. No. 5,728,801, may be used. Other known hole-conducting polymers, such as polyvinylcarbazole, may also be used. The resistance of this layer to erosion by the solution of the copolymer film which is to be applied next is obviously critical to the successful fabrication of multi-layer devices. The thickness of this layer may be 500 nm or less, preferably 300 nm or less, most preferably 150 nm or less.

In the case where an electron-transporting layer is used, it may be applied either by thermal evaporation of low molecular weight materials or by solution coating of a polymer with a solvent that would not cause significant damage to the underlying film.

Examples of low molecular weight materials include the metal complexes of 8-hydroxyquinoline (as described by Burrows et al. in Appl. Phys. Lett. 64 (1994) 2718-2720), metallic complexes of 10-hydroxybenzoquinoline (as described by Hamada et al. in Chem. Lett. (1993) 906-906), 1,3,4-oxadiazoles (as described by Hamada et al. in Optoelectronics-Devices and Technologies 7 (1992) 83-93), 1,3,4-triazoles (as described by Kido et al. in Chem. Lett. (1996) 47-48), and dicarboximides of perylene (as described by Yoshida et al. in Appl. Phys. Lett. 69 (1996) 734-736).

Polymeric electron-transporting materials are exemplified by 1,3,4-oxadiazole-containing polymers (as described by Li et al. in J. Chem. Soc. (1995) 2211-2212, by Yang and Pei in J. Appl. Phys. 77 (1995) 4807-4809), 1,3,4-triazole-containing polymers (as described by Strukelj et al. in Science 267 (1995) 1969-1972), quinoxaline-containing polymers (as described by Yamamoto et al. in Jpn. J. Appl. Phys. 33 (1994) L250-L253, O'Brien et al. in Synth. Met. 76 (1996) 105-108), and cyano-PPV (as described by Weaver et al. in Thin Solid Films 273 (1996) 39-47). The thickness of this layer may be 500 nm or less, preferably 300 nm or less, most preferably 150 nm or less.

The cathode material may be deposited either by thermal evaporation or by sputtering. The thickness of the cathode may be from 1 nm to 10,000 nm, preferably 5 nm to 500 nm.

OLEDs made according to the present invention may include phosphorescent dopants dispersed in the device's emissive layer, capable of achieving internal quantum efficiencies approaching 100%. As used herein, the term "phosphorescence refers to emission from a triplet excited state of an organic or metal-organic molecule. High efficiency organic light emitting devices using phosphorescent dopants have been demonstrated using several different conducting host materials (M. A. Baldo et al., Nature, Vol 395, 151 (1998), C. Adachi et al., Appl. Phys. Lett., Vol. 77, 904 (2000)). The non-conjugated polymers of the present invention are especially suitable as host material for such phosphorescent dopants (triplet emitters).

The term "hole-transporting polymer film" as used herein refers to a layer of a film of a polymer which when disposed between two electrodes to which a field is applied and holes are injected from the anode, permits adequate transport of holes into the emitting polymer. Hole-transporting polymers typically are comprised of triarylamine moieties. The term "anode material" as used herein refers to a semi-transparent, or transparent, conducting film with a work function between 4.5 electron volts (eV) and 5.5 eV. Examples are gold, silver, copper, aluminum, indium, iron, zinc, tin, chromium, titanium, vanadium, cobalt, nickel, lead, manganese, tungsten and the like, metallic alloys such as magnesium/copper, magnesium/silver, magnesium/aluminum, aluminum/indium and the like, semiconductors such as Si, Ge, GaAs and the like, metallic oxides such as indium-tin-oxide ("ITO"), ZnO and the like, metallic compounds such as CuI and the like, and furthermore, electroconducting polymers such polyacetylene, polyaniline, polythiophene, polypyrrole, polyparaphenylene and the like. Oxides and mixed oxides of indium and tin, and gold are preferred. Most preferred is ITO, especially ITO on glass, or on a plastics material, such as polyester, for example polyethylene terephthalate (PET), as substrate.

The term "cathode material" as used herein refers to a conducting film with a work function between 2.0 eV and 4.5 eV. Examples are alkali metals, earth alkaline metals, group 13 elements, silver, and copper as well as alloys or mixtures thereof such as sodium, lithium, potassium, calcium, lithium fluoride (LiF), sodium-potassium alloy, magnesium, magnesium-silver alloy, magnesium-copper alloy, magnesium-aluminum alloy, magnesium-indium alloy, aluminum, aluminum-aluminum oxide alloy, aluminum-lithium alloy, indium, calcium, and materials exemplified in EP-A 499,011, such as electroconducting polymers e.g. polypyrrole, polythiophene, polyaniline, polyacetylene etc. Preferably lithium, calcium, barium, magnesium, indium, silver, aluminum, or blends and alloys of the above are used. In the case of using a metal or a metallic alloy as a material for an electrode, the electrode can be formed also by the vacuum deposition method. In the case of using a metal or a metallic alloy as a material forming an electrode, the electrode can be formed, furthermore, by the chemical plating method (see for example, Handbook of Electrochemistry, pp 383-387, Mazuren, 1985). In the case of using an electroconducting polymer, an electrode can be made by forming it into a film by means of anodic oxidation polymerization method onto a substrate, which is previously provided with an electroconducting coating.

As methods for forming said thin films, there are, for example, the vacuum deposition method, the spin-coating method, the casting method, the Langmuir-Blodgett ("LB") method, the ink jet printing method and the like. Among these methods, the vacuum deposition method, the spin-coating method, the ink jet printing method and the casting method are particularly preferred in view of ease of operation and cost.

In the case of forming the layers by using the spin-coating method, the casting method and ink jet printing method, the coating can be carried out using a solution prepared by dissolving the composition in a concentration of from 0.0001 to 90% by weight in an appropriate organic solvent such as benzene, toluene, xylene, tetrahydrofurane, methyltetrahydrofurane, N,N-dimethylformamide, acetone, acetonitrile, anisole, dichloromethane, dimethylsulfoxide and mixtures thereof.

The organic EL device of the present invention is seen as a future replacement technology for a flat panel display of an on-wall television set, a flat light-emitting device, such as a wall paper, a light source for a copying machine or a printer, a light source for a liquid crystal display or counter, a display signboard and a signal light and perhaps even to replace incandescent and fluorescent lamps. The polymers and compositions of the present invention can be used in the fields of an organic EL device, a photovoltaic device, an electrophotographic photoreceptor, a photoelectric converter, a solar cell, an image sensor, and the like.

Accordingly, the present invention relates also to OLEDs, organic integrated circuits (O-ICs), organic field effect transistors (OFETs), organic thin film transistors (OTFTs), organic solar cells (O-SCs), thermoelectric devices, or organic laser diodes comprising one or more of the polymers according to the present invention.

The following examples are included for illustrative purposes only and do not limit the scope of the claims. Unless otherwise stated, all parts and percentages are by weight. (PD)=3.095 Molecular weights and polydispersities are determined according to gel permeation chromatography using polystyrene standards and/or light scattering detectors.

EXAMPLES

Example 1

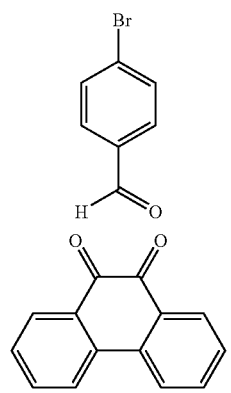

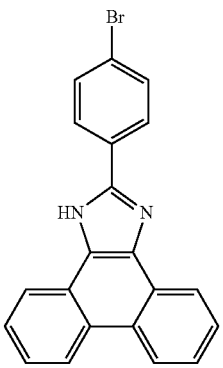

a) To 5.00 g (24.0 mmol) of phenanthrene-9,10-dione in 125 ml ethanol (abs) 6.66 g (36.0 mmol) 4-bromobenzaldehyde and 12.96 g (0.168 mol) ammonium acetate are added. The reaction mixture is heated at reflux under nitrogen overnight, cooled to 25° C., the product is filtered off and washed with ethanol (yield: 7.70 g (85.8%)).

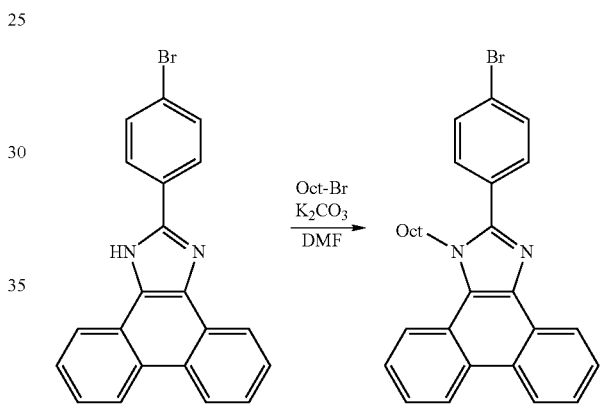

b) To 8 g (21.4 mmol) of the product of example 1a, 8.28 g (42.8 mmol) n-octylbromide (Oct), 8.89 g (64.30 mmol) of potassium carbonate and 100 ml dimethylformamide (DMF) are added. The reaction mixture is stirred under nitrogen at 120° C. overnight, filtered, the DMF is evaporated and the product is purified by column chromatography on silica gel with dichloromethane as an eluent (yield: 7.3 g (70%)).

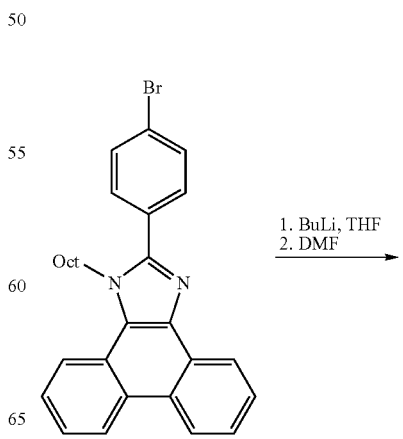

-continued

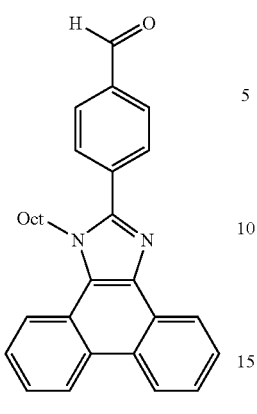

c) 3.07 ml of 2.5M BuLi in hexane are added to 4 g (8.24 mmol) of the product of example 1b dissolved in 50 ml dry THF at −78° C. The reaction mixture is stirred for 1 h and 3 g (41.2 mmol) of dry DMF are added and allowed to warm to room temperature. The reaction is quenched with 0.5M HCl and the product is purified with column chromatography on silica gel with chloroform/MeOH (9.9:0.1) as an eluent (yield: 2.2 g (61.5%)).

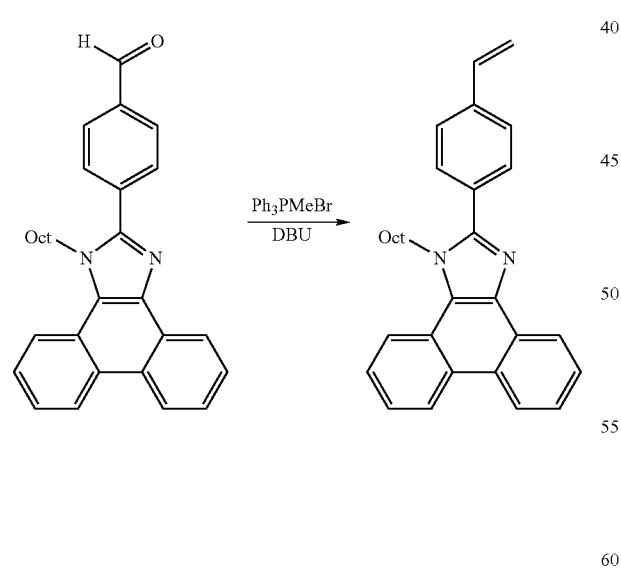

d) 6.58 g (18.41 mmol) of methyltriphenylphosphine bromide, 2.8 g (18.41 mmol) 1,8-diazabicyclo[5.4.0]undec-7-ene (DBU) are refluxed in 60 ml dichloromethane for 45 minutes, 2 g (4.6 mmol) of the product of example 1c in 20 ml dichloromethane are added and reflux is continued overnight.

The dichloromethane solution is washed with water and purified by column chromatography with dichloromethane as an eluent (yield: 1.6 g (80%)).

Example 2

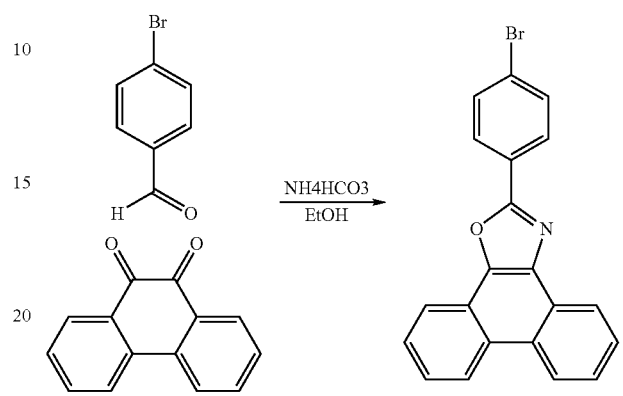

a) To 10.00 g (48.0 mmol) of phenanthrene-9,10-dione in 250 ml ethanol (abs) 13.33 g (72.0 mmol) 4-bromobenzaldehyde and 18.98 g (0.24 mol) ammonium hydrogencarbonate are added. The reaction mixture is heated at reflux under nitrogen overnight, cooled to 25° C., the product is filtered off and washed with ethanol (yield: 12.70 g (70.7%)).

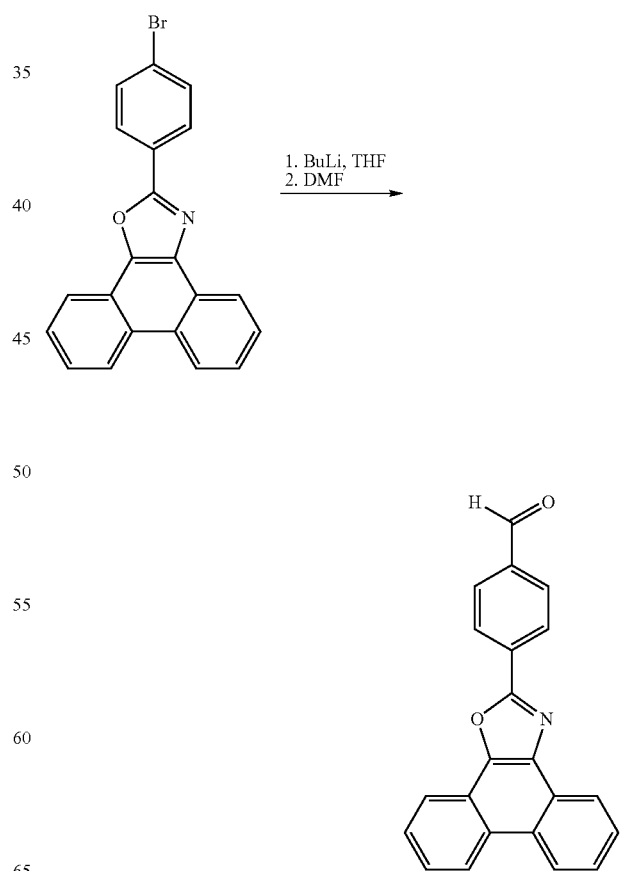

b) The product is prepared according example 1c (yield: 77.0%).

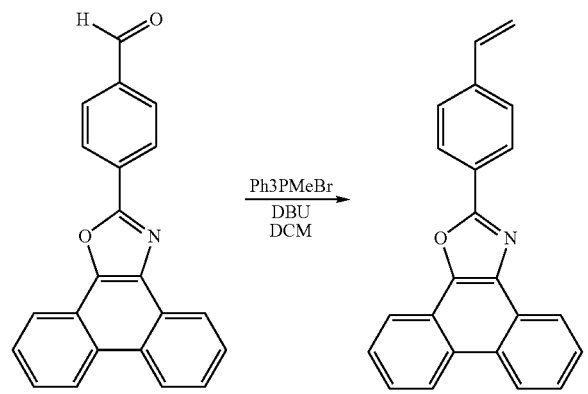

c) The product is prepared according example 1d (yield: 80.0%).

Example 3

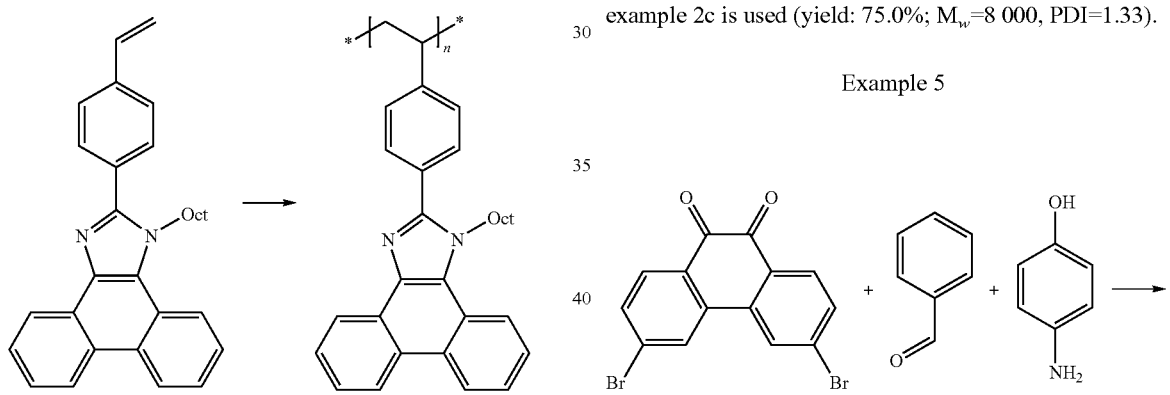

a) 1 g of the product of example 1d and 0.05 g of 2,2'-azobisisobutyronitrile (AIBN) are dissolved in 7 ml THF, degassed and stirred at 60° C. for 2 days. The polymer is purified by precipitation in methanol (yield: 0.9 g (90%); $M_w$=40 000, PDI=2.35).

b) 0.6 g of example 1d and 3.8 mg of alkoxyamine initiator

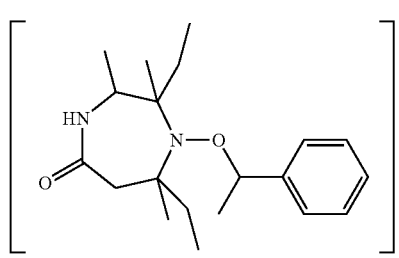

are dissolved in 0.5 ml chlorobenzene, degassed and stirred at 120° C. for 20 h. The obtained polymer is purified by precipitation in MeOH (yield: 0.4 g (66.6%)). Mw=120 000, PDI=1.43.

Example 4

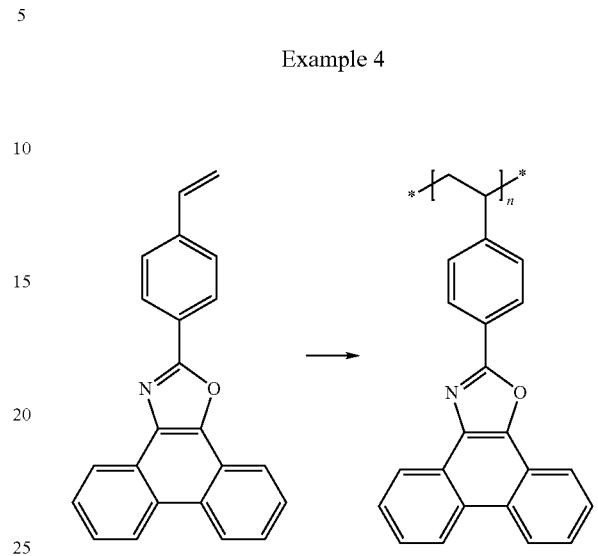

The product is prepared according to example 3, except that instead of the product of example 1d the product of example 2c is used (yield: 75.0%; $M_w$=8 000, PDI=1.33).

Example 5 a) To 1.1 g (3.0 mmol) of 3,6-dibromo-phenanthrene-9,10-dione in 30 ml acetic acid (>98%) 0.35 g (3.3 mmol) benzaldehyde, 0.36 g (3.3 mmol) 4-hydroxyaniline and 0.92 g (12.0 mmol) ammonium acetate are added. The reaction mixture is heated at reflux under nitrogen overnight and is cooled to 25° C. The product is filtered off, washed with acetic acid, water, sodiumhydrogencarbonate solution and water (yield: 1.06 g (64.9%)).

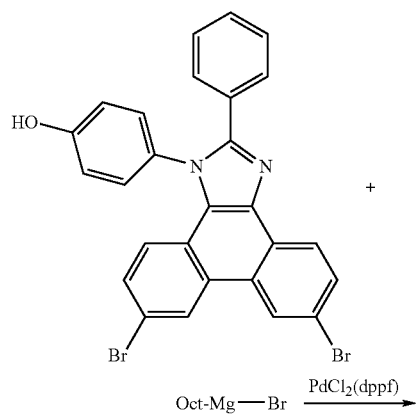

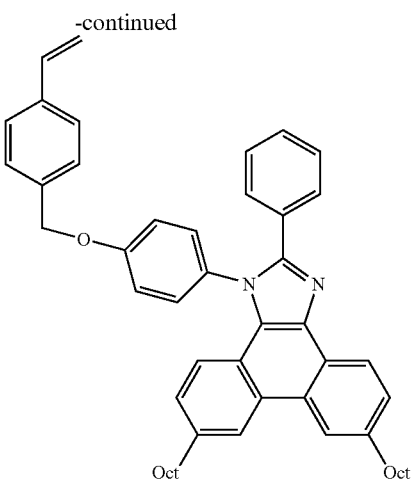

c) 1.23 g (2 mmol) of the product of example 5b, 0.61 g (4 mmol) of 4-vinylbenzylchloride and 0.23 g (4 mmol) of KOH are stirred in 20 ml DMF overnight and quenched with water. The product is filtered and purified by column chromatography with dichloromethane as an eluent (yield: 1.26 g (86.3%)).

Example 6 b) 20 ml of 1M octyl magnesium bromide in THF are added to 2 g (3.67 mmol) of the product of example 5a and 100 mg of Pd(dppf)Cl$_2$ in 10 ml THF. The reaction mixture is refluxed for 48 h and quenched with 4M HCl. The product is extracted with chloroform and purified by column chromatography with chloroform as an eluent (yield: 1.23 g (54.8%)).

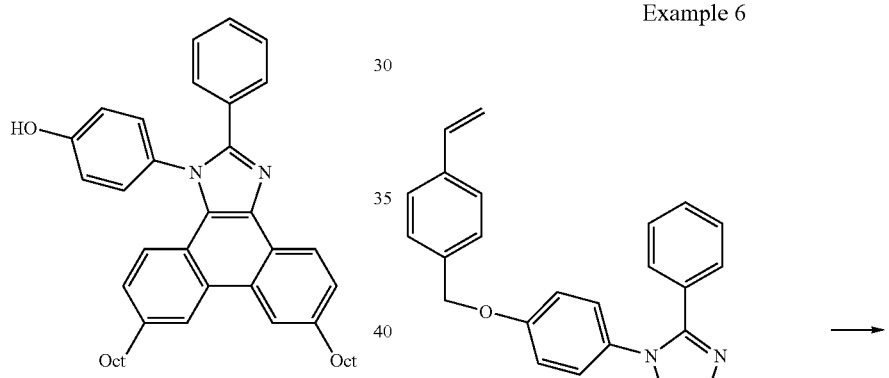

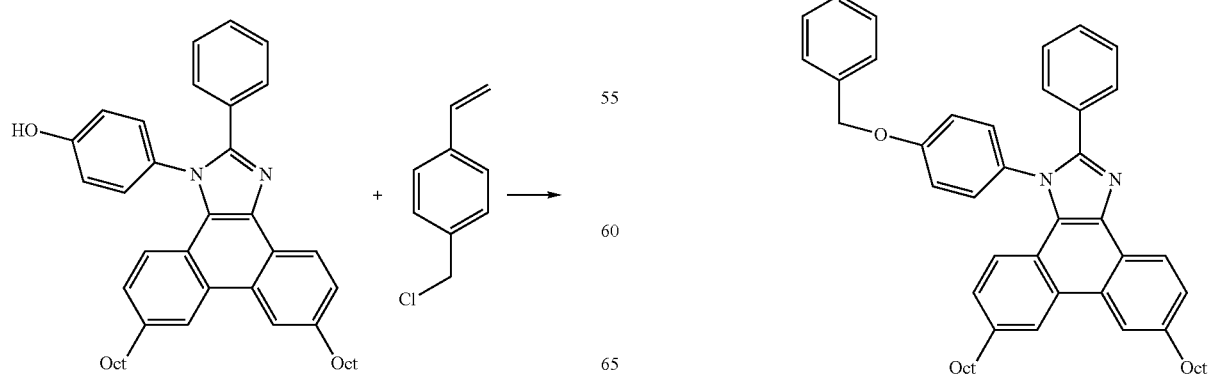

0.5 g of the product of example 5c and 15 mg of AIBN are dissolved in 1 ml THF, degassed and stirred at 60° C. for 24 h. The obtained polymer is purified by precipitation in MeOH (yield: 0.4 g (80%)).

Mw=47 000, PDI=1.91; Oct=n-octyl

Example 7

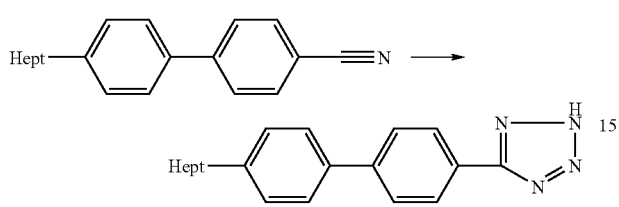

a) 5 g (18 mmol) of 4-cyano-4'-heptylbiphenyl, 1.76 g (27 mmol) of $NaN_3$, 1.45 g (27 mmol) of $NH_4Cl$ are dissolved in 35 ml dry DMF and stirred overnight at 100° C. The reaction mixture is poured in 300 ml $H_2O$, acidified with 4M HCl, filtered and dried in vacuum at 60° C. (yield: 5.7 (100%)).

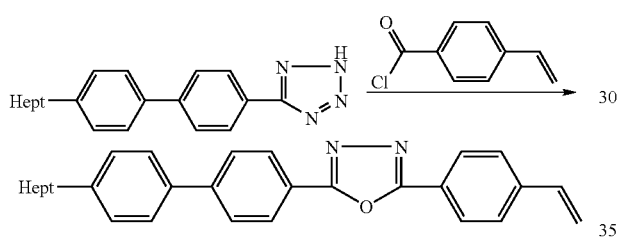

b) 4.76 g (27 mmol) of the product of example 7a, 5.62 g (33.75 mmol) of p-vinylbenzoyl chloride and a little amount of hydroquinone are dissolved in 40 ml pyridine and reflux for 2 h. The obtained product is poured on 300 ml of water, filtered and purified by column chromatography on silica gel with chloroform as an eluent (yield: 1.2 g (20%)).

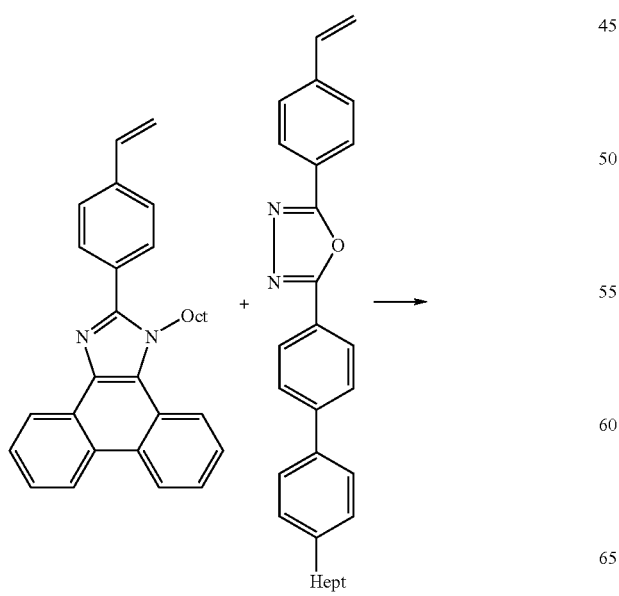

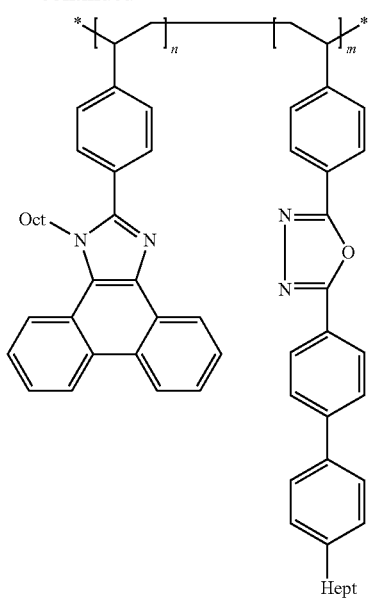

c) 0.7 g of the product of example 1d, 0.3 g of the oxadiazole of example 7b and 6.3 mg of alkoxyamine initiator

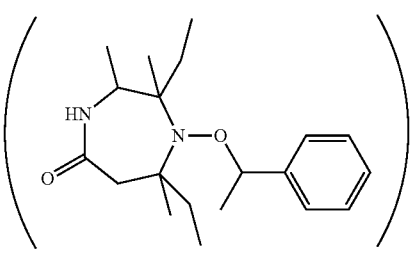

are dissolved in 1 ml chlorobenzene with 0.1 ml acetanhydride, degassed and stirred at 120° C. for 48 h. The obtained polymer is purified by precipitation in MeOH (yield: 0.93 g (93%)). Mw=50 000, PDI=1.75, n=0.66, m=0.34. Oct=n-octyl; Hept=n-heptyl.

Example 8

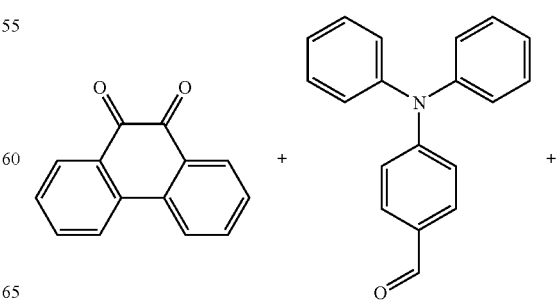

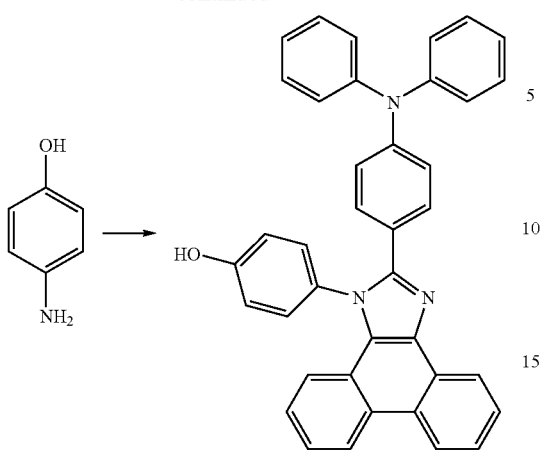

a) To 1.0 g (4.8 mmol) of phenanthrene-9,10-dione in 50 ml acetic acid (>98%) 1.44 g (5.3 mmol) 4-(N,N-diphenylamino)benzaldehyde, 0.6 g (5.5 mmol) 4-hydroxyaniline and 1.48 g (19.2 mmol) ammonium acetate are added. The reaction mixture is heated at reflux under nitrogen overnight and cooled to 25° C. The product is filtered off, washed with acetic acid, water, sodiumhydrogencarbonate solution and water and is further purified by column chromatography on silica gel with CHCl₃ as an eluent (yield: 0.74 g (30.0%)).

b) 1.0 g (1.8 mmol) of the product of example 8a, 0.55 g (3.6 mmol) of 4-vinylbenzylchloride and 0.2 g (3.6 mmol) of KOH are stirred in 20 ml DMF overnight and quenched with water. The product is filtered, washed with hexane and purified by column chromatography with dichloromethane as an eluent (yield: 0.6 g (50%)).

Example 9

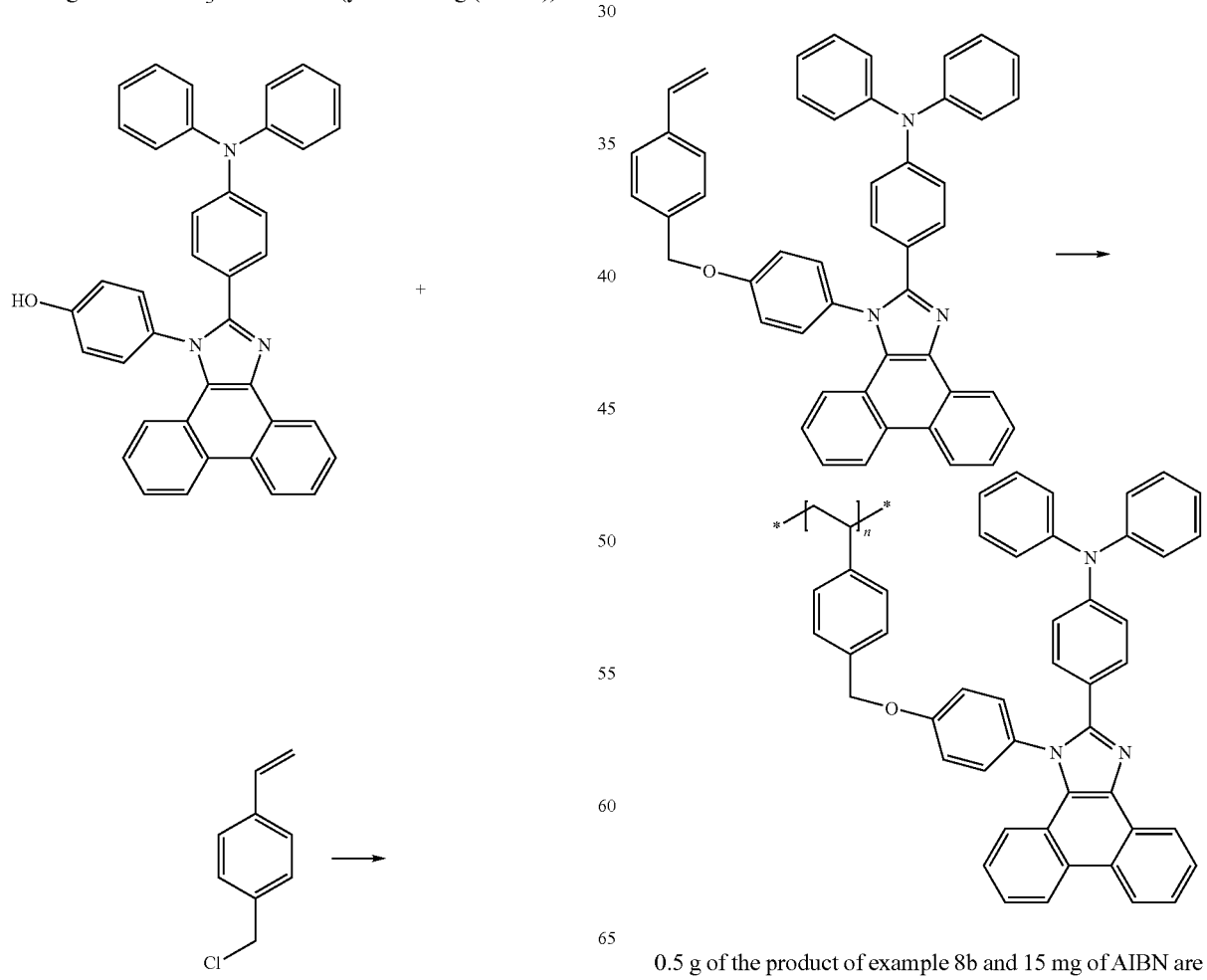

0.5 g of the product of example 8b and 15 mg of AIBN are dissolved in 1 ml THF, degassed and stirred at 60° C. for 24 h.

Example 10

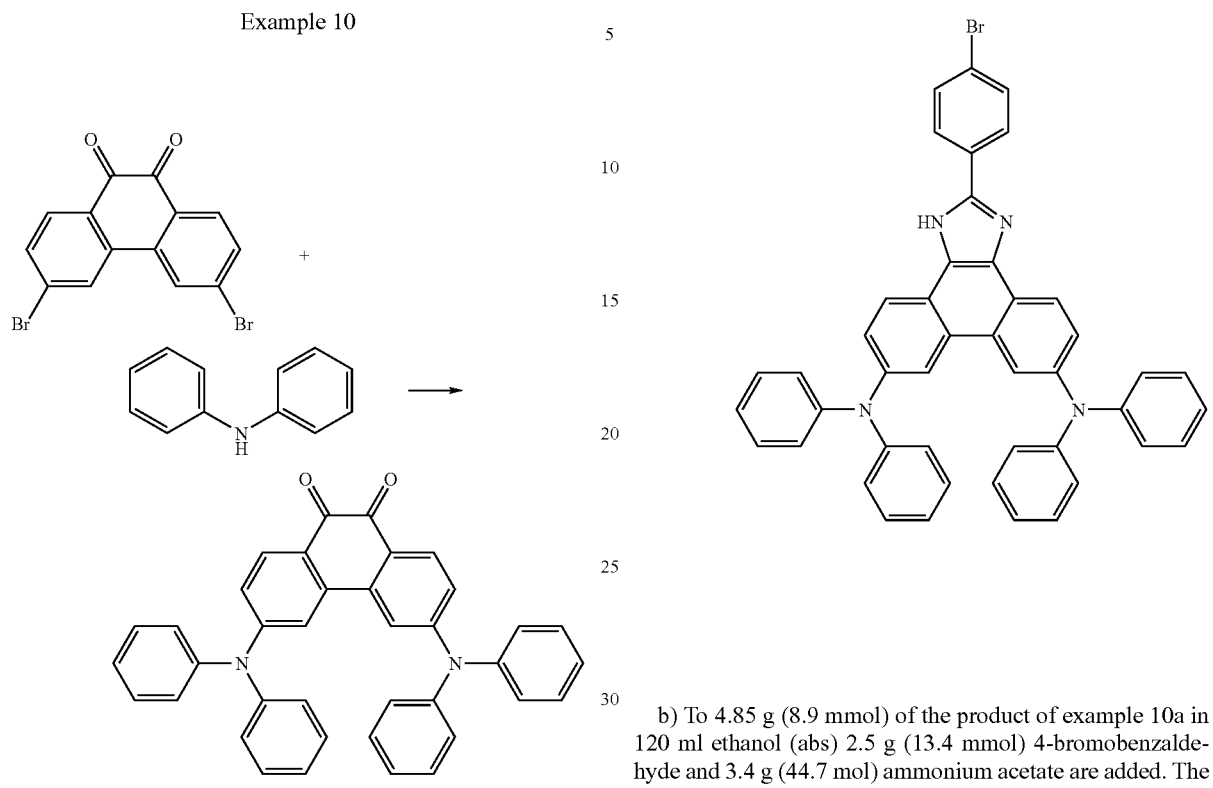

a) To 5.0 g (13.6 mmol) of 3,6-dibromo-phenanthrene-9,10-dione in 200 ml o-xylene 10.8 g (54.6 mmol) diphenylamine and 5.25 g (54.6 mmol) sodium tert-butoxide are added. Nitrogen is bubbled through the reaction mixture for 10 min. and 80 mg Pd(dba)$_3$ and tri-tert-butylphosphine are added. The reaction mixture is heated at 130° C. under nitrogen overnight and cooled to 25° C. The solvent is evaporated and the product is purified by column chromatography on silica gel with CHCl$_3$ as an eluent followed by precipitation in hexane (yield: 4.85 g (65.4%)).

b) To 4.85 g (8.9 mmol) of the product of example 10a in 120 ml ethanol (abs) 2.5 g (13.4 mmol) 4-bromobenzaldehyde and 3.4 g (44.7 mol) ammonium acetate are added. The reaction mixture is heated at reflux under nitrogen overnight and cooled to 25° C. The ethanol is evaporated and product is purified by column chromatography on silica gel with CHCl$_3$:MeOH (9.7:0.3) as an eluent followed by precipitation in hexane (yield: 4.0 g (63.5%)).

The obtained polymer is purified by precipitation in MeOH (yield: 0.4 g (80%)). Mw=58 000, PDI=2.0.

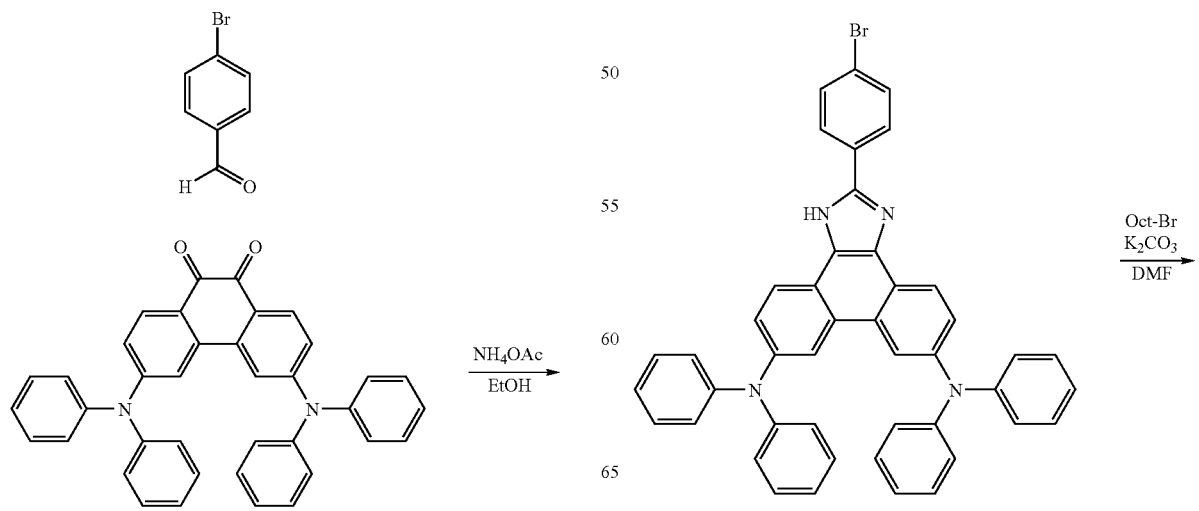

-continued
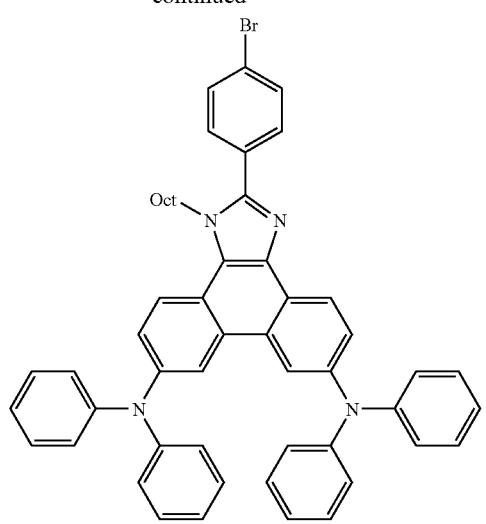
c) The product is prepared according example 1b (yield: 75.0%). Oct=n-octyl
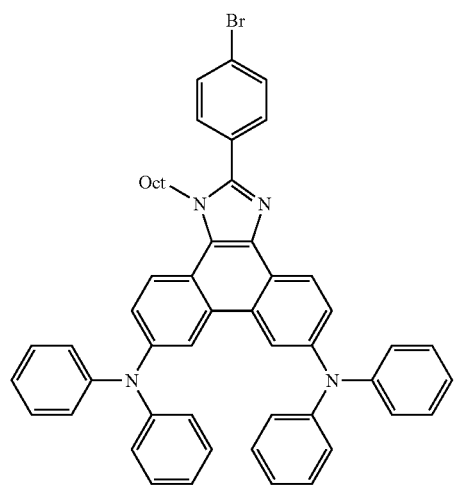
d) The product is prepared according example 1c (yield: 55.0%). Oct=n-octyl
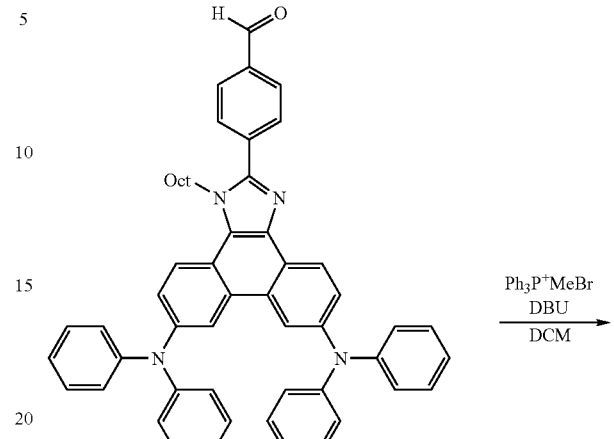
e) The product is prepared according example 1d (yield: 60.0%). Oct=n-octyl
Example 11
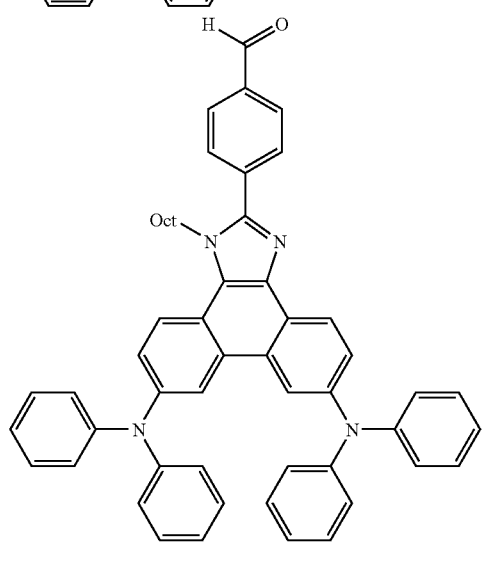
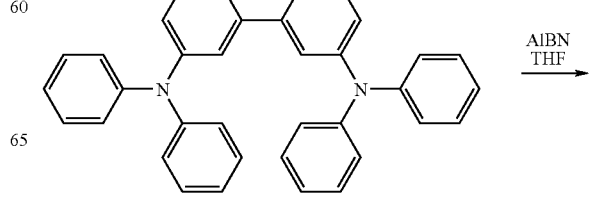

-continued

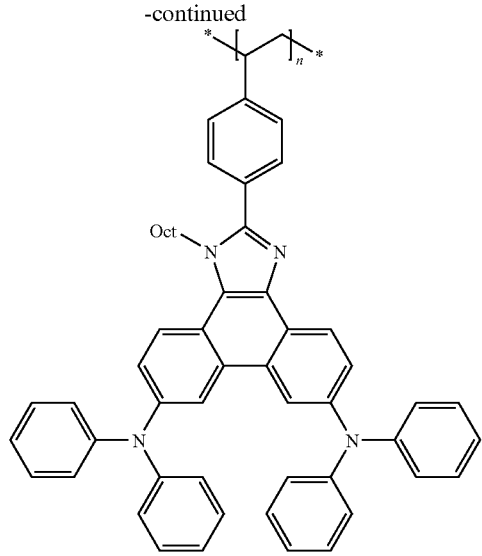

The product is prepared according example 9. Yield: 0.3 g (60%)).

Mw=134 000, PDI=2.38. Oct=n-octyl.

Example 12

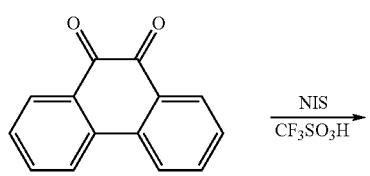

a) To 10.0 g (48.0 mmol) of phenanthrene-9,10-dione in 40 ml trifluoromethanesulfonic acid 10.8 g (48.0 mmol) N-iodosuccinimide is added at 0° C. The reaction mixture is stirred overnight at room temperature and poured into ice, filtered and recrystallized from acetic acid. Yield 4.6 g (30%).

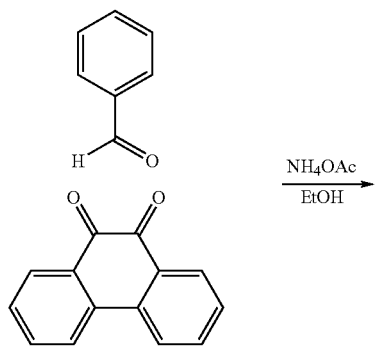

-continued

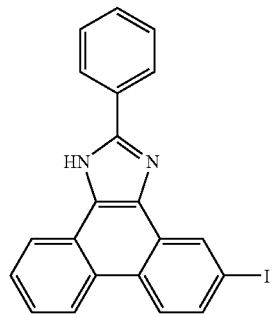

b) To 4.6 g (13.7 mmol) of 2-iodo-phenanthrene-9,10-dione in 120 ml ethanol (abs) 2.19 g (20.6 mmol) benzaldehyde and 5.3 g (68.6 mmol) ammonium acetate are added. The reaction mixture is heated at reflux under nitrogen overnight and cooled to 25° C. The product is filtered off and washed with ethanol (yield: 3.9 g (67.9%)).

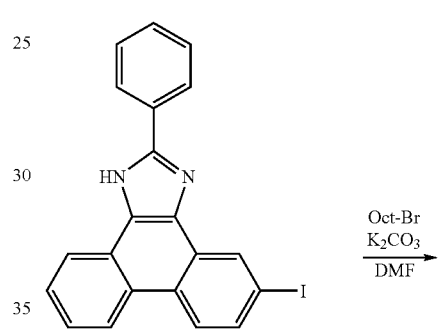

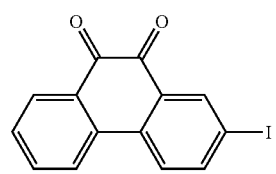

c) The product is prepared according example 1b (yield: 4.25 g (83.0%)). Oct=n-octyl

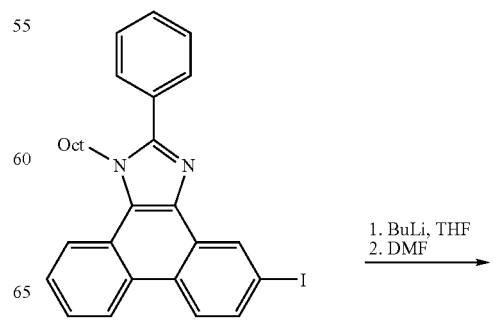

-continued

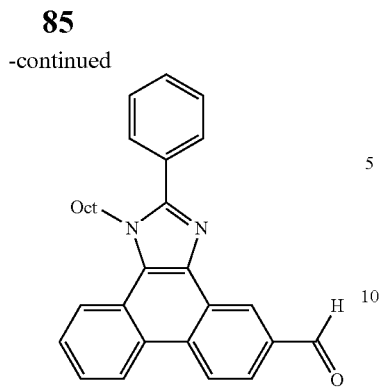

d) The product is prepared according to example 1c (yield: 0.9 g (41.6%)). Oct=n-octyl.

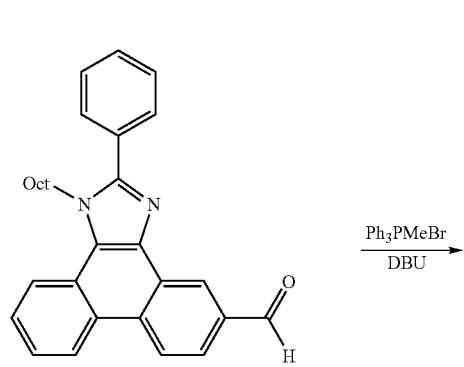

e) The product is prepared according example 1d (yield: 0.85 g (95.5%)). Oct=n-octyl Example 13

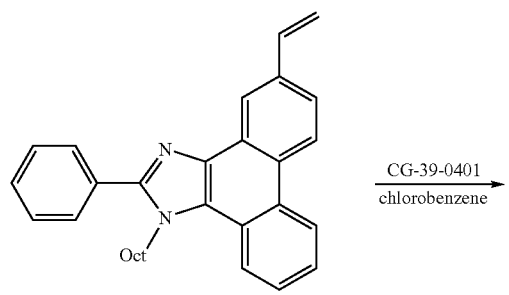

-continued

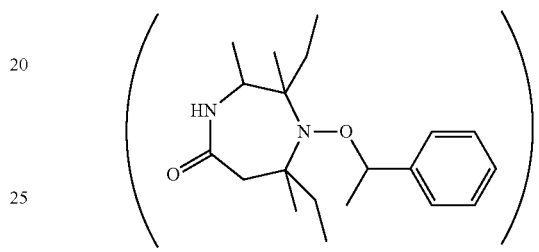

0.5 g of the product of example 12e and 3.1 mg of alkoxyamine initiator CG-39-0401 are dissolved in 1 ml chlorobenzene with 0.1 ml acetanhydride, degassed and stirred at 120° C. for 48 h. The obtained polymer is purified by precipitation in MeOH (yield: 0.3 g (60%)). Mw=215 000, PDI=3.26. Oct=n-octyl.

Example 14

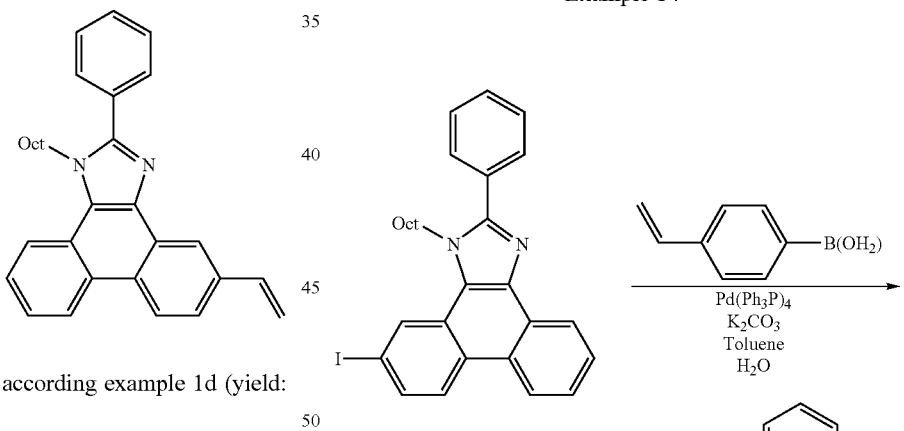

To 1.2 g (2.25 mmol) of the product of example 12c in 100 ml toluene are added 50 ml of 1M $K_2CO_3$ aqueous solution. Nitrogen is bubbled through the reaction mixture for 10 min and 0.67 g (4.5 mmol) of 4-vinylphenylboronic acid and 0.52 g (0.45 mmol) $Pd[Ph_3P]_4$ are added. The reaction mixture is stirred at 80° C. for 2 h and overnight at room temperature. The reaction mixture is washed with Na₂S₂O₃ aq., extracted with chloroform and precipitated in methanol. Yield 0.78 g (68.4%). Oct=n-octyl.

Example 15

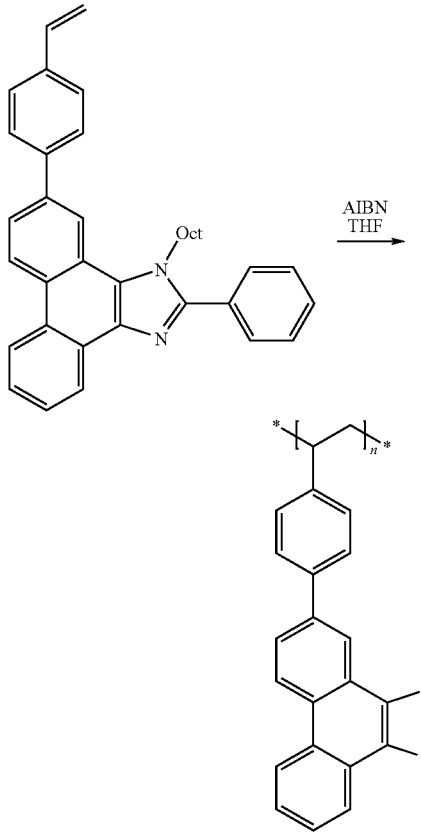

0.6 g of the product of example 14 and 15 mg of AIBN are dissolved in 2 ml THF, degassed and stirred at 60° C. for 24 h. The obtained polymer is purified by precipitation in MeOH (yield: 0.5 g (83.3%)). Mw=286 000, PDI=1.8. Oct=n-octyl.

Example 16

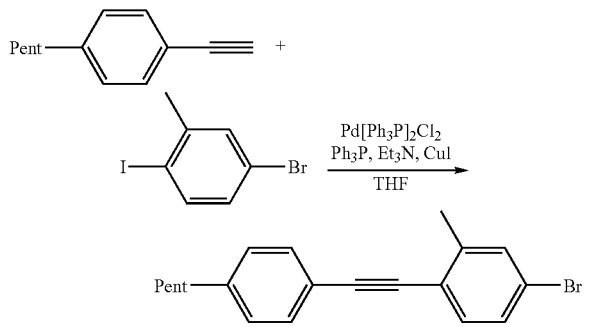

a) 5 g (29 mmol) of 4-n-pentylphenylacetylene, 11.2 g (37.7 mmol) of 5-bromo-2-iodotoluene, 0.55 g (2.9 mmol) CuI and 0.76 g (2.9 mmol) triphenylphosphine is dissolved in 100 mol dry THF under inert atmosphere. 29.3 g (0.29 mol) triethylamine and 1.02 g (1.5 mmol) Pd[Ph₃P]₂Cl₂ are added and reaction mixture is stirred overnight at room temperature. 2M HCl is added to quench the reaction. The product is extracted with dichloromethane and purified by column chromatography on silica gel with petrol benzene as an eluent. Yield 6.7 g (68%). Pent=n-pentyl.

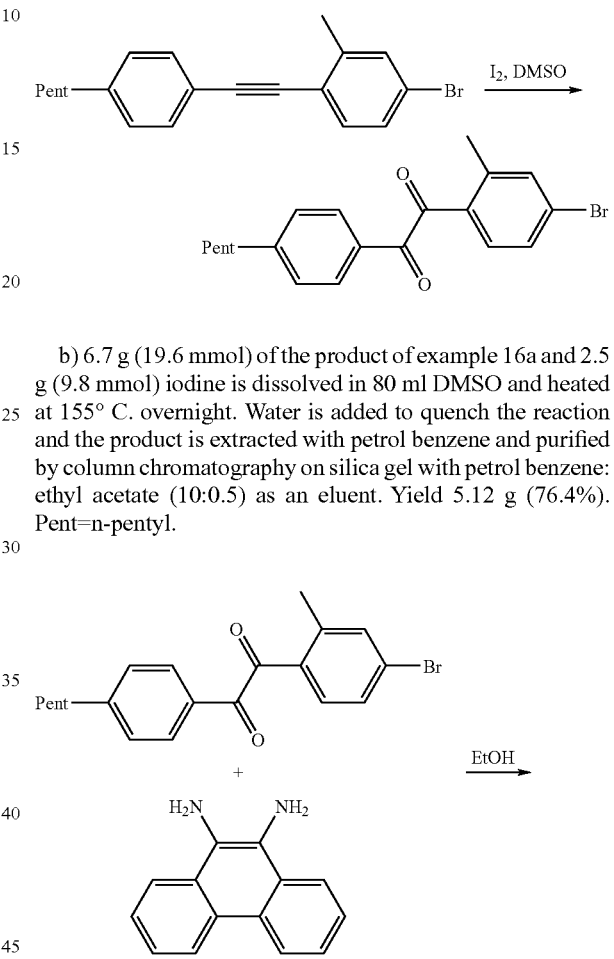

b) 6.7 g (19.6 mmol) of the product of example 16a and 2.5 g (9.8 mmol) iodine is dissolved in 80 ml DMSO and heated at 155° C. overnight. Water is added to quench the reaction and the product is extracted with petrol benzene and purified by column chromatography on silica gel with petrol benzene: ethyl acetate (10:0.5) as an eluent. Yield 5.12 g (76.4%). Pent=n-pentyl.

c) 1 g (4.8 mmol) 9,10-diaminophenanthrene and 1.7 g (4.56 mmol) of the product of example 16b are dissolved in ethanol and refluxed for 48 h. The reaction mixture is cooled down, filtered and reprecipitated from ethyl acetate to methanol. Yield 2 g (80.6%). Pent=n-pentyl.

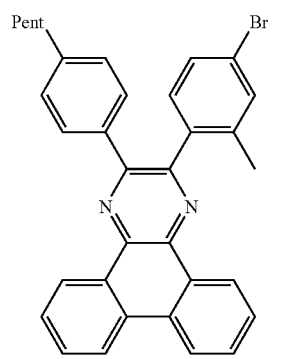

+

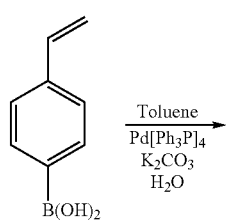

Toluene
Pd[Ph₃P]₄
K₂CO₃
H₂O
→

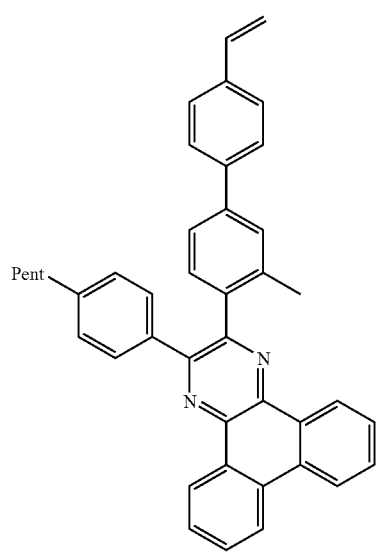

d) To 1.0 g (1.83 mmol) of the product of example 16c in 50 ml toluene are added 25 ml of 1M K₂CO₃ aqueous solution. Nitrogen is bubbled through the reaction mixture for 10 min and 0.54 g (3.67 mmol) of 4-vinylphenylboronic acid and 0.42 g (0.37 mmol) Pd[Ph₃P]₄ are added. The reaction mixture is stirred at 80° C. for 2 h and overnight at room temperature. The reaction mixture is washed with Na₂S₂O₃ aq., extracted with chloroform and purified by column chromatography on silica gel with hexane:ethyl acetate (9:1) as an eluent and further precipitated in methanol. Yield 0.84 g (80.7%). Pent=n-pentyl.

Example 17

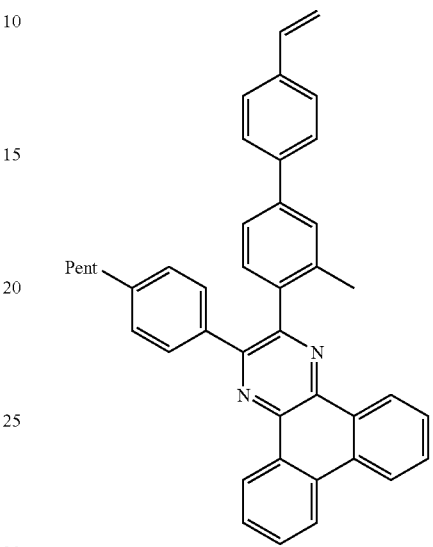

CG-39-0401
chlorobenzene
→

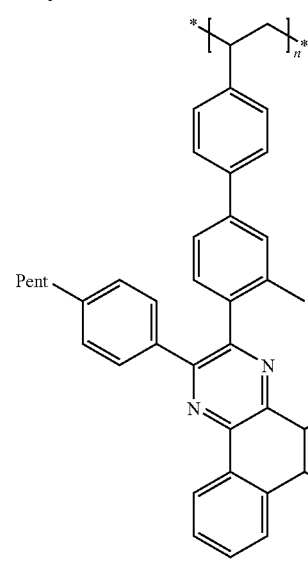

0.5 g of example 16d and 2.9 mg of alkoxyamine initiator CG-39-0401

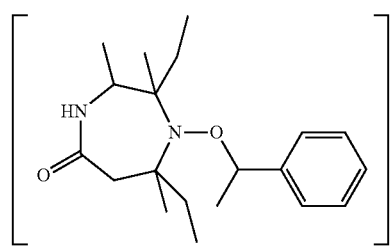

are dissolved in 0.5 ml chlorobenzene, degassed and stirred at 120° C. for 20 h. The obtained polymer is purified by precipitation in MeOH (yield: 0.35 g (70%)). Mw=29 000, PDI=1.46.

Example 18

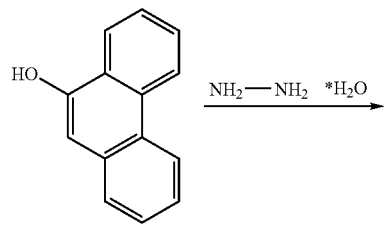

a) 3 g (15.44 mmol) 9-phenanthrol and 0.48 ml hydrazine monohydrate are sealed in autoclave and heated to 180° C. overnight. The product is washed with hexane. Yield 2.5 g (80%).

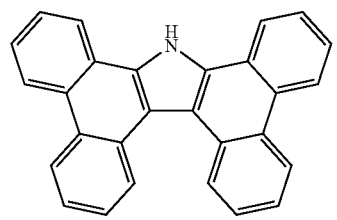

b) 1.8 g (4.9 mmol) of the product of example 18a is dissolved in 27 ml dry DMF and a suspension of 0.18 g (7.5 mmol) NaH in 11 ml DMF is added and the reaction mixture is stirred 20 min at room temperature. 1.64 g (7.3 mmol) 2-(3-bromopropoxy)tetrahydro-2h-pyran is added and the reaction mixture is stirred overnight at 120° C. DMF is evaporated and the residue is redissolved in ethanol. 3 g (11.9 mmol) p-toluenesulfonic acid pyridine salt is added and stirred 3 h at 70° C. Water is added to quench the reaction and the product is extracted with chloroform and further purified by column chromatography on silica gel with heptane: ethyl acetate (8:2) as an eluent. Yield 1.3 g (46.3%).

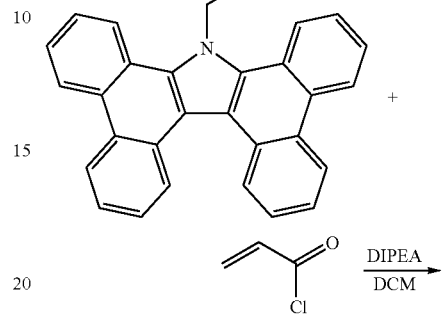

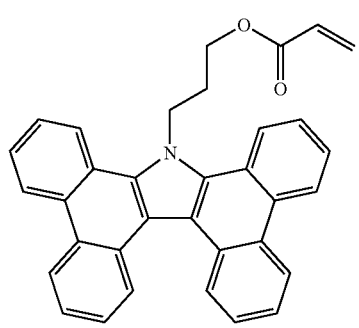

c) 1.2 g (2.8 mmol) of the product of example 18b are dissolved in 15 ml dichloromethane with 1 ml diisopropylethylamine and cooled down to 0° C. 0.4 g (4.32 mmol) acrylic acid chloride are added and the reaction mixture is stirred for 30 min at 0° C. The product is purified by column chromatography on silica gel with heptane: ethyl acetate (1:1) as an eluent. Yield 1.05 g (77.7%).

Example 19

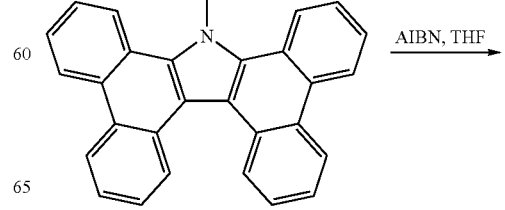

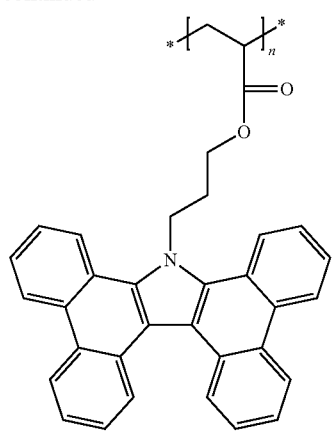

0.5 g of the product of example 18c and 15 mg of AIBN are dissolved in 3 ml THF, degassed and stirred at 60° C. for 24 h. The obtained polymer is purified by precipitation in MeOH (yield: 0.41 g (82.0%)).

Mw=12 000, PDI=1.82.

Example 20

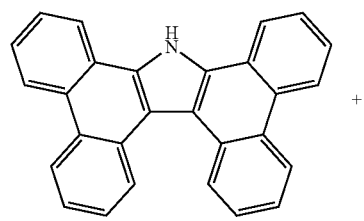

+

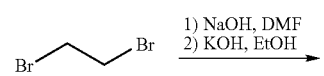

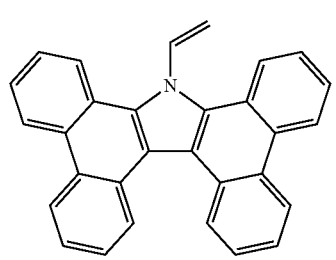

To 1.3 g (3.54 mmol) of the product of example 18a and 4 g NaOH in 5 ml DMF 6.65 g (35.3 mmol) dibromoethane is added and stirred overnight at 120° C. The solvent is changed to ethanol and an excess of KOH is added and the reaction mixture is refluxed for 3 h. The product is purified by column chromatography on silica gel with heptane:toluene (8:2) as an eluent. Yield 1.0 g (71.9%).

Example 21

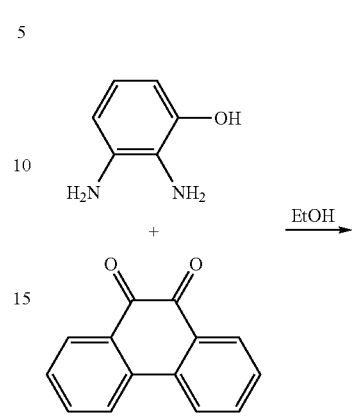

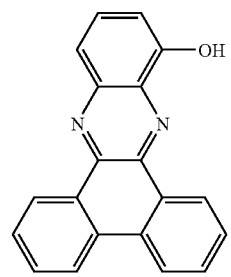

a) 3 g (14.4 mmol) phenanthrene-9,10-dione and 2.15 g (17.36 mmol) 2,3-diaminophenol are dissolved in 120 ml ethanol and refluxed for 24 h. The reaction mixture is cooled down, filtered and washed with ethanol. Yield 3.94 g (92.3%).

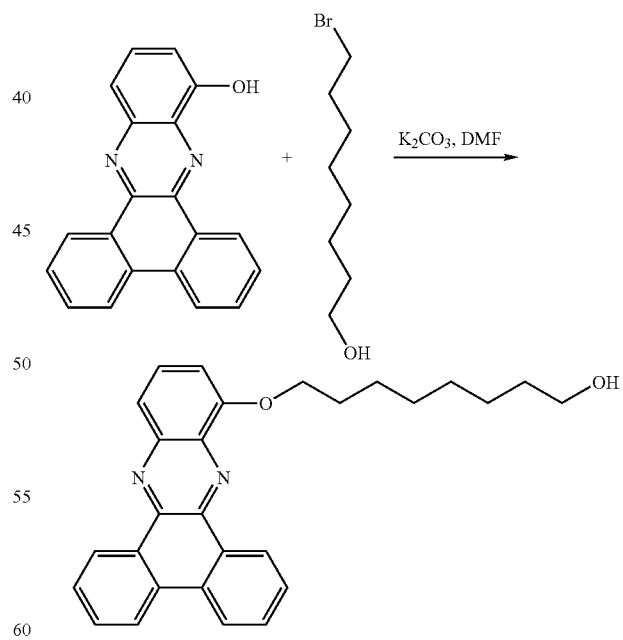

b) To 2 g (6.75 mmol) of the product of example 21a and 2.33 g (16.87 mmol) $K_2CO_3$ in 20 ml dry dimethylformamide (DMF) 2.82 g (13.5 mmol) 8-bromo-1-octanol are added and stirred overnight at 120° C. The DMF is evaporated. The residue is redissolved in ethyl acetate and reprecipitated in heptane. Yield 0.89 g (31%).

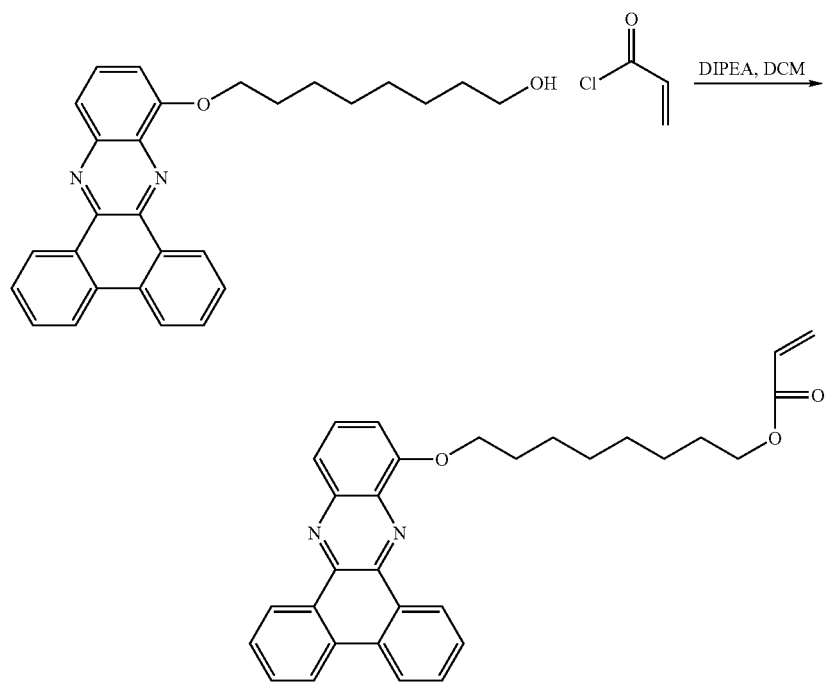

c) The product is prepared according to example 18c (yield: 0.5 g (29.7%)).

Example 22

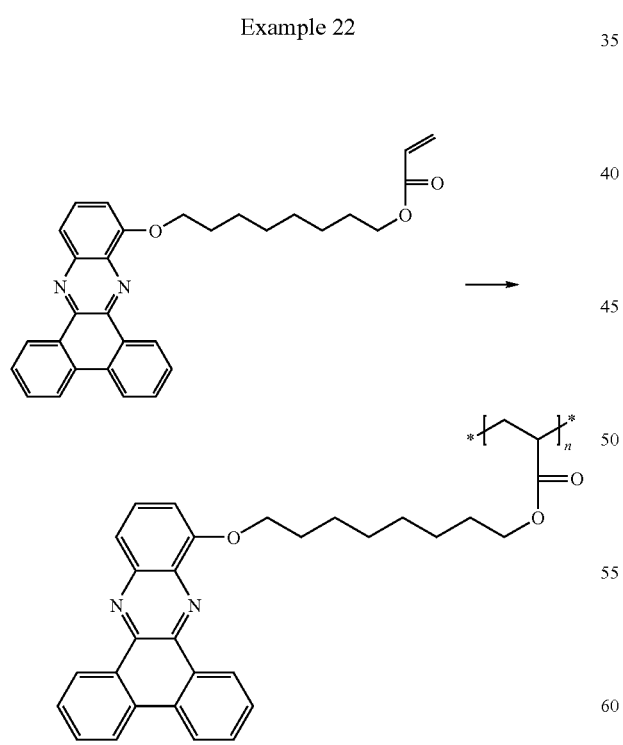

0.5 g of the product of example 21c and 15 mg of AIBN are dissolved in 5 ml chlorobenzene, degassed and stirred at 60° C. for 24 h. The obtained polymer is purified by precipitation in MeOH (yield: 0.41 g (82.0%)).

The invention claimed is:

1. A polymer comprising a repeating unit(s) of the formula

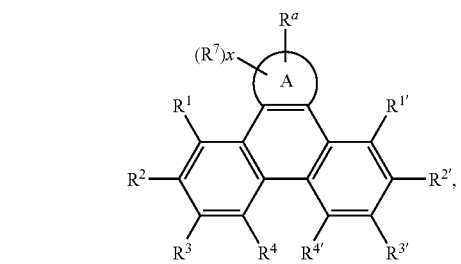

(I)

wherein A is a 5-, 6-, or 7-membered heteroaromatic ring, containing at least one heteroatom selected from nitrogen, oxygen and sulfur, when A is 5-membered ring, A contains not more than 2 heteroatom, $R^a$, $R^1$, $R^2$, $R^3$, $R^4$, $R^{1'}$, $R^{2'}$, $R^{3'}$ and $R^{4'}$ are independently of each other hydrogen, halogen, or an organic substituent, or $R^a$, $R^1$, $R^2$, $R^3$, $R^4$, $R^{1'}$, $R^{2'}$, $R^{3'}$ and $R^{4'}$, if possible, together form an aromatic, or heteroaromatic ring, or ring system, which can optionally be substituted, $R^7$ is halogen, or an organic substituent, wherein two or more substituents $R^7$ in the same molecule may have different meanings, or can form together an aromatic, or heteroaromatic ring, or ring system, wherein at least one of $R^a$, $R^1$, $R^2$, $R^3$, $R^4$, $R^{1'}$, $R^{2'}$, $R^{3'}$ and $R^{4'}$ is a group $R^{10}$, wherein $R^{10}$ is a group -(Sp)$_{x1}$-[PG']<, wherein Sp is a spacer unit, PG' is a group derived from a polymerisable group selecting from —C($R^{44}$)=CH$_2$, —NHC(O)—C($R^{45}$)=CH$_2$, —OCH$_2$CH$_2$OC(O)—C($R^{45}$)=CH$_2$, —OC(O)—C($R^{45}$)=CH$_2$, —C(O)—C($R^{46}$)=CH$_2$, —C≡C—, —C≡, —OCH(CH$_2$CH$_2$CH=CH$_2$)$_2$; $C_5$-$C_8$cycloalkenyl, a substituted or unsubstituted bicycloalkenyl group having 5 to 30 carbon atoms,

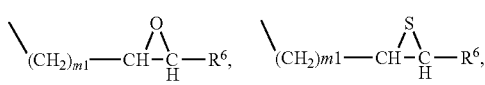

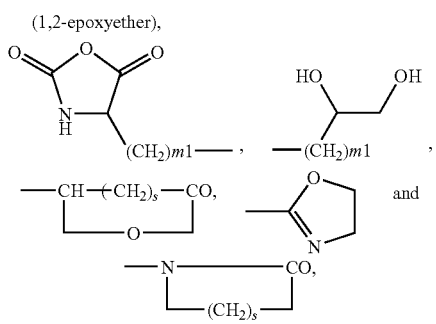

wherein
s is an integer from 1 to 6, m1 is an integer from 1 to 6,
$R^6$ is hydrogen, or $C_1$-$C_{20}$alkyl,
$R^{44}$ is hydrogen, or $C_1$-$C_4$alkyl, or halogen,
$R^{45}$ is hydrogen, $C_1$-$C_4$alkyl, or halogen, and
$R^{46}$ is hydrogen, $C_1$-$C_4$alkyl, or $C_6$-$C_{12}$aryl, or
PG' is a group derived from a polymerisable group

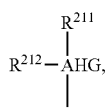

wherein
AHG is an aromatic, or heteroaromatic residue

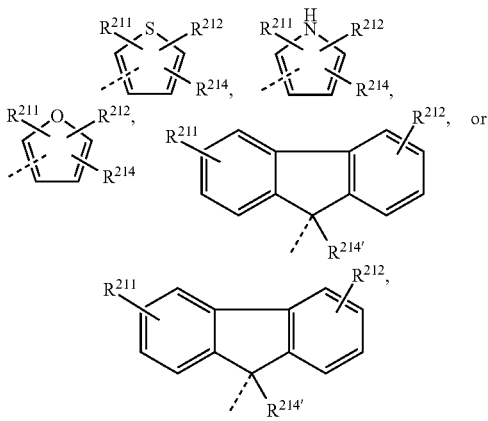

$R^{211}$ and $R^{212}$ are independently of each other H, halogen, —C≡CH, boronic acid, or boronic esters, —Mg-Hal, —Zn-Hal, —Sn $(R^{213})_3$, wherein Hal is halogen, and $R^{213}$ is $C_1$-$C_{18}$alkyl,
$R^{214}$ and $R^{214'}$ are independently of each other H, $C_1$-$C_{18}$alkyl, $C_1$-$C_{18}$alkyl which is interrupted by D, $C_1$-$C_{18}$perfluoroalkyl, $C_1$-$C_{18}$alkoxy, $C_1$-$C_{18}$alkoxy which is interrupted by D, or $C_7$-$C_{25}$aralkyl,
x1 is 0, or 1, and
x is 0, or an integer of 1 to 4.

2. A polymer according to claim 1, comprising a repeating unit(s) of the formula

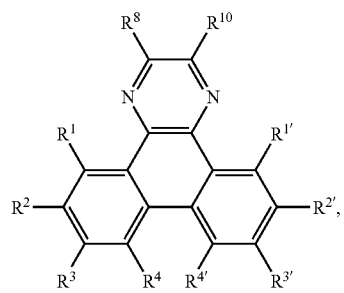
(X)

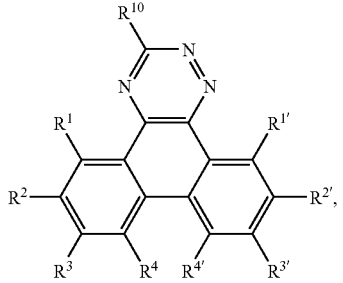
(XI)

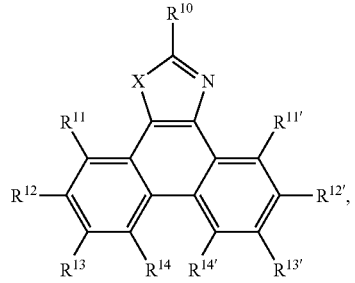
(XII)

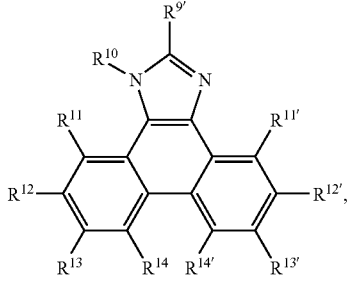
(XIII)

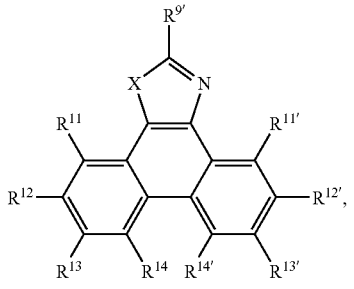
(XIV)

-continued

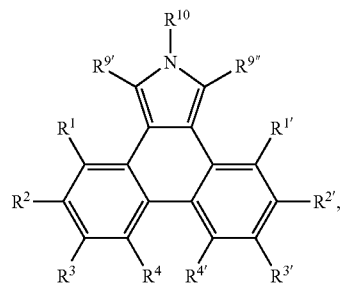
(XV)

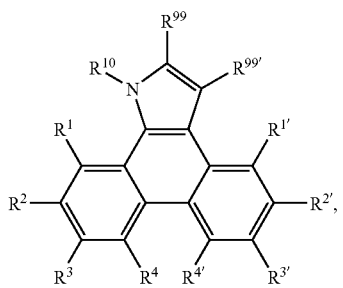
(XVI)

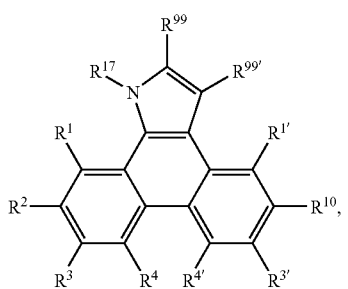
(XVII)

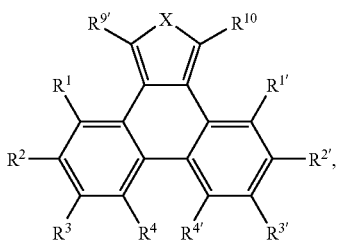
(XVIII)

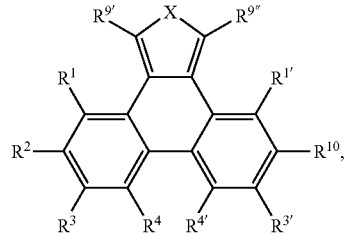
(XIX)

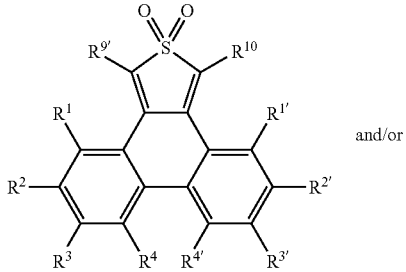
(XX)

and/or

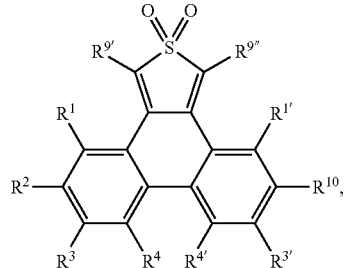
(XXI)

wherein $R^1$ and $R^{1'}$ are independently of each other hydrogen, halogen, $C_1$-$C_{18}$alkyl, $C_1$-$C_{18}$alkyl which is substituted by E and/or interrupted by D, $C_1$-$C_{18}$perfluoroalkyl, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, CN, or —CO—$R^{28}$, $R^2$, $R^3$, $R^4$, $R^{2'}$, $R^{3'}$ and $R^{4'}$, are independently of each other H, halogen, $C_1$-$C_{18}$alkyl, $C_1$-$C_{18}$alkyl which is substituted by E and/or interrupted by D, $C_1$-$C_{18}$perfluoroalkyl, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, $C_7$-$C_{25}$aralkyl, CN, or —CO—$R^{28}$, $R^8$ is H, $C_1$-$C_{18}$alkyl, $C_1$-$C_{18}$alkyl which is substituted by E and/or interrupted by D, $C_1$-$C_{18}$perfluoroalkyl, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, $C_7$-$C_{25}$aralkyl, CN, or —CO—$R^{28}$, $R^{9'}$, $R^{9''}$, $R^{99}$ and $R^{99'}$ is H, $C_1$-$C_{18}$alkyl, $C_1$-$C_{18}$alkyl which is substituted by E and/or interrupted by D, $C_1$-$C_{18}$perfluoroalkyl, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, $C_7$-$C_{25}$aralkyl, or —CO—$R^{28}$, $R^{10}$ is a group -(Sp)$_{x1}$-[PG']<, wherein Sp is a spacer unit, PG' is a group derived from a polymerisable group, and x1 is 0, or 1, or $R^8$ and $R^{10}$ together form a group

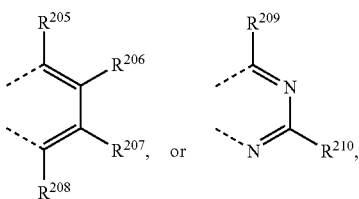

wherein one of the substituents $R^{205}$, $R^{206}$, $R^{207}$ and $R^{208}$, and one of the substituents $R^{208}$ and $R^{210}$ is a group $R^{10}$ and the other substituents are independently of each other H, $C_1$-$C_{18}$alkyl, $C_1$-$C_{18}$alkyl which is substituted by E and/or interrupted by D, $C_1$-$C_{18}$alkoxy, or $C_1$-$C_{18}$alkoxy which is substituted by E and/or interrupted by D, $R^{11}$ and $R^{11'}$ are independently of each other hydrogen, halogen, $C_1$-$C_{18}$alkyl, $C_1$-$C_{18}$alkyl which is substituted by E and/or interrupted by D, $C_1$-$C_{18}$perfluoroalkyl, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, CN, or —CO—$R^{28}$, $R^{12}$, $R^{13}$, $R^{14}$, $R^{12'}$, $R^{13'}$ and $R^{14'}$ are independently of each other H, halogen, $C_1$-$C_{18}$alkyl, $C_1$-$C_{18}$alkyl which is substituted by E and/or interrupted by D, $C_1$-$C_{18}$perfluoroalkyl, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, $C_7$-$C_{25}$aralkyl, CN or —CO—$R^{28}$, X is O, S, or $NR^{17}$, wherein $R^{17}$ is $C_1$-$C_{18}$alkyl, $C_1$-$C_{18}$alkyl which is substituted by E and/or interrupted by D, $C_1$-$C_{18}$perfluoroalkyl, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_7$-$C_{25}$aralkyl, or —CO—$R^{28}$;

or two substituents $R^1$, $R^2$, $R^3$ and $R^4$; $R^{1'}$, $R^{2'}$, $R^{3'}$ and $R^{4'}$; $R^{11}$, $R^{12}$, $R^{13}$ and $R^{14}$; $R^{11'}$, $R^{12'}$, $R^{13'}$ and $R^{14'}$, which are adjacent to each other, together form a group

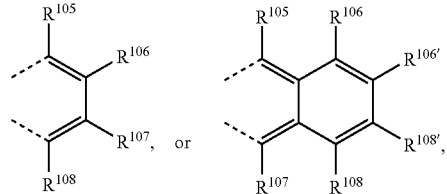

or two substituents $R^{99}$ and $R^{99'}$, which are adjacent to each other, together form a group

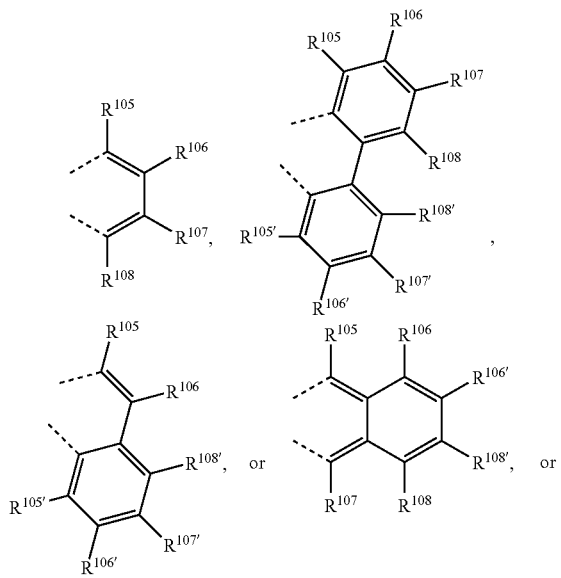

two substituents $R^4$ and $R^{4'}$, and/or $R^{14}$ and $R^{14'}$, which are adjacent to each other, together form a group

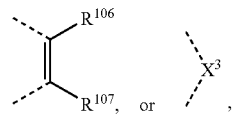

wherein $X^3$ is O, S, $C(R^{119})(R^{120})$, or $NR^{17}$, wherein $R^{17}$ is as defined above, $R^{105}$, $R^{106}$, $R^{107}$, $R^{108}$, $R^{105'}$, $R^{106'}$, $R^{107'}$ and $R^{108'}$ are independently of each other H, $C_1$-$C_{18}$alkyl, $C_1$-$C_{18}$alkyl which is substituted by E and/or interrupted by D, $C_1$-$C_{18}$alkoxy, or $C_1$-$C_{18}$alkoxy which is substituted by E and/or interrupted by D, $R^{119}$ and $R^{120}$ are independently of each other H, $C_1$-$C_{18}$alkyl, $C_1$-$C_{18}$alkyl which is substituted by E and/or interrupted by D, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, or $C_7$-$C_{25}$aralkyl, or $R^{119}$ and $R^{120}$ together form a group of formula =$CR^{121}R^{122}$, wherein $R^{121}$ and $R^{122}$ are independently of each other H, $C_1$-$C_{18}$alkyl, $C_1$-$C_{18}$alkyl which is substituted by E and/or interrupted by D, $C_6$-$C_{24}$aryl, $C_6$-$C_{24}$aryl which is substituted by G, or $C_2$-$C_{20}$heteroaryl, or $C_2$-$C_{20}$heteroaryl which is substituted by G, or $R^{119}$ and $R^{120}$ together form a five or six membered ring, which optionally can be substituted by $C_1$-$C_{18}$alkyl, $C_1$-$C_{18}$alkyl which is substituted by E and/or interrupted by D, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, $C_7$-$C_{25}$aralkyl, or —C(=O)—$R^{127}$, and $R^{127}$ is H; $C_6$-$C_{18}$aryl; $C_6$-$C_{18}$aryl which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—, D is —CO—; —COO—; —S—; —SO—; —$SO_2$—; —O—; —$NR^{25}$—; —$SiR^{30}R^{31}$—; —$POR^{32}$—; —$CR^{23}$=$CR^{24}$—; or —C≡C—; and E is —$OR^{29}$; —$SR^{29}$; —$NR^{25}R^{26}$; —$COR^{28}$; —$COOR^{27}$; —$CONR^{25}R^{26}$; —CN; or halogen; G is E, $C_1$-$C_{18}$alkyl, $C_1$-$C_{18}$alkyl which is interrupted by D, $C_1$-$C_{18}$perfluoroalkyl, or $C_1$-$C_{18}$alkoxy which is substituted by E and/or interrupted by D, wherein $R^{23}$, $R^{24}$, $R^{25}$ and $R^{26}$ are independently of each other H; $C_6$-$C_{18}$aryl; $C_6$-$C_{18}$aryl which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—; or $R^{25}$ and $R^{26}$ together form a five or six membered ring, $R^{27}$ and $R^{28}$ are independently of each other H; $C_6$-$C_{18}$aryl; $C_6$-$C_{18}$aryl which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—, $R^{29}$ is H; $C_6$-$C_{18}$aryl; $C_6$-$C_{18}$aryl, which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—, $R^{30}$ and $R^{31}$ are independently of each other $C_1$-$C_{18}$alkyl, $C_6$-$C_{18}$aryl, or $C_6$-$C_{18}$aryl, which is substituted by $C_1$-$C_{18}$alkyl, and $R^{32}$ is $C_1$-$C_{18}$alkyl, $C_6$-$C_{18}$aryl, or $C_6$-$C_{18}$aryl, which is substituted by $C_1$-$C_{18}$alkyl, or $R^{9'}$, $R^{12}$, $R^{13}$, $R^{14}$, $R^{12'}$, $R^{13'}$ and $R^{14'}$ are a group -(Sp)$_{x1}$-HEI, wherein Sp is a spacer unit, HEI is a group (HEI$^I$), which increases the hole-injection or hole-transport properties of the polymers; or a group (HEI$^{II}$), which increases the electron-injection or electron-transport properties of the polymers, x1 is 0, or 1, with the proviso that at least one of the substituents $R^{12}$, $R^{13}$, $R^{12'}$ and $R^{13'}$ of the compound of the formula XIV is a group $R^{10}$.

3. A polymer according to claim 2, comprising a repeating unit of the formula X, or XI, wherein $R^1$ and $R^{1'}$ are hydrogen, $R^2$, $R^3$, $R^4$, $R^{2'}$, $R^{3'}$ and $R^{4'}$ are independently of each other H, $C_1$-$C_{18}$alkyl, $C_1$-$C_{18}$alkyl which is interrupted by D, $C_1$-$C_{18}$perfluoroalkyl, $C_1$-$C_{18}$alkoxy, $C_1$-$C_{18}$alkoxy which is interrupted by D, or $C_7$-$C_{25}$aralkyl, $R^8$ is H, $C_1$-$C_{18}$alkyl, $C_1$-$C_{18}$alkyl which is interrupted by D, $C_1$-$C_{18}$perfluoroalkyl, $C_1$-$C_{18}$alkoxy, or $C_1$-$C_{18}$alkoxy which is interrupted by D, two substituents $R^1$, $R^2$, $R^3$, $R^4$, $R^{1'}$, $R^{2'}$, $R^{3'}$ and $R^{4'}$, which are adjacent to each other, together form a group

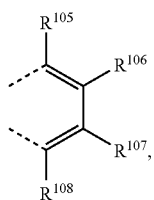

or two substituents $R^4$ and $R^{4'}$, which are adjacent to each other, together form a group

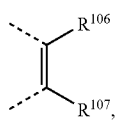

wherein $R^{105}$, $R^{106}$, $R^{107}$ and $R^{108}$ are independently of each other H, or $C_1$-$C_8$alkyl, $R^{10}$ is a group -(Sp)$_{x1}$-[PG']<, wherein Sp is a spacer unit, PG' is a group derived from a polymerisable group, and x1 is 0, or 1, D is —CO—; —COO—; —S—; —SO—; —SO$_2$—; —O—; —NR$^{25}$—; —CR$^{23}$=CR$^{24}$—; or —C≡C—; wherein $R^{23}$, $R^{24}$, $R^{25}$ and $R^{26}$ are independently of each other H; $C_6$-$C_{18}$aryl; $C_6$-$C_{18}$aryl which is substituted by $C_1$-$C_8$alkyl, or $C_1$-$C_8$alkoxy; $C_1$-$C_8$alkyl; or $C_1$-$C_8$alkyl which is interrupted by —O—, or $R^{25}$ and $R^{26}$ together form a five or six membered ring, or a polymer according to claim 2, comprising a repeating unit of the formula

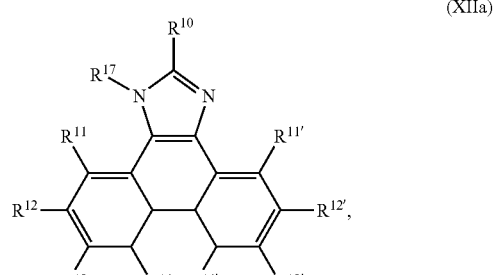
(XIIa)

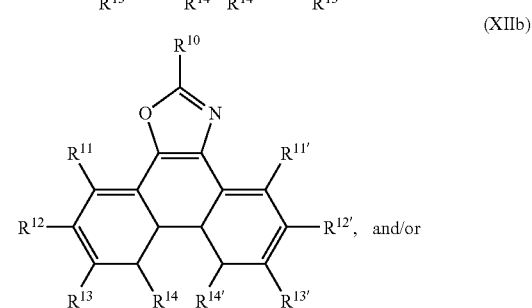
(XIIb) and/or

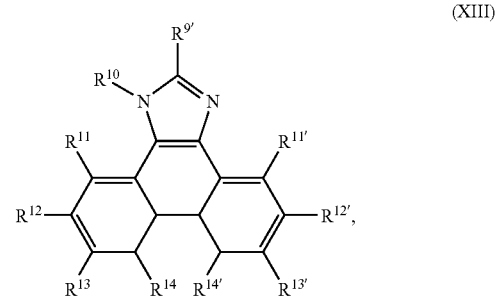
(XIII)

wherein $R^{9'}$ is H, $C_6$-$C_{18}$aryl, which can be substituted by G, $C_2$-$C_{18}$heteroaryl, which can be substituted by G, $C_1$-$C_{18}$alkyl, $C_1$-$C_{18}$alkyl which is interrupted by D, $C_1$-$C_{18}$perfluoroalkyl, $C_1$-$C_{18}$alkoxy, or $C_1$-$C_{18}$alkoxy which is substituted by E and/or interrupted by D, $R^{11}$ and $R^{11'}$ are hydrogen, $R^{12}$, $R^{13}$, $R^{14}$, $R^{12'}$, $R^{13'}$ and $R^{14'}$ are hydrogen, $R^{17}$ is $C_6$-$C_{18}$aryl; $C_6$-$C_{18}$aryl which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—; or two substituents $R^{11}$, $R^{12}$, $R^{13}$, $R^{14}$, $R^{11'}$, $R^{12'}$, $R^{13'}$ and $R^{14'}$, which are adjacent to each other, together form a group

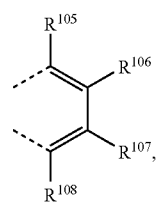

or two substituents $R^{14}$ and $R^{14'}$, which are adjacent to each other, together form a group

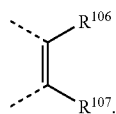

4. A polymer according to claim 1, wherein Sp is selected from —Ar—, —ArY—, —YAr—, —YAr(CR⁴⁷R⁴⁸)ₙ—, —ArY(CR⁴⁷R⁴⁸)ₙAr—, —ArY(CR⁴⁷R⁴⁸)ₙ—, —(CR⁴⁷R⁴⁸)ₙ—, —(YCR⁴⁷R⁴⁸)ₙ—, or —(CR⁴⁷R⁴⁸Y)ₙ—, wherein Y is $NR^5$, O, S, C=O, C(=O)O, wherein $R^5$ is H; $C_6$-$C_{18}$aryl; $C_6$-$C_{18}$aryl which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—;

$R^{47}$ and $R^{48}$ are independently of each other hydrogen, fluorine, or $C_1$-$C_{20}$alkyl, n is an integer of 1 to 20, Ar is alkylen, cycloalkylen, arylen, aralkylene, or heteroarylen, which can optionally be substituted.

5. The polymer according to claim 1, wherein the polymer is a
a homopolymer of formula

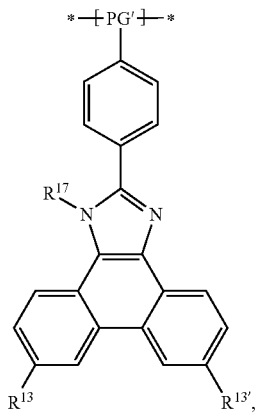

wherein

| Cpd. | PG' | $R^{13}$ | $R^{13'}$ | $R^{17}$ |
|---|---|---|---|---|
| A-1 | —CH₂—CH— | H | H | H |
| A-2 | —CH₂—CH— | H | H | n-C₈H₁₇ |
| A-3 | —CH₂—CH— | H | H | —C₆H₄—n-C₈H₁₇ |
| A-4 | —CH₂—CH— | N(Ph)₂ | N(Ph)₂ | n-C₈H₁₇ |
| A-5 | —CH₂—CH— | n-C₈H₁₇ | n-C₈H₁₇ | —C₆H₅ |
| A-7 | —CH₂—CH— | n-C₈H₁₇ | n-C₈H₁₇ | n-C₈H₁₇ |
| A-8 | —CH₂—C(CH₃)(C(=O)O—)— | H | H | H |
| A-9 | —CH₂—C(CH₃)(C(=O)O—)— | H | H | n-C₈H₁₇ |
| A-10 | —CH₂—C(CH₃)(C(=O)O—)— | H | H | —C₆H₄—n-C₈H₁₇ |

-continued

| Cpd. | PG' | R¹³ | R¹³' | R¹⁷ |
|---|---|---|---|---|
| A-11 | *−C(CH₃)(−*)−C(=O)−O−−− | N(Ph)₂ | N(Ph)₂ | n-C₈H₁₇ |
| A-12 | *−C(CH₃)(−*)−C(=O)−O−−− | n-C₈H₁₇ | n-C₈H₁₇ | –C₆H₅ |
| A-13 | *−C(CH₃)(−*)−C(=O)−O−−− | n-C₈H₁₇ | n-C₈H₁₇ | n-C₈H₁₇ |
| A-14 | *−CH(−*)−C(=O)−O−−− | H | H | H |
| A-15 | *−CH(−*)−C(=O)−O−−− | H | H | n-C₈H₁₇ |
| A-16 | *−CH(−*)−C(=O)−O−−− | H | H | –C₆H₄–n-C₈H₁₇ |
| A-17 | *−CH(−*)−C(=O)−O−−− | N(Ph)₂ | N(*Ph)₂ | n-C₈H₁₇ |
| A-18 | *−CH(−*)−C(=O)−O−−− | n-C₈H₁₇ | n-C₈H₁₇ | –C₆H₅ |
| A-19 | *−CH(−*)−C(=O)−O−−− | n-C₈H₁₇ | n-C₈H₁₇ | n-C₈H₁₇ |
| A-20 | *−(O−CH(−*)−CH₂−O−−−) | H | H | H |
| A-21 | *−(O−CH(−*)−CH₂−O−−−) | H | H | n-C₈H₁₇ |
| A-22 | *−(O−CH(−*)−CH₂−O−−−) | H | H | –C₆H₄–n-C₈H₁₇ |

-continued
| Cpd. | PG' | R[13] | R[13'] | R[17] |
|---|---|---|---|---|
| A-23 | 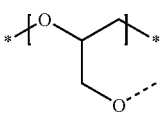 | N(Ph)$_2$ | N(Ph)$_2$ | n-C$_8$H$_{17}$ |
| A-24 | 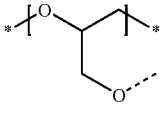 | n-C$_8$H$_{17}$ | n-C$_8$H$_{17}$ | 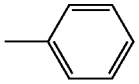 |
| A-25 | 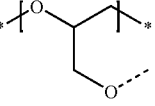 | n-C$_8$H$_{17}$ | n-C$_8$H$_{17}$ | n-C$_8$H$_{17}$ |
| A-26 | 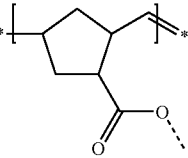 | H | H | H |
| A-27 | 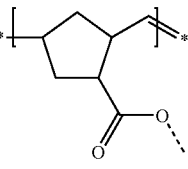 | H | H | n-C$_8$H$_{17}$ |
| A-28 | 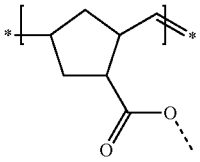 | H | H | 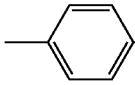—n-C$_8$H$_{17}$ |
| A-29 | 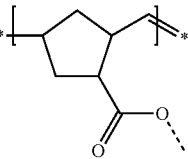 | N(Ph)$_2$ | N(Ph)$_2$ | n-C$_8$H$_{17}$ |
| A-30 | 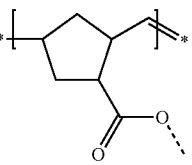 | n-C$_8$H$_{17}$ | n-C$_8$H$_{17}$ | 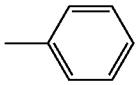 |
| A-31 | 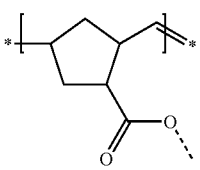 | n-C$_8$H$_{17}$ | n-C$_8$H$_{17}$ | n-C$_8$H$_{17}$ |
| A-32 | [1]) | H | H | H |
| A-33 | [1]) | H | H | n-C$_8$H$_{17}$ |
| A-34 | [1]) | H | H | 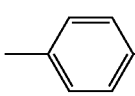—n-C$_8$H$_{17}$ |

-continued

| Cpd. | PG' | R¹³ | R¹³' | R¹⁷ |
|---|---|---|---|---|
| A-35 | 1) | N(Ph)₂ | N(Ph)₂ | n-C₈H₁₇ |
| A-36 | 1) | n-C₈H₁₇ | n-C₈H₁₇ | phenyl |
| A-37 | 1) | n-C₈H₁₇ | n-C₈H₁₇ | n-C₈H₁₇ |
| A-38 | 2) | H | H | H |
| A-39 | 2) | H | H | n-C₈H₁₇ |
| A-40 | 2) | H | H | 4-(n-C₈H₁₇)-phenyl |
| A-41 | 2) | N(Ph)₂ | N(Ph)₂ | n-C₈H₁₇ |
| A-42 | 2) | n-C₈H₁₇ | n-C₈H₁₇ | phenyl |
| A-43 | 2) | n-C₈H₁₇ | n-C₈H₁₇ | n-C₈H₁₇ |
| A-44 | thiophene-3-carboxylate | H | H |  |
| A-45 | thiophene-3-carboxylate | H | H | n-C₈H₁₇ |
| A-46 | thiophene-3-carboxylate | H | H | 4-(n-C₈H₁₇)-phenyl |
| A-47 | thiophene-3-carboxylate | N(Ph)₂ | N(Ph)₂ | n-C₈H₁₇ |
| A-48 | thiophene-3-carboxylate | n-C₈H₁₇ | n-C₈H₁₇ | phenyl |
| A-49 | thiophene-3-carboxylate | n-C₈H₁₇ | n-C₈H₁₇ | n-C₈H₁₇ |

-continued

| Cpd. | PG' | R¹³ | R¹³' | R¹⁷ |
|---|---|---|---|---|
| A-50 | *–CH=CH–* (branched) | H | H | H |
| A-51 | *–CH=CH–* (branched) | H | H | n-C$_8$H$_{17}$ |
| A-52 | *–CH=CH–* (branched) | H | H | –C$_6$H$_4$–n-C$_8$H$_{17}$ |
| A-53 | *–CH=CH–* (branched) | N(Ph)$_2$ | N(Ph)$_2$ | n-C$_8$H$_{17}$ |
| A-54 | *–CH=CH–* (branched) | n-C$_8$H$_{17}$ | n-C$_8$H$_{17}$ | Ph |
| A-55 | *–CH=CH–* (branched) | n-C$_8$H$_{17}$ | n-C$_8$H$_{17}$ | n-C$_8$H$_{17}$ |
| A-56 | *–CH$_2$–CH(C(O)NH–)–* | H | H | H |
| A-57 | *–CH$_2$–CH(C(O)NH–)–* | H | H | n-C$_8$H$_{17}$ |
| A-58 | *–CH$_2$–CH(C(O)NH–)–* | H | H | –C$_6$H$_4$–n-C$_8$H$_{17}$ |
| A-59 | *–CH$_2$–CH(C(O)NH–)–* | N(Ph)$_2$ | N(Ph)$_2$ | n-C$_8$H$_{17}$ |
| A-60 | *–CH$_2$–CH(C(O)NH–)–* | n-C$_8$H$_{17}$ | n-C$_8$H$_{17}$ | Ph |
| A-61 | *–CH$_2$–CH(C(O)NH–)–* | n-C$_8$H$_{17}$ | n-C$_8$H$_{17}$ | n-C$_8$H$_{17}$ |
| A-62 | *–CH$_2$–C(CH$_3$)(C(O)NH–)–* | H | H | H |

-continued

| Cpd. | PG' | R$^{13}$ | R$^{13'}$ | R$^{17}$ |
|---|---|---|---|---|
| A-63 | *—C(CH$_3$)$_2$—CH$_2$—*, C(=O)NH---- | H | H | n-C$_8$H$_{17}$ |
| A-64 | *—C(CH$_3$)$_2$—CH$_2$—*, C(=O)NH---- | H | H | —C$_6$H$_4$—n-C$_8$H$_{17}$ |
| A-65 | *—C(CH$_3$)$_2$—CH$_2$—*, C(=O)NH---- | N(Ph)$_2$ | N(Ph)$_2$ | n-C$_8$H$_{17}$ |
| A-66 | *—C(CH$_3$)$_2$—CH$_2$—*, C(=O)NH---- | n-C$_8$H$_{17}$ | n-C$_8$H$_{17}$ | —C$_6$H$_5$ |
| A-67 | *—C(CH$_3$)$_2$—CH$_2$—*, C(=O)NH---- | n-C$_8$H$_{17}$ | n-C$_8$H$_{17}$ | n-C$_8$H$_{17}$ |
| A-68 | *—C(CH$_3$)$_2$—CH$_2$—*, C(=O)NH---- | H | H | H |
| A-69 | *—C(CH$_3$)$_2$—CH$_2$—*, C(=O)NH---- | H | H | n-C$_8$H$_{17}$ |
| A-70 | *—C(CH$_3$)$_2$—CH$_2$—*, C(=O)NH---- | H | H | —C$_6$H$_4$—n-C$_8$H$_{17}$ |
| A-71 | *—C(CH$_3$)$_2$—CH$_2$—*, C(=O)NH---- | N(Ph)$_2$ | N(Ph)$_2$ | n-C$_8$H$_{17}$ |
| A-72 | *—C(CH$_3$)$_2$—CH$_2$—*, C(=O)NH---- | n-C$_8$H$_{17}$ | n-C$_8$H$_{17}$ | —C$_6$H$_5$ |

-continued
| Cpd. | PG' | $R^{13}$ | $R^{13'}$ | $R^{17}$ |
|---|---|---|---|---|
| A-73 | ![structure with CH3, C=O, NH] | n-$C_8H_{17}$ | n-$C_8H_{17}$ | n-$C_8H_{17}$ |
| A-74 | ![N-C=O structure] | H | H | H |
| A-75 | ![N-C=O structure] | H | H | n-$C_8H_{17}$ |
| A-76 | ![N-C=O structure] | H | H | ![phenyl-n-$C_8H_{17}$] |
| A-77 | ![N-C=O structure] | N(Ph)$_2$ | N(Ph)$_2$ | n-$C_8H_{17}$ |
| A-78 | ![N-C=O structure] | n-$C_8H_{17}$ | n-$C_8H_{17}$ | ![phenyl] |
| A-79 | ![N-C=O structure] | n-$C_8H_{17}$ | n-$C_8H_{17}$ | n-$C_8H_{17}$ |
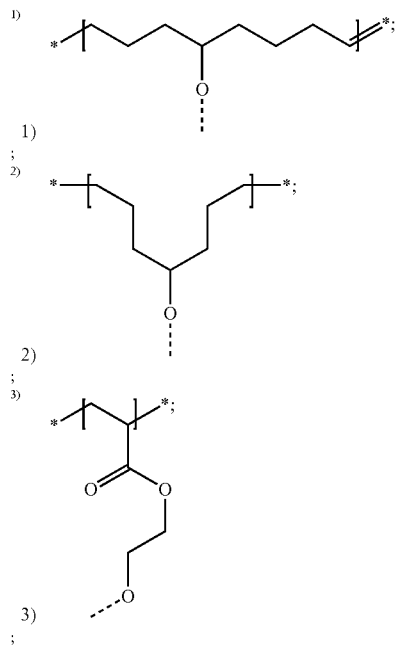
1) ;
2) ;
3) ;

a homopolymer of formula

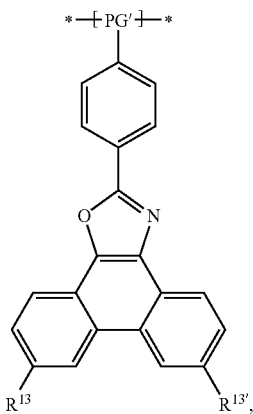

wherein

| Cpd. | PG' | R¹³ | R¹³' |
|---|---|---|---|
| B-1 | *—CH₂—CH—* | H | H |
| B-2 | *—CH₂—CH—* | N(Ph)₂ | N(Ph)₂ |
| B-3 | *—CH₂—CH—* | n-C₈H₁₇ | n-C₈H₁₇ |
| B-4 | *—C(CH₃)(C(O)O—)—CH₂—* | H | H |
| B-5 | *—C(CH₃)(C(O)O—)—CH₂—* | N(Ph)₂ | N(Ph)₂ |
| B-6 | *—C(CH₃)(C(O)O—)—CH₂—* | n-C₈H₁₇ | n-C₈H₁₇ |
| B-7 | *—CH(C(O)O—)—CH₂—* | H | H |
| B-8 | *—CH(C(O)O—)—CH₂—* | N(Ph)₂ | N(Ph)₂ |
| B-9 | *—CH(C(O)O—)—CH₂—* | n-C₈H₁₇ | n-C₈H₁₇ |
| B-10 | *—O—CH(CH₂O—)—* | H | H |
| B-11 | *—O—CH(CH₂O—)—* | N(Ph)₂ | N(Ph)₂ |
| B-12 | *—O—CH(CH₂O—)—* | n-C₈H₁₇ | n-C₈H₁₇ |
| B-13 | cyclopentyl-C(O)O— | H | H |
| B-14 | cyclopentyl-C(O)O— | N(Ph)₂ | N(Ph)₂ |
| B-15 | cyclopentyl-C(O)O— | n-C₈H₁₇ | n-C₈H₁₇ |
| B-16 | 1) | H | H |
| B-17 | 1) | N(Ph)₂ | N(Ph)₂ |
| B-18 | 1) | n-C₈H₁₇ | n-C₈H₁₇ |
| B-19 | 2) | H | H |
| B-20 | 2) | N(Ph)₂ | N(Ph)₂ |
| B-21 | 2) | n-C₈H₁₇ | n-C₈H₁₇ |
| B-22 | thiophene-C(O)O— | H | H |
| B-23 | thiophene-C(O)O— | N(Ph)₂ | N(Ph)₂ |

-continued

| Cpd. | PG' | R¹³ | R¹³' |
|---|---|---|---|
| B-24 | thiophene with CO-O- linker | n-C₈H₁₇ | n-C₈H₁₇ |
| B-25 | *-CH=C(-)-* (with dashed bond) | H | H |
| B-26 | *-CH=C(-)-* | N(Ph)₂ | N(Ph)₂ |
| B-27 | *-CH=C(-)-* | n-C₈H₁₇ | n-C₈H₁₇ |
| B-28 | *-CH₂-CH(-)-* with C(O)NH---- | H | H |
| B-29 | *-CH₂-CH(-)-* with C(O)NH---- | N(Ph)₂ | N(Ph)₂ |
| B-30 | *-CH₂-CH(-)-* with C(O)NH---- | n-C₈H₁₇ | n-C₈H₁₇ |
| B-31 | *-CH₂-C(CH₃)(-)-* with C(O)NH---- | H | H |
| B-32 | *-CH₂-C(CH₃)(-)-* with C(O)NH---- | N(Ph)₂ | N(Ph)₂ |
| B-33 | *-CH₂-C(CH₃)(-)-* with C(O)NH---- | n-C₈H₁₇ | n-C₈H₁₇ |
| B-34 | *-CH₂-C(CH₃)(-)-* with C(O)NH---- | H | H |

-continued

| Cpd. | PG' | R¹³ | R¹³' |
|---|---|---|---|
| B-35 | *-CH₂-C(CH₃)(-)-* with C(O)NH---- | N(Ph)₂ | N(Ph)₂ |
| B-36 | *-CH₂-C(CH₃)(-)-* with C(O)NH---- | n-C₈H₁₇ | n-C₈H₁₇ |
| B-37 | *-N(CH₂CH₂-)* with C(O)---- | H | H |
| B-38 | *-N(CH₂CH₂-)* with C(O)---- | N(Ph)₂ | N(Ph)₂ |
| B-39 | *-N(CH₂CH₂-)* with C(O)---- | n-C₈H₁₇ | n-C₈H₁₇ |

1) $*{-}(CH_2)_3{-}CH(O{-}){-}(CH_2)_3{-}*$ ;

2) $*{-}CH_2{-}CH({-}CH_2{-}CH(O{-}){-}){-}*$ ;

3) $*{-}CH_2{-}C({-}){-}C(O)O{-}CH_2CH_2{-}O{-}*$ ;

a homopolymer of formula

[phenanthro-imidazole structure with R¹³ and R¹³' substituents on the phenanthrene, N-Sp-[PG']— linker, and R⁹ on imidazole], wherein
| Cpd. | R¹³ | R¹³' | R⁹ | Sp | PG' |
|---|---|---|---|---|---|
| C-1 | H | H | Ph | 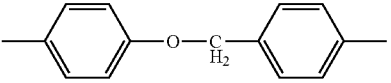 | 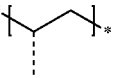 |
| C-2 | H | H | 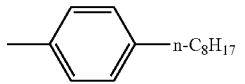 | 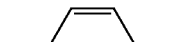 | 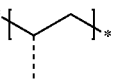 |
| C-3 | H | H | 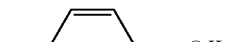 | 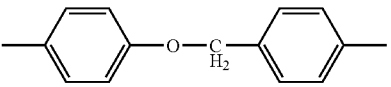 | 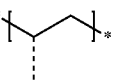 |
| C-4 | n-C₈H₁₅ | n-C₈H₁₅ | Ph | 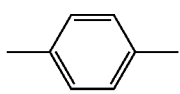 | 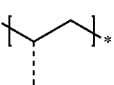 |
| C-5 | n-C₈H₁₅ | n-C₈H₁₅ | Ph | 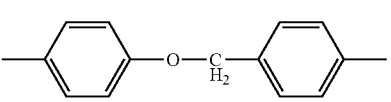 | 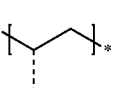 |
| C-6 | Br | Br | 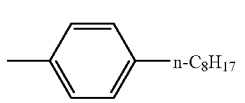 | 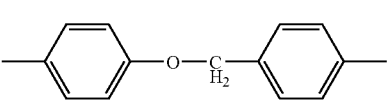 | 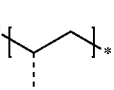 |
| C-7 | H | H | Ph | 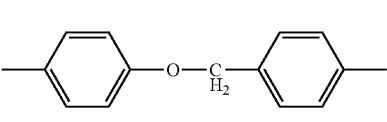 | 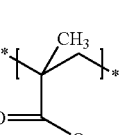 |
| C-8 | H | H | 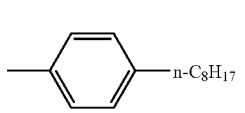 | 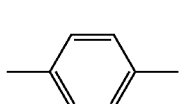 | 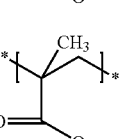 |
| C-9 | H | H | 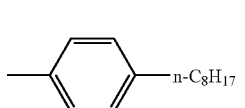 | 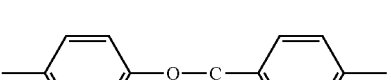 | 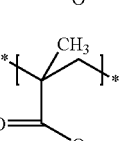 |
| C-10 | n-C₈H₁₅ | n-C₈H₁₅ | Ph | 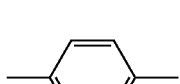 | 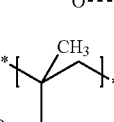 |
| C-11 | n-C₈H₁₅ | n-C₈H₁₅ | Ph |  | 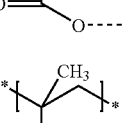 |
| C-12 | Br | Br | 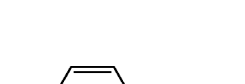 |  | 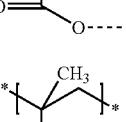 |
| C-13 | H | H | Ph |  | 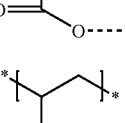 |

-continued

| Cpd. | R¹³ | R¹³' | R⁹ | Sp | PG' |
|---|---|---|---|---|---|
| C-14 | H | H | —C₆H₄—n-C₈H₁₇ | —C₆H₄— | acrylate |
| C-15 | H | H | —C₆H₄—n-C₈H₁₇ | —C₆H₄—O—CH₂—C₆H₄— | acrylate |
| C-16 | n-C₈H₁₅ | n-C₈H₁₅ | Ph | —C₆H₄— | acrylate |
| C-17 | n-C₈H₁₅ | n-C₈H₁₅ | Ph | —C₆H₄—O—CH₂—C₆H₄— | acrylate |
| C-18 | Br | Br | —C₆H₄—n-C₈H₁₇ | —C₆H₄—O—CH₂—C₆H₄— | acrylate |
| C-19 | H | H | Ph | —C₆H₄—O—CH₂—C₆H₄— | glycidyl ether |
| C-20 | H | H | —C₆H₄—n-C₈H₁₇ | —C₆H₄— | glycidyl ether |
| C-21 | H | H | —C₆H₄—n-C₈H₁₇ | —C₆H₄—O—CH₂—C₆H₄— | glycidyl ether |
| C-22 | n-C₈H₁₅ | n-C₈H₁₅ | Ph | —C₆H₄— | glycidyl ether |
| C-23 | n-C₈H₁₅ | n-C₈H₁₅ | Ph | —C₆H₄—O—CH₂—C₆H₄— | glycidyl ether |
| C-24 | Br | Br | —C₆H₄—n-C₈H₁₇ | —C₆H₄—O—CH₂—C₆H₄— | glycidyl ether |
| C-25 | H | H | Ph | —C₆H₄—O—CH₂—C₆H₄— | norbornene carboxylate |

-continued

| Cpd. | R¹³ | R¹³' | R⁹ | Sp | PG' |
|---|---|---|---|---|---|
| C-26 | H | H | –C₆H₄–n-C₈H₁₇ | –C₆H₄– | cyclopentane-C(=O)-O– |
| C-27 | H | H | –C₆H₄–n-C₈H₁₇ | –C₆H₄–O–CH₂–C₆H₄– | cyclopentane-C(=O)-O– |
| C-28 | n-C₈H₁₅ | n-C₈H₁₅ | Ph | –C₆H₄– | cyclopentane-C(=O)-O– |
| C-29 | n-C₈H₁₅ | n-C₈H₁₅ | Ph | –C₆H₄–O–CH₂–C₆H₄– | cyclopentane-C(=O)-O– |
| C-30 | Br | Br | –C₆H₄–n-C₈H₁₇ | –C₆H₄–O–CH₂–C₆H₄– | cyclopentane-C(=O)-O– |
| C-31 | H | H | Ph | –C₆H₄–O–CH₂–C₆H₄– | 1) |
| C-32 | H | H | –C₆H₄–n-C₈H₁₇ | –C₆H₄– | 1) |
| C-33 | H | H | –C₆H₄–n-C₈H₁₇ | –C₆H₄–O–CH₂–C₆H₄– | 1) |
| C-34 | n-C₈H₁₅ | n-C₈H₁₅ | Ph | –C₆H₄– | 1) |
| C-35 | n-C₈H₁₅ | n-C₈H₁₅ | Ph | –C₆H₄–O–CH₂–C₆H₄– | 1) |
| C-36 | Br | Br | –C₆H₄–n-C₈H₁₇ | –C₆H₄–O–CH₂–C₆H₄– | 1) |
| C-37 | H | H | Ph | –C₆H₄–O–CH₂–C₆H₄– | 2) |

-continued

| Cpd. | $R^{13}$ | $R^{13'}$ | $R^9$ | Sp | PG' |
|---|---|---|---|---|---|
| C-38 | H | H | -C6H4-n-C8H17 | -C6H4- | 2) |
| C-39 | H | H | -C6H4-n-C8H17 | -C6H4-O-CH2-C6H4- | 2) |
| C-40 | n-C8H15 | n-C8H15 | Ph | -C6H4- | 2) |
| C-41 | n-C8H15 | n-C8H15 | Ph | -C6H4-O-CH2-C6H4- | 2) |
| C-42 | Br | Br | -C6H4-n-C8H17 | -C6H4-O-CH2-C6H4- | 2) |
| C-43 | H | H | Ph | -C6H4-O-CH2-C6H4- | thiophene-C(O)O- |
| C-44 | H | H | -C6H4-n-C8H17 | -C6H4- | thiophene-C(O)O- |
| C-45 | H | H | -C6H4-n-C8H17 | -C6H4-O-CH2-C6H4- | thiophene-C(O)O- |
| C-46 | n-C8H15 | n-C8H15 | Ph | -C6H4- | thiophene-C(O)O- |
| C-47 | n-C8H15 | n-C8H15 | Ph | -C6H4-O-CH2-C6H4- | thiophene-C(O)O- |
| C-48 | Br | Br | -C6H4-n-C8H17 | -C6H4-O-CH2-C6H4- | thiophene-C(O)O- |

-continued

| Cpd. | R13 | R13' | R9 | Sp | PG' |
|---|---|---|---|---|---|
| C-49 | H | H | Ph | —C6H4—O—CH2—C6H4— | *—CH=CH—* (dashed) |
| C-50 | H | H | —C6H4—n-C8H17 | —C6H4— | *—CH=CH—* (dashed) |
| C-51 | H | H | —C6H4—n-C8H17 | —C6H4—O—CH2—C6H4— | *—CH=CH—* (dashed) |
| C-52 | n-C8H15 | n-C8H15 | Ph | —C6H4— | *—CH=CH—* (dashed) |
| C-53 | n-C8H15 | n-C8H15 | Ph | —C6H4—n-C8H17 | *—CH=CH—* (dashed) |
| C-54 | Br | Br | —C6H4—n-C8H17 | —C6H4—O—CH2—C6H4— | *—CH=CH—* (dashed) |
| C-55 | H | H | Ph | —C6H4—O—CH2—C6H4— | *—CH2—CH(C(=O)NH—)—* |
| C-56 | H | H | —C6H4—n-C8H17 | —C6H4— | *—CH2—CH(C(=O)NH—)—* |
| C-57 | H | H | —C6H4—n-C8H17 | —C6H4—O—CH2—C6H4— | *—CH2—CH(C(=O)NH—)—* |
| C-58 | n-C8H15 | n-C8H15 | Ph | —C6H4— | *—CH2—CH(C(=O)NH—)—* |
| C-59 | n-C8H15 | n-C8H15 | Ph | —C6H4—O—CH2—C6H4— | *—CH2—CH(C(=O)NH—)—* |
| C-60 | Br | Br | —C6H4—n-C8H17 | —C6H4—O—CH2—C6H4— | *—CH2—CH(C(=O)NH—)—* |
| C-61 | H | H | Ph | —C6H4—O—CH2—C6H4— | *—CH2—C(CH3)(C(=O)NH—)—* |

-continued

| Cpd. | R¹³ | R¹³' | R⁹ | Sp | PG' |
|---|---|---|---|---|---|
| C-62 | H | H | -C₆H₄-n-C₈H₁₇ | -C₆H₄- | -C(CH₃)(*)-CH₂(*)-C(=O)-NH- |
| C-63 | H | H | -C₆H₄-n-C₈H₁₇ | -C₆H₄-O-CH₂-C₆H₄- | -C(CH₃)(*)-CH₂(*)-C(=O)-NH- |
| C-64 | n-C₈H₁₅ | n-C₈H₁₅ | Ph | -C₆H₄- | -C(CH₃)(*)-CH₂(*)-C(=O)-NH- |
| C-65 | n-C₈H₁₅ | n-C₈H₁₅ | Ph | -C₆H₄-O-CH₂-C₆H₄- | -C(CH₃)(*)-CH₂(*)-C(=O)-NH- |
| C-66 | Br | Br | -C₆H₄-n-C₈H₁₇ | -C₆H₄-O-CH₂-C₆H₄- | -C(CH₃)(*)-CH₂(*)-C(=O)-NH- |
| C-67 | H | H | Ph | -C₆H₄-O-CH₂-C₆H₄- | -C(CH₃)(*)-CH₂(*)-C(=O)-NH- |
| C-68 | H | H | -C₆H₄-n-C₈H₁₇ | -C₆H₄- | -C(CH₃)(*)-CH₂(*)-C(=O)-NH- |
| C-69 | H | H | -C₆H₄-n-C₈H₁₇ | -C₆H₄-O-CH₂-C₆H₄- | -C(CH₃)(*)-CH₂(*)-C(=O)-NH- |
| C-70 | n-C₈H₁₅ | n-C₈H₁₅ | Ph | -C₆H₄- | -C(CH₃)(*)-CH₂(*)-C(=O)-NH- |
| C-71 | n-C₈H₁₅ | n-C₈H₁₅ | Ph | -C₆H₄-O-CH₂-C₆H₄- | -C(CH₃)(*)-CH₂(*)-C(=O)-NH- |

-continued
| Cpd. | R¹³ | R¹³' | R⁹ | Sp | PG' |
|---|---|---|---|---|---|
| C-72 | Br | Br | 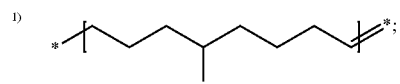 |  | 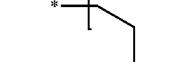 |
| C-73 | H | H | Ph |  |  |
| C-74 | H | H | 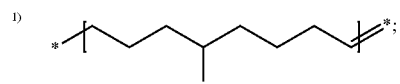 |  | 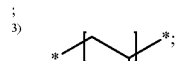 |
| C-75 | H | H | 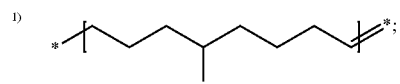 |  | 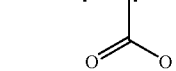 |
| C-76 | n-C₈H₁₅ | n-C₈H₁₅ | Ph |  |  |
| C-77 | n-C₈H₁₅ | n-C₈H₁₅ | Ph |  |  |
| C-78 | Br | Br | 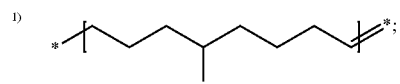 |  |  |
1) 
2) 
3)

a homopolymer of formula

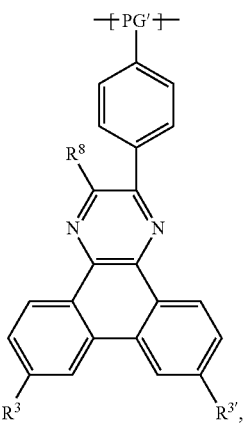

wherein

| Cpd. | PG' | R³ | R³' | R⁸ |
|---|---|---|---|---|
| D-1 | *–CH₂–CH–* (dashed bond) | H | H | Ph |
| D-2 | *–CH₂–CH–* | H | H | –C₆H₄–n-C₇H₁₅ |
| D-3 | *–CH₂–CH–* | Br | Br | n-C₈H₁₇ |
| D-4 | *–CH₂–CH–* | Br | Br | –C₆H₄–n-C₇H₁₅ |
| D-5 | *–CH₂–C(CH₃)–C(=O)O–* | H | H | Ph |
| D-6 | *–CH₂–C(CH₃)–C(=O)O–* | H | H | –C₆H₄–n-C₇H₁₅ |
| D-7 | *–CH₂–C(CH₃)–C(=O)O–* | Br | Br | n-C₈H₁₇ |
| D-8 | *–CH₂–C(CH₃)–C(=O)O–* | Br | Br | –C₆H₄–n-C₇H₁₅ |

-continued

| Cpd. | PG' | R³ | R³' | R⁸ |
|---|---|---|---|---|
| D-9 | *–CH₂–CH–C(=O)O–* | H | H | Ph |
| D-10 | *–CH₂–CH–C(=O)O–* | H | H | –C₆H₄–n-C₇H₁₅ |
| D-11 | *–CH₂–CH–C(=O)O–* | Br | Br | n-C₈H₁₇ |
| D-12 | *–CH₂–CH–C(=O)O–* | Br | Br | –C₆H₄–n-C₇H₁₅ |
| D-13 | *–O–CH–CH₂–O–* | H | H | Ph |
| D-14 | *–O–CH–CH₂–O–* | H | H | –C₆H₄–n-C₇H₁₅ |
| D-15 | *–O–CH–CH₂–O–* | Br | Br | n-C₈H₁₇ |
| D-16 | *–O–CH–CH₂–O–* | Br | Br | –C₆H₄–n-C₇H₁₅ |
| D-17 | cyclopentane-C(=O)O– | H | H | Ph |
| D-18 | cyclopentane-C(=O)O– | H | H | –C₆H₄–n-C₇H₁₅ |
| D-19 | cyclopentane-C(=O)O– | Br | Br | n-C₈H₁₇ |

| Cpd. | PG' | R³ | R³' | R⁸ |
|---|---|---|---|---|
| D-20 | cyclopentane with CO₂Me | Br | Br | -C₆H₄-n-C₇H₁₅ |
| D-21 [1] | | H | H | Ph |
| D-22 [1] | | H | H | -C₆H₄-n-C₇H₁₅ |
| D-23 [1] | | Br | Br | n-C₈H₁₇ |
| D-24 [1] | | Br | Br | -C₆H₄-n-C₇H₁₅ |
| D-25 [2] | | H | H | Ph |
| D-26 [2] | | H | H | -C₆H₄-n-C₇H₁₅ |
| D-27 [2] | | Br | Br | n-C₈H₁₇ |
| D-28 [2] | | Br | Br | -C₆H₄-n-C₇H₁₅ |
| D-29 | thiophene-CO₂- | H | H | Ph |
| D-30 | thiophene-CO₂- | H | H | -C₆H₄-n-C₇H₁₅ |
| D-31 | thiophene-CO₂- | Br | Br | n-C₈H₁₇ |
| D-32 | thiophene-CO₂- | Br | Br | -C₆H₄-n-C₇H₁₅ |
| D-33 | -CH=C(CH₃)- | H | H | Ph |
| D-34 | -CH=C(CH₃)- | H | H | -C₆H₄-n-C₇H₁₅ |
| D-35 | -CH=C(CH₃)- | Br | Br | n-C₈H₁₇ |
| D-36 | -CH=C(CH₃)- | Br | Br | -C₆H₄-n-C₇H₁₅ |
| D-37 | -CH(CONHR)-CH₂- | H | H | Ph |
| D-38 | -CH(CONHR)-CH₂- | H | H | -C₆H₄-n-C₇H₁₅ |
| D-39 | -CH(CONHR)-CH₂- | Br | Br | n-C₈H₁₇ |
| D-40 | -CH(CONHR)-CH₂- | Br | Br | -C₆H₄-n-C₇H₁₅ |
| D-41 | -C(CH₃)(CONHR)-CH₂- | H | H | Ph |
| D-42 | -C(CH₃)(CONHR)-CH₂- | H | H | -C₆H₄-n-C₇H₁₅ |
| D-43 | -C(CH₃)(CONHR)-CH₂- | Br | Br | n-C₈H₁₇ |
| D-44 | -C(CH₃)(CONHR)-CH₂- | Br | Br | -C₆H₄-n-C₇H₁₅ |
| D-45 | -C(CH₃)(CONHR)-CH₂- | H | H | Ph |

-continued
| Cpd. | PG' | R³ | R³' | R⁸ |
|---|---|---|---|---|
| D-46 | 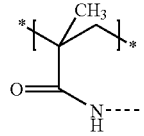 | H | H | 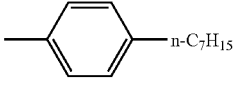 |
| D-47 | 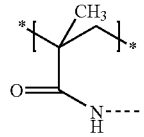 | Br | Br | n-C₈H₁₇ |
| D-48 | 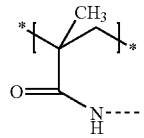 | Br | Br | 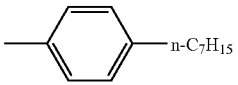 |
| D-49 | 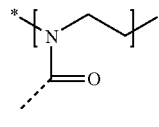 | H | H | Ph |
| D-50 | 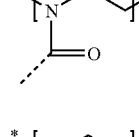 | H | H | 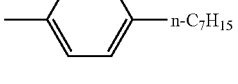 |
| D-51 | 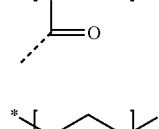 | Br | Br | n-C₈H₁₇ |
| D-52 | 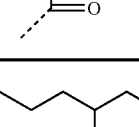 | Br | Br | 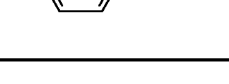 |
1) 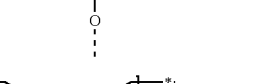
2) 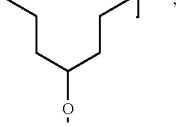
3) 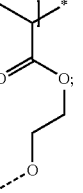
a homopolymer of formula
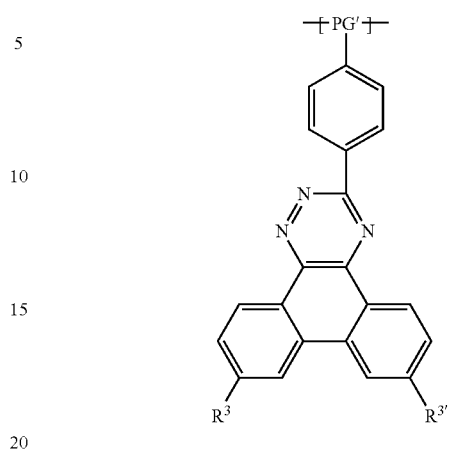
wherein
| Cpd. | PG' | R³ | R³' |
|---|---|---|---|
| E-1 |  | H | H |
| E-2 |  | H | H |
| E-3 |  | | |
| E-4 |  | | |
| E-5 | 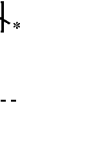 | H | H |
| E-6 |  | H | H |
| E-7 | 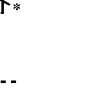 | | |
| E-8 | 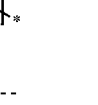 | | |

-continued

| Cpd. | PG' | R³ | R³' |
|---|---|---|---|
| E-9 | (structure) | H | H |
| E-10 | (structure) | H | H |
| E-11 | (structure) | H | H |
| E-12 | (structure) | H | H |
| E-13 | (structure) | H | H |
| E-14 | (structure) | H | H |
| E-15 | (structure) | H | H |
| E-16 | (structure) | H | H |
| E-17 | (structure) | H | H |
| E-18 | (structure) | H | H |
| E-19 | (structure) | H | H |

-continued

| Cpd. | PG' | R³ | R³' |
|---|---|---|---|
| E-20 | (structure) | | |
| E-21 | 1) | H | H |
| E-22 | 1) | H | H |
| E-23 | 1) | | |
| E-24 | 1) | | |
| E-25 | 2) | H | H |
| E-26 | 2) | H | H |
| E-27 | 2) | | |
| E-28 | 2) | | |
| E-29 | (structure) | H | H |
| E-30 | (structure) | H | H |
| E-31 | (structure) | | |
| E-32 | (structure) | | |
| E-33 | (structure) | H | H |
| E-34 | (structure) | H | H |
| E-35 | (structure) | | |
| E-36 | (structure) | | |
| E-37 | (structure) | H | H |

-continued

| Cpd. | PG' | R³ | R³' |
|---|---|---|---|
| E-38 | *−CH(C(O)NH−)−CH₂−* | H | H |
| E-39 | *−CH(C(O)NH−)−CH₂−* | | |
| E-40 | *−CH(C(O)NH−)−CH₂−* | | |
| E-41 | *−C(CH₃)(C(O)NH−)−CH₂−* | H | H |
| E-42 | *−C(CH₃)(C(O)NH−)−CH₂−* | H | H |
| E-43 | *−C(CH₃)(C(O)NH−)−CH₂−* | | |
| E-44 | *−C(CH₃)(C(O)NH−)−CH₂−* | | |
| E-45 | *−C(CH₃)(C(O)NH−)−CH₂−* | H | H |
| E-46 | *−C(CH₃)(C(O)NH−)−CH₂−* | H | H |
| E-47 | *−C(CH₃)(C(O)NH−)−CH₂−* | | |

-continued

| Cpd. | PG' | R³ | R³' |
|---|---|---|---|
| E-48 | *−C(CH₃)(C(O)NH−)−CH₂−* | | |
| E-49 | *−CH₂−N(C(O)−)−CH₂−CH₂−* | H | H |
| E-50 | *−CH₂−N(C(O)−)−CH₂−CH₂−* | H | H |
| E-51 | *−CH₂−N(C(O)−)−CH₂−CH₂−* | | |
| E-52 | *−CH₂−N(C(O)−)−CH₂−CH₂−* | | |

1) *−CH₂CH₂CH₂−CH(O−)−CH₂CH₂CH₂−*;

2) *−CH₂−CH(CH₂CH₂CH(O−)−)−*;

3) *−CH₂−CH(C(O)O−CH₂CH₂−O−)−*.

a homopolymer of formula

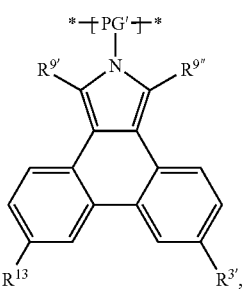

wherein

| Cpd. | PG' | $R^{13}$ | $R^{13'}$ | $R^{9'}$ | $R^{9''}$ |
|---|---|---|---|---|---|
| F-1 | *—CH(CH₃)—CH₂—* | H | H | H | H |
| F-2 | *—CH(CH₃)—CH₂—* | H | H | phenyl | phenyl |
| F-3 | *—CH(CH₃)—CH₂—* | H | H | —C(=O)—O—Et | —C(=O)—O—Et |
| F-4 | *—CH(CH₃)—CH₂—* | H | H | —C(=O)—O—Et | —C(=O)—O—Et |
| F-5 | *—CH(CH₃)—CH₂—* | H | H | CN | CN |
| F-6 | *—CH(CH₃)—CH₂—* | H | H | 2-(2-hexyldecyloxy)phenyl | 2-(2-hexyldecyloxy)phenyl |
| F-7 | *—CH(CH₃)—CH₂—* | H | H | 4-(O-nC₁₆H₃₃)phenyl | 4-(O-nC₁₆H₃₃)phenyl |

-continued
| Cpd. | PG' | $R^{13}$ | $R^{13'}$ | $R^{9''}$ | $R^{9'''}$ |
|---|---|---|---|---|---|
| F-8 | | H | H | | |
| F-9 | | H | H | | |
| F-10 | | H | H | | |
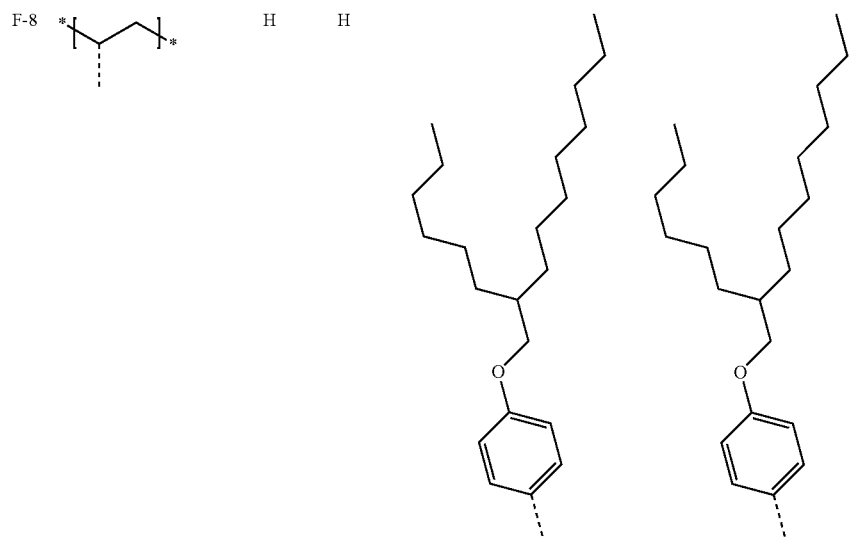
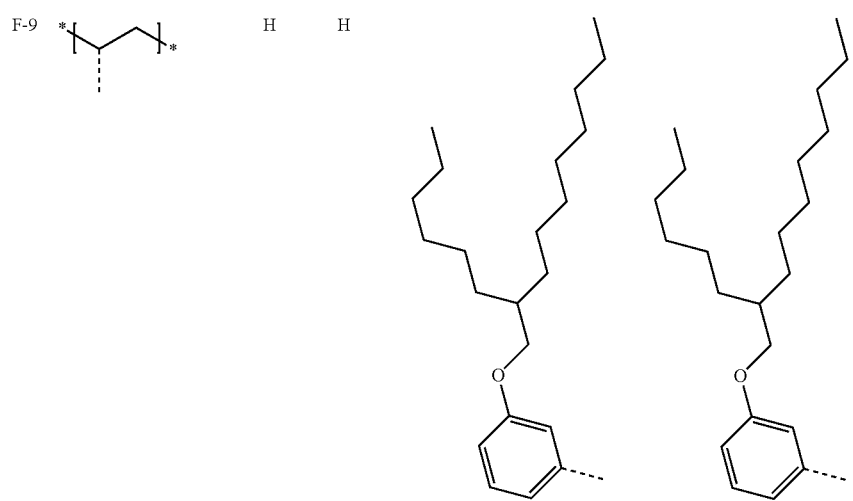
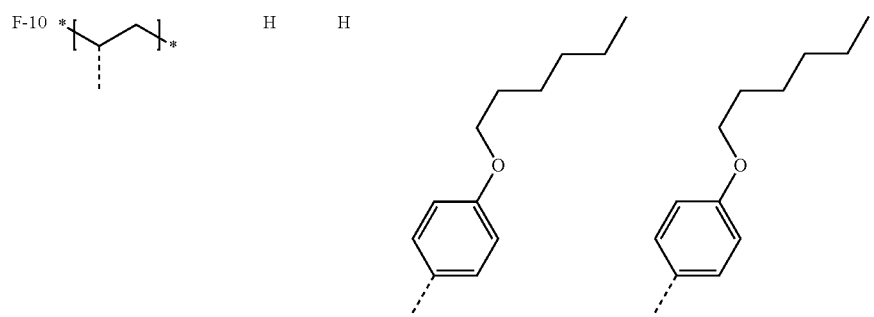

-continued

| Cpd. | PG' | R¹³ | R¹³' | R⁹' | R⁹'' |
|---|---|---|---|---|---|
| F-11 | (CH-CH₂) | H | H | 4-(3,7-dimethyloctyl)phenyl | 4-(3,7-dimethyloctyl)phenyl |
| F-12 | (CH-CH₂) | H | H | 4-tert-butylphenyl | 4-tert-butylphenyl |
| F-13 | (CH-CH₂) | H | H | 4-hexyloxyphenyl | 4-hexyloxyphenyl |
| F-14 | (CH-CH₂) | H | H | naphthalen-2-yl | naphthalen-2-yl |
| F-15 | (CH-CH₂) | H | H | naphthalen-1-yl | naphthalen-1-yl |
| F-16 | (CH-CH₂) | H | H | 4-(2-ethylhexyloxy)phenyl | 4-(2-ethylhexyloxy)phenyl |

-continued
| Cpd. | PG' | R¹³ | R¹³' | R⁹' | R⁹'' |
|---|---|---|---|---|---|
| F-17 | 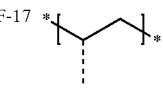 | H | H | 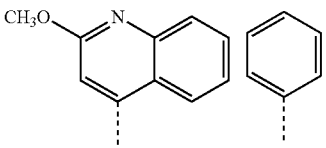 2-methoxyquinolin-4-yl |  phenyl |
| F-18 | 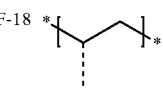 | H | H | tBu | 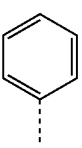 phenyl |
| F-19 | 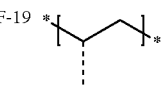 | H | H | 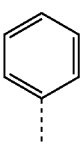 phenyl | 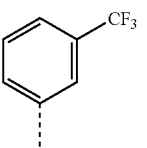 3-CF₃-phenyl |
| F-20 | 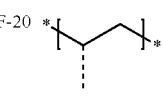 | H | H | 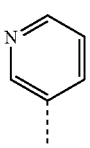 pyridin-3-yl | tBu |
| F-21 | 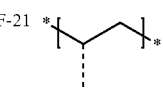 | H | H | 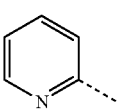 pyridin-2-yl | 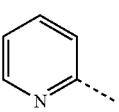 pyridin-2-yl |
| F-22 | 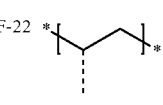 | H | H | 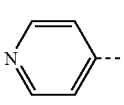 pyridin-4-yl | 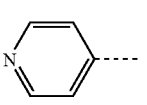 pyridin-4-yl |
| F-23 | 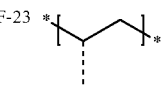 | H | H | 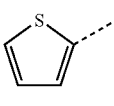 thien-2-yl | 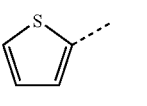 thien-2-yl |
| F-24 | 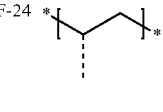 | H | H | 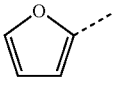 furan-2-yl | 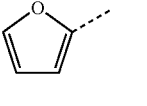 furan-2-yl |
| F-25 | 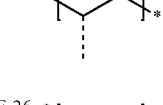 | N(Ph)₂ | N(Ph)₂ | 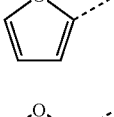 furan-2-yl | 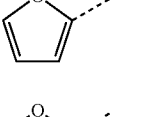 furan-2-yl |
| F-26 | 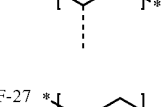 | C₈H₁₇ | C₈H₁₇ | 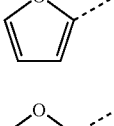 furan-2-yl | 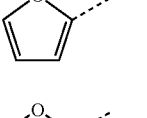 furan-2-yl |
| F-27 | 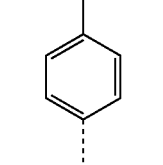 | C₈H₁₇ | C₈H₁₇ | 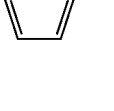 furan-2-yl | 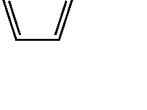 furan-2-yl |

-continued
| Cpd. | PG' | R¹³ | R¹³' | R⁹' | R⁹'' |
|---|---|---|---|---|---|
| F-28 | 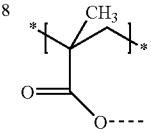 | C₈H₁₇ | C₈H₁₇ | 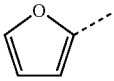 | 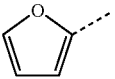 |
| F-29 | 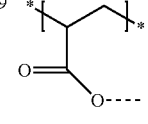 | C₈H₁₇ | C₈H₁₇ | 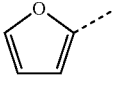 | 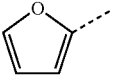 |
| F-30 | 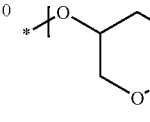 | C₈H₁₇ | C₈H₁₇ | 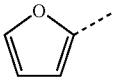 | 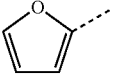 |
| F-31 | 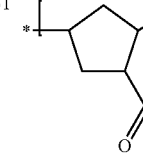 | C₈H₁₇ | C₈H₁₇ | 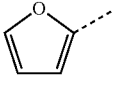 | 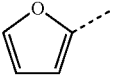 |
| F-32 | 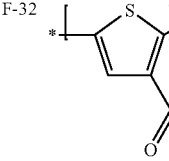 | C₈H₁₇ | C₈H₁₇ | 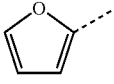 | 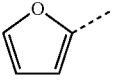 |
| F-33 | 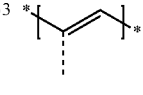 | C₈H₁₇ | C₈H₁₇ | 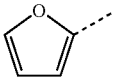 | 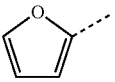 |
| F-34 | 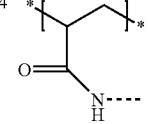 | C₈H₁₇ | C₈H₁₇ | 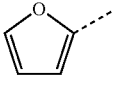 | 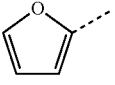 |
| F-35 | 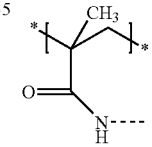 | C₈H₁₇ | C₈H₁₇ | 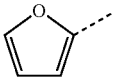 | 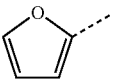 |
| F-36 | 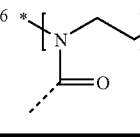 | C₈H₁₇ | C₈H₁₇ | 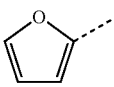 | 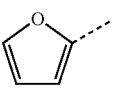 | a homopolymer of formula
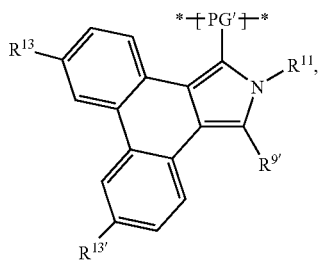
5
10
wherein
| Cpd. | PG' | $R^{13}$ | $R^{13'}$ | $R^{11}$ | $R^{9'}$ |
|---|---|---|---|---|---|
| G-1 | —CH₂—CH— | H | H | H | H |
| G-2 | —CH₂—CH— | H | H | —C₆H₅ | H |
| G-3 | —CH₂—CH— | H | H | —C₆H₅ | —C(O)OEt |
| G-4 | —CH₂—CH— | H | H | —C₆H₅ | CN |
| G-5 | —CH₂—CH— | H | H | n-C₈H₁₇ | CN |
| G-6 | —CH₂—CH— | H | H | n-C₈H₁₇ | —C(O)OEt |
| G-7 | —CH₂—CH— | H | H | —C₆H₄—O-nC₁₆H₃₃ | —C₆H₄—O-nC₁₆H₃₃ |

-continued
| Cpd. | PG' | R¹³ | R¹³' | R¹¹ | R⁹' |
|---|---|---|---|---|---|
| G-8 | 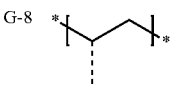 | H | H | 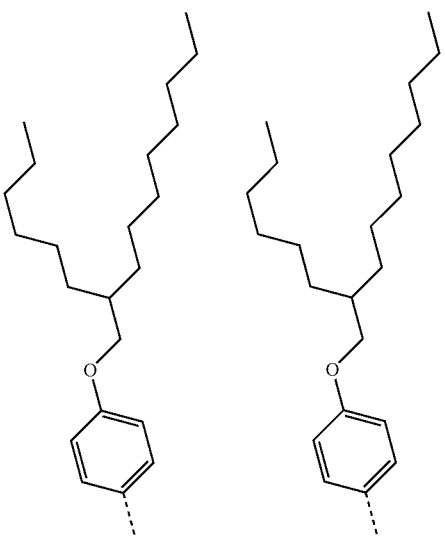 | 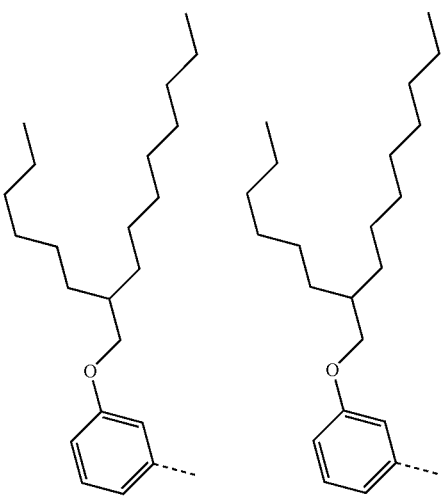 |
| G-9 | 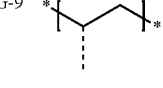 | H | H | 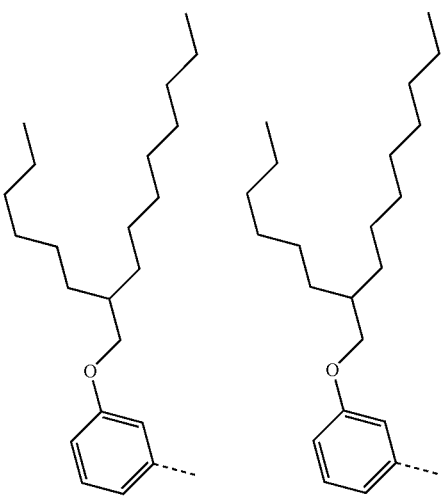 | 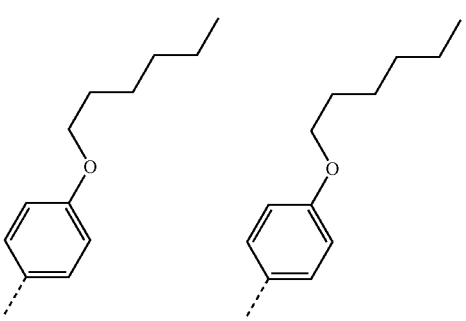 |
| G-10 | 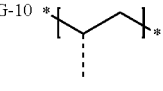 | H | H | 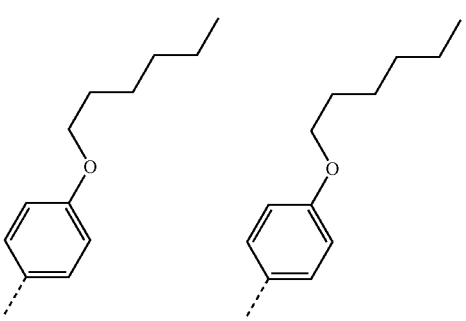 | 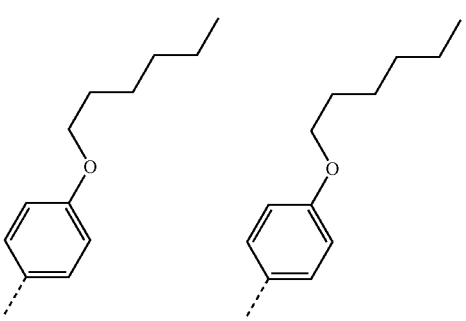 |

-continued
| Cpd. | PG' | R13 | R13' | R11 | R9' |
|---|---|---|---|---|---|
| G-11 | 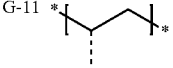 | H | H | 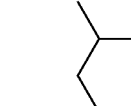 | 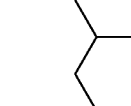 |
| G-12 | 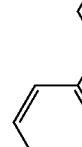 | H | H | 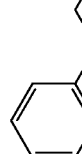 | 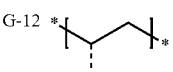 |
| G-13 | 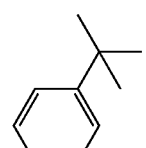 | H | H | 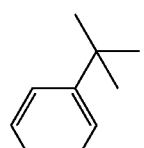 | 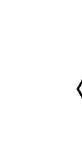 |
| G-14 | 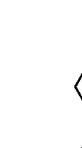 | H | H | 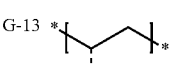 | 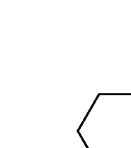 |
| G-15 | 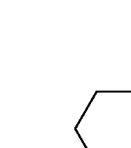 | H | H |  |  |
| G-16 | 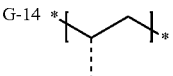 | H | H | 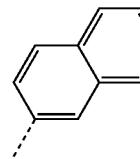 | 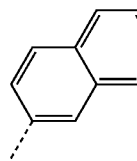 |

-continued
| Cpd. | PG' | R¹³ | R¹³' | R¹¹ | R⁹' |
|---|---|---|---|---|---|
| G-17 | 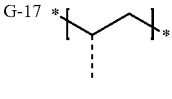 | H | H | 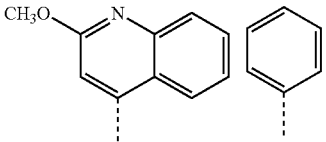 2-methoxyquinolin-4-yl | 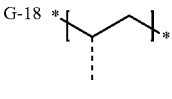 phenyl |
| G-18 | 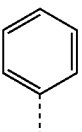 | H | H | tBu | 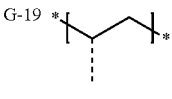 phenyl |
| G-19 | 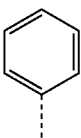 | H | H | 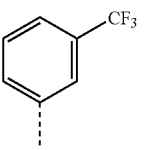 phenyl | 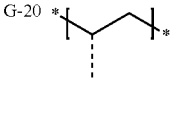 3-CF₃-phenyl |
| G-20 | 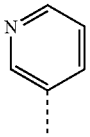 | H | H | 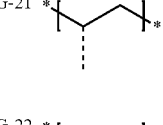 pyridin-3-yl | tBu |
| G-21 | 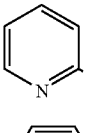 | H | H | 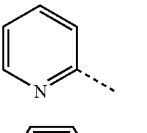 pyridin-2-yl | 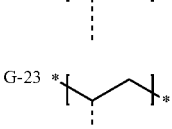 pyridin-2-yl |
| G-22 | 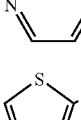 | H | H | 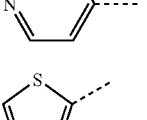 pyridin-4-yl | 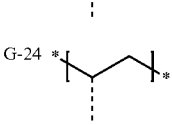 pyridin-4-yl |
| G-23 | 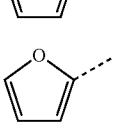 | H | H | 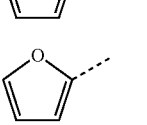 thien-2-yl | 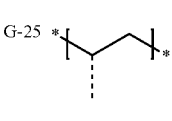 thien-2-yl |
| G-24 |  | H | H | 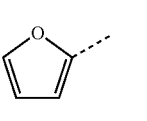 furan-2-yl | 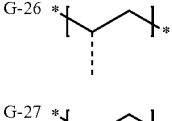 furan-2-yl |
| G-25 | 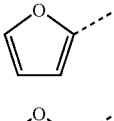 | N(Ph)₂ | N(Ph)₂ | 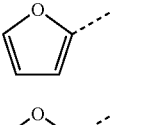 | 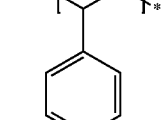 |
| G-26 |  | C₈H₁₇ | C₈H₁₇ | 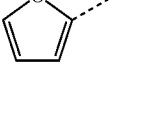 | 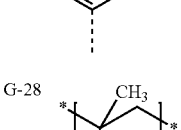 |
| G-27 | 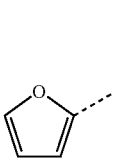 | C₈H₁₇ | C₈H₁₇ | 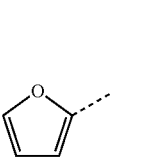 | 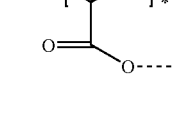 |
| G-28 |  | C₈H₁₇ | C₈H₁₇ |  | |

-continued
| Cpd. | PG' | R¹³ | R¹³' | R¹¹ | R⁹' |
|---|---|---|---|---|---|
| G-29 | 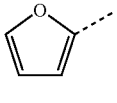 | $C_8H_{17}$ | $C_8H_{17}$ | 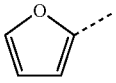 | 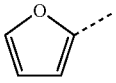 |
| G-30 | 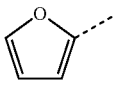 | $C_8H_{17}$ | $C_8H_{17}$ | 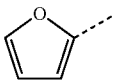 | 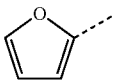 |
| G-31 | 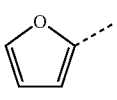 | $C_8H_{17}$ | $C_8H_{17}$ | 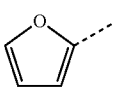 | 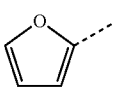 |
| G-32 | 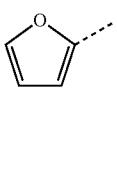 | $C_8H_{17}$ | $C_8H_{17}$ | 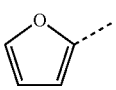 | 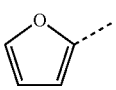 |
| G-33 | 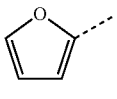 | $C_8H_{17}$ | $C_8H_{17}$ | 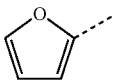 | 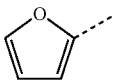 |
| G-34 | 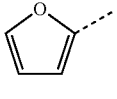 | $C_8H_{17}$ | $C_8H_{17}$ |  |  |
| G-35 | 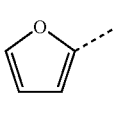 | $C_8H_{17}$ | $C_8H_{17}$ | 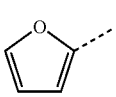 | 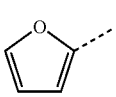 |
| G-36 | 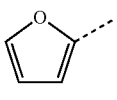 | $C_8H_{17}$ | $C_8H_{17}$ | 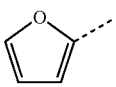 | 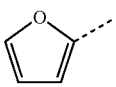 |
| G-37 | 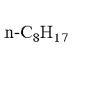 | H | H | n-$C_8H_{17}$ | H |
a homopolymer of formula
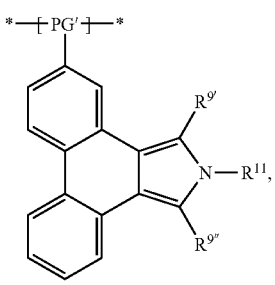

wherein

| Cpd. | PG' | $R^{11}$ | $R^{9'}$ | $R^{9''}$ |
|---|---|---|---|---|
| H-1 | *―CH(CH₃)―CH₂―* | H | H | H |
| H-2 | *―CH(CH₃)―CH₂―* | H | ―C₆H₅ | ―C₆H₅ |
| H-3 | *―CH(CH₃)―CH₂―* | H | ―C(=O)OEt | ―C(=O)OEt |
| H-4 | *―CH(CH₃)―CH₂―* | H | ―C(=O)OEt | ―C(=O)OEt |
| H-5 | *―CH(CH₃)―CH₂―* | H | CN | CN |
| H-6 | *―CH(CH₃)―CH₂―* | H | 2-(2-hexyldecyloxy)phenyl | 2-(2-hexyldecyloxy)phenyl |
| H-7 | *―CH(CH₃)―CH₂―* | H | 4-(n-C₁₆H₃₃O)phenyl | 4-(n-C₁₆H₃₃O)phenyl |

-continued
| Cpd. | PG' | $R^{11}$ | $R^{9'}$ | $R^{9''}$ |
|---|---|---|---|---|
| H-8 | 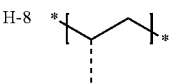 | H | 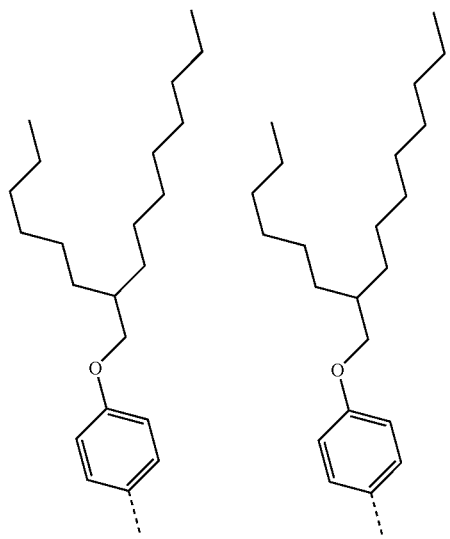 | 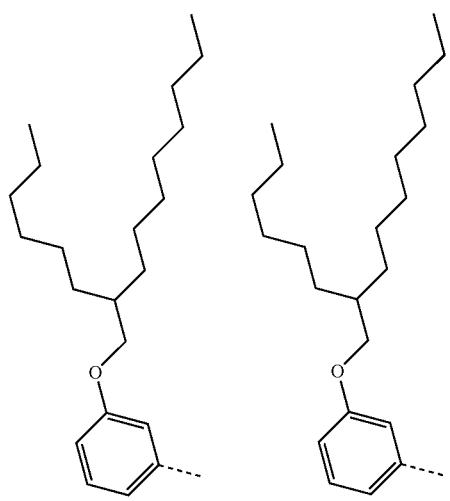 |
| H-9 | 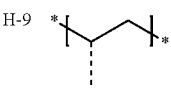 | H | 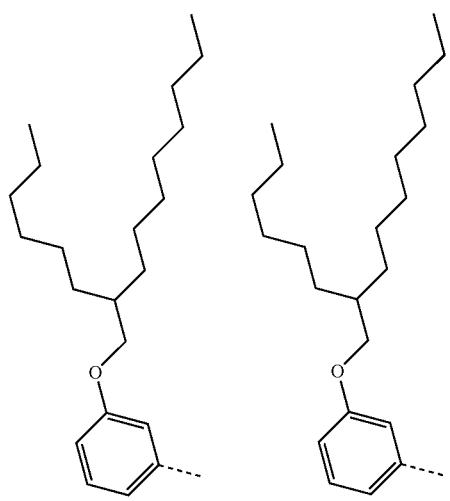 | 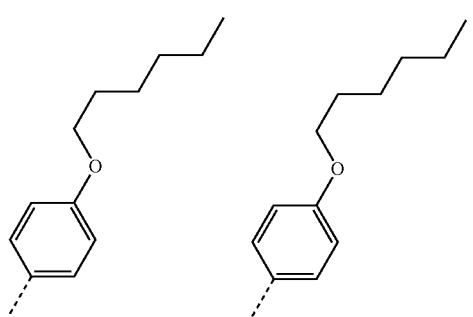 |
| H-10 | 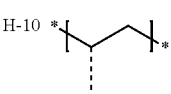 | H | 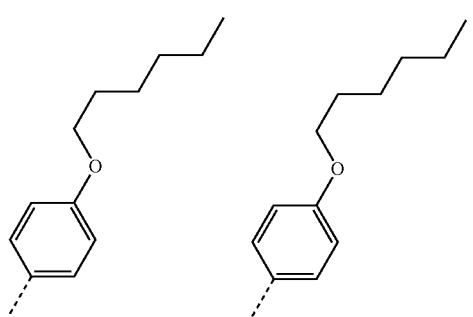 | 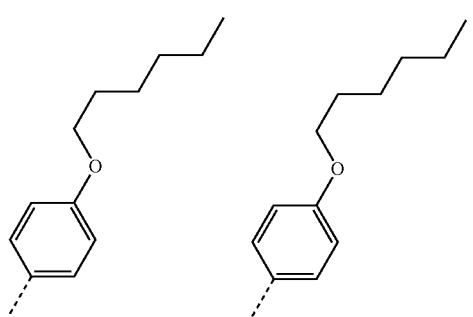 |

-continued

| Cpd. | PG' | $R^{11}$ | $R^{9'}$ | $R^{9''}$ |
|---|---|---|---|---|
| H-11 | *—CH(—)—CH₂—* | H | isoprenyl-type chain with p-phenyl | isoprenyl-type chain with p-phenyl |
| H-12 | *—CH(—)—CH₂—* | H | 4-tert-butylphenyl | 4-tert-butylphenyl |
| H-13 | *—CH(—)—CH₂—* | H | 4-(hexyloxy)phenyl | 4-(hexyloxy)phenyl |
| H-14 | *—CH(—)—CH₂—* | H | 2-naphthyl | 2-naphthyl |
| H-15 | *—CH(—)—CH₂—* | H | 1-naphthyl | 1-naphthyl |
| H-16 | *—CH(—)—CH₂—* | H | 4-(2-ethylhexyloxy)phenyl | 4-(2-ethylhexyloxy)phenyl |

-continued

| Cpd. | PG' | $R^{11}$ | $R^{9'}$ | $R^{9''}$ |
|---|---|---|---|---|
| H-17 | *⌒* | H | 2-methoxyquinolin-4-yl | phenyl |
| H-18 | *⌒* | H | tBu | phenyl |
| H-19 | *⌒* | H | phenyl | 3-(trifluoromethyl)phenyl |
| H-20 | *⌒* | H | pyridin-3-yl | tBu |
| H-21 | *⌒* | H | pyridin-2-yl | pyridin-2-yl |
| H-22 | *⌒* | H | pyridin-4-yl | pyridin-4-yl |
| H-23 | *⌒* | H | thiophen-2-yl | thiophen-2-yl |
| H-24 | *⌒* | —CH$_3$ | thiophen-2-yl | thiophen-2-yl |
| H-25 | *⌒* | -nC$_8$H$_{17}$ | thiophen-2-yl | thiophen-2-yl |
| H-26 | *⌒* | phenyl | thiophen-2-yl | thiophen-2-yl |
| H-27 | *⌒* | naphthalen-2-yl | thiophen-2-yl | thiophen-2-yl |
| H-28 | *⌒* | naphthalen-1-yl | thiophen-2-yl | thiophen-2-yl |

-continued
| Cpd. | PG' | R11 | R9' | R9" |
|---|---|---|---|---|
| H-29 | 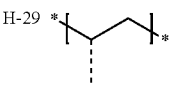 |  |  |  |
| H-30 | 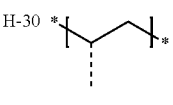 |  |  |  |
| H-31 | 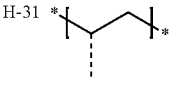 |  |  |  |
| H-32 |  |  |  |  |
| H-33 | 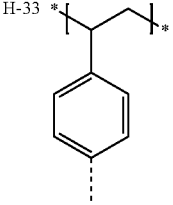 |  |  |  |
| H-34 | 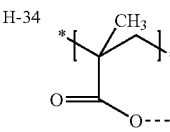 |  |  |  |
| H-35 | 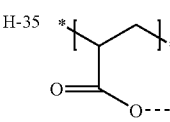 |  |  |  |
| H-36 | 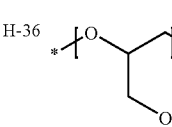 |  |  |  |
| H-37 | 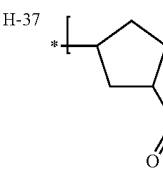 |  |  |  |
| H-38 | 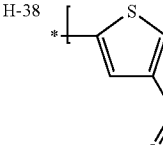 |  |  |  |
| H-39 | 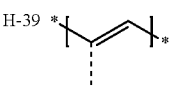 |  |  |  |

-continued
| Cpd. | PG' | R¹¹ | R⁹' | R⁹'' |
|---|---|---|---|---|
| H-40 | *−CH₂−CH(C(=O)NH−)−* | thiophen-2-yl | thiophen-2-yl | thiophen-2-yl |
| H-41 | *−CH₂−C(CH₃)(C(=O)NH−)−* | thiophen-2-yl | thiophen-2-yl | thiophen-2-yl |
| H-42 | *−N(C(=O)−)−CH₂−CH₂−* | thiophen-2-yl | thiophen-2-yl | thiophen-2-yl |
a homopolymer of formula
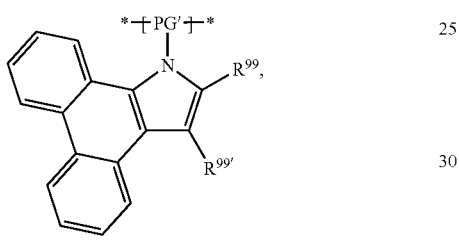
wherein
| Cpd. | PG' | R⁹⁹ | R⁹⁹' |
|---|---|---|---|
| I-1 | *−CH₂−CH(−)−* | | 2,2'-biphenyl |
| I-2 | *−CH₂−CH(−)−* | phenyl | phenyl |
| I-3 | *−CH₂−CH(−)−* | | o-xylylene |
| I-4 | *−CH₂−CH(−)−* | | cyclohexadienylmethyl |

-continued
| Cpd. | PG' | R⁹⁹ | R⁹⁹' |
|---|---|---|---|
| I-5 | ![structure] | ![structure] | |
| I-6 | ![structure] | ![phenyl] | ![phenyl] |
| I-7 | ![structure] | ![phenyl] | ![phenyl] |
| I-8 | ![structure] | ![phenyl] | ![phenyl] |
a homopolymer of formula
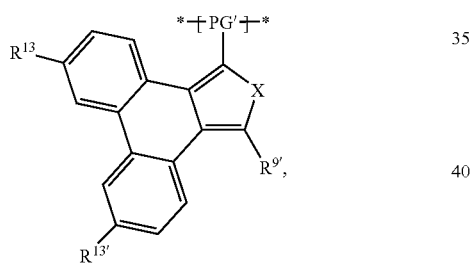
wherein
| Cpd. | X | PG' | R¹³ | R¹³' | R⁹ |
|---|---|---|---|---|---|
| J-1 | S | ![structure] | H | H | H |
| J-2 | SO₂ | ![structure] | H | H | H |
| J-3 | O | ![structure] | H | H | H |
| J-4 | O | ![structure] | H | H | ![CO₂Et] |

-continued
| Cpd. | X | PG' | R¹³ | R¹³' | R⁹ |
|---|---|---|---|---|---|
| J-5 | O | 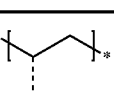 | H | H | CN |
| J-6 | O | 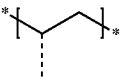 | H | H | 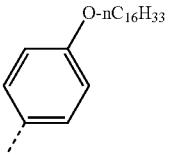 |
| J-7 | O | 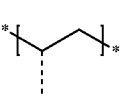 | H | H | 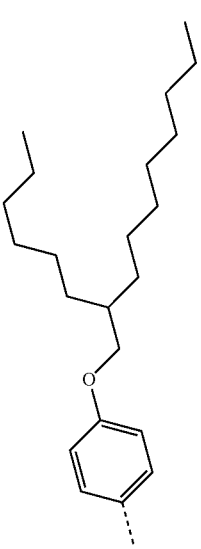 |
| J-8 | O | 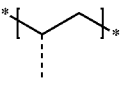 | H | H | 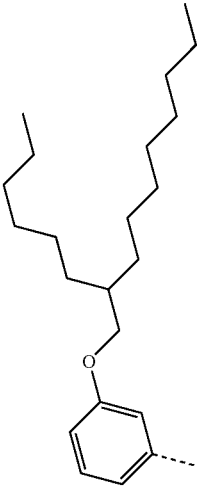 |
| J-9 | O | 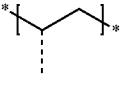 | H | H | 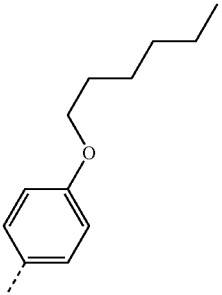 |

-continued
| Cpd. | X | PG' | R13 | R13' | R9 |
|---|---|---|---|---|---|
| J-10 | O | 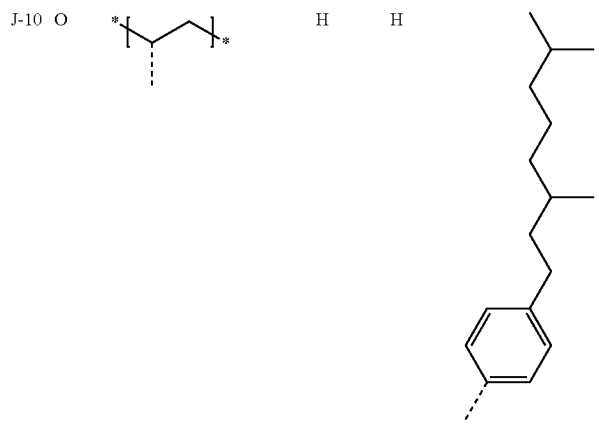 | H | H | |
| J-11 | O | | H | H | 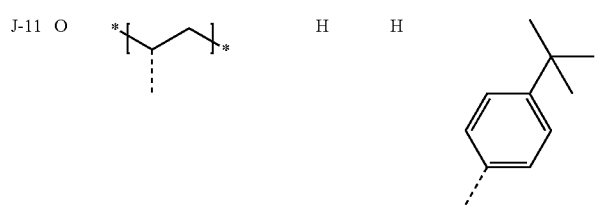 |
| J-12 | O | | H | H | 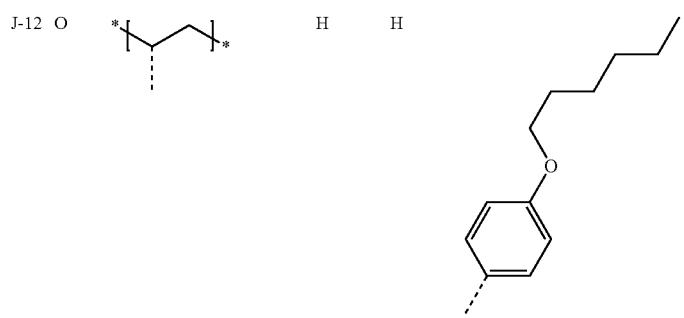 |
| J-13 | O | | H | H | 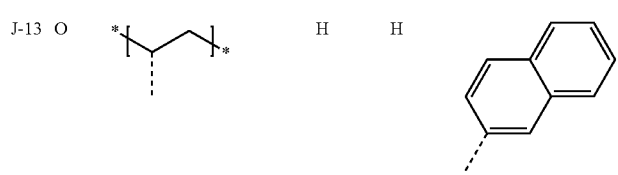 |
| J-14 | O | | H | H | 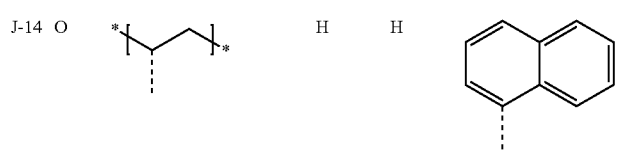 |

-continued
| Cpd. | X | PG' | R¹³ | R¹³' | R⁹ |
|---|---|---|---|---|---|
| J-15 | O | 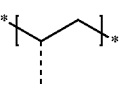 | H | H |  |
| J-16 | O | 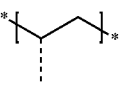 | H | H | 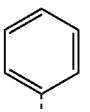 |
| J-17 | O | 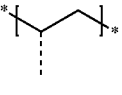 | H | H | 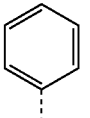 |
| J-18 | O | 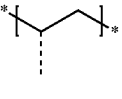 | H | H | 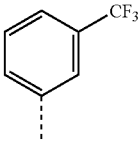 |
| J-19 | O | 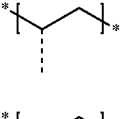 | H | H | tBu |
| J-20 | O | 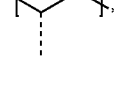 | H | H | 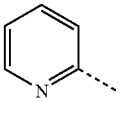 |
| J-21 | O | 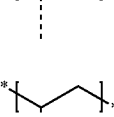 | H | H | 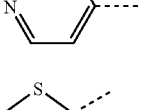 |
| J-22 | O | 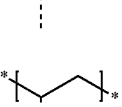 | H | H | 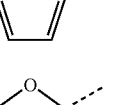 |
| J-23 | O | 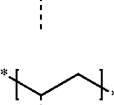 | H | H | 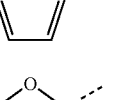 |
| J-24 | O | 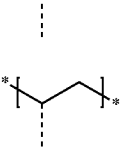 | N(Ph)₂ | N(Ph)₂ | 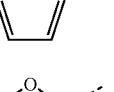 |
| J-25 | O |  | C₈H₁₇ | C₈H₁₇ | 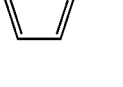 |

-continued

| Cpd. | X | PG' | R¹³ | R¹³' | R⁹ |
|---|---|---|---|---|---|
| J-26 | | *-[CH2-CH(C6H4-)]-* (styrene-like with phenyl) | $C_8H_{17}$ | $C_8H_{17}$ | 2-furyl |
| J-27 | | *-[CH2-C(CH3)(C(O)NH-Et-)]-* (methacrylamide-ethyl) | $C_8H_{17}$ | $C_8H_{17}$ | 2-furyl |
| J-28 | | *-[CH2-CH(C(O)NH-Et-)]-* (acrylamide-ethyl) | $C_8H_{17}$ | $C_8H_{17}$ | 2-furyl |
| J-29 | | cyclopentane-based with OC(O)- linker | $C_8H_{17}$ | $C_8H_{17}$ | 2-furyl |
| J-30 | | thiophene-based with OC(O)- linker | $C_8H_{17}$ | $C_8H_{17}$ | 2-furyl |
| J-31 | | *-[CH=CH]-* (vinylene) | $C_8H_{17}$ | $C_8H_{17}$ | 2-furyl | or a homopolymer of formula

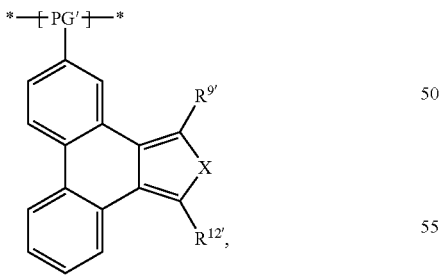

wherein

| Cpd. | PG' | X | R⁹' | R⁹" |
|---|---|---|---|---|
| K-1 | *-[CH2-CH]-* | S | H | H |

-continued

| Cpd. | PG' | X | R⁹' | R⁹'' |
|---|---|---|---|---|
| K-2 | $SO_2$ | *—CH(—)—CH₂—* | H | H |
| K-3 | *—CH(—)—CH₂—* | O | H | H |
| K-4 | *—CH(—)—CH₂—* | O | phenyl | phenyl |
| K-5 | *—CH(—)—CH₂—* | O | —C(=O)—O—Et | —C(=O)—O—Et |
| K-6 | *—CH(—)—CH₂—* | O | CN | CN |
| K-7 | *—CH(—)—CH₂—* | O | 2-(2-hexyldecyloxy)phenyl | 2-(2-hexyldecyloxy)phenyl |
| K-8 | *—CH(—)—CH₂—* | O | 4-(n-$C_{16}H_{33}$O)phenyl | 4-(n-$C_{16}H_{33}$O)phenyl |

-continued

| Cpd. | PG' | X | R⁹' | R⁹" |
|------|-----|---|-----|-----|
| K-9  | *–CH(CH₃)–CH₂–* | O | (2-hexyldecyloxy)-4-phenyl | (2-hexyldecyloxy)-4-phenyl |
| K-10 | *–CH(CH₃)–CH₂–* | O | (2-hexyldecyloxy)-3-phenyl | (2-hexyldecyloxy)-3-phenyl |
| K-11 | *–CH(CH₃)–CH₂–* | O | (heptyloxy)-4-phenyl | (heptyloxy)-4-phenyl |

-continued

| Cpd. | PG' | X | R⁹' | R⁹'' |
|---|---|---|---|---|
| K-12 | *⁓* | O | (isoprenyl-substituted phenyl group) | (isoprenyl-substituted phenyl group) |
| K-13 | *⁓* | O | 4-tert-butylphenyl | 4-tert-butylphenyl |
| K-14 | *⁓* | O | 4-hexyloxyphenyl | 4-hexyloxyphenyl |
| K-15 | *⁓* | O | naphthalen-2-yl | naphthalen-2-yl |
| K-16 | *⁓* | O | naphthalen-1-yl | naphthalen-1-yl |
| K-17 | *⁓* | O | 4-(2-ethylhexyloxy)phenyl | 4-(2-ethylhexyloxy)phenyl |

-continued
| Cpd. | PG' | X | R⁹' | R⁹'' |
|---|---|---|---|---|
| K-18 | 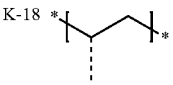 | O | 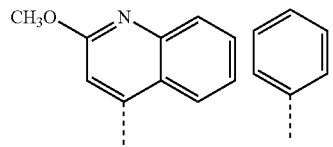 |  |
| K-19 | 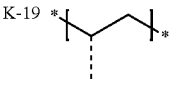 | O | tBu | 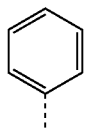 |
| K-20 | 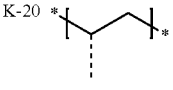 | O | 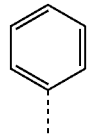 | 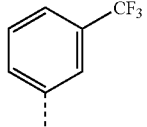 |
| K-21 | 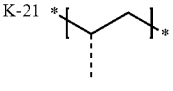 | O | 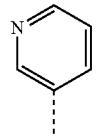 | tBu |
| K-22 | 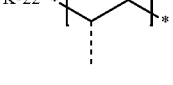 | O | 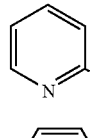 | 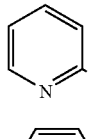 |
| K-23 | 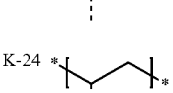 | O | 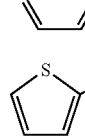 | 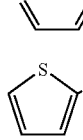 |
| K-24 | 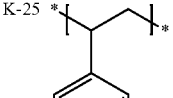 | O |  |  |
| K-25 | 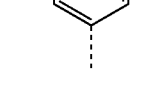 | O |  |  |
| K-26 | 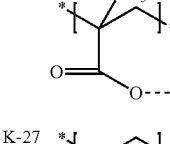 | O |  |  |
| K-27 | 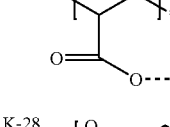 | O |  |  |
| K-28 | 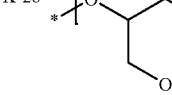 | O |  |  |

-continued

| Cpd. | PG' | X | R⁹' | R⁹" |
|---|---|---|---|---|
| K-29 | cyclopentane with vinyl and ester | O | thiophene | thiophene |
| K-30 | thiophene with ester | O | thiophene | thiophene |
| K-31 | butadiene unit | O | thiophene | thiophene |
| K-32 | acrylamide unit | O | thiophene | thiophene |
| K-33 | methacrylamide unit | O | thiophene | thiophene |
| K-34 | N-acetyl ethyleneimine | O | thiophene | thiophene |

6. The polymer according to claim 1, wherein the polymer comprises repeating units of formula

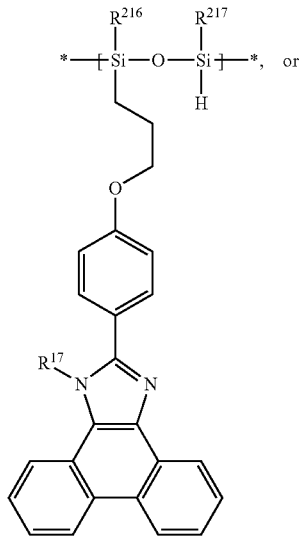

or

-continued $$*\text{-}[\underset{R^{216'}}{\overset{R^{217'}}{Si}}\text{-O-CH}_2\text{-CH-CH}_2\text{-O}]_n\text{-}*,$$

with phenyl-imidazole-phenanthrene substituent wherein
$R^{216}$ and $R^{217}$ are independently of each other $C_1$-$C_{18}$alkyl, or $C_6$-$C_8$aryl, which can optionally be substituted by one, or more $C_1$-$C_{18}$alkyl groups, and $R^{17}$ is $C_6$-$C_{18}$aryl; $C_6$-$C_{18}$aryl which is substituted by $C_1$-$C_{18}$alkyl, or $C_1$-$C_{18}$alkoxy; $C_1$-$C_{18}$alkyl; or $C_1$-$C_{18}$alkyl which is interrupted by —O—; or the polymer comprises repeating units of formula

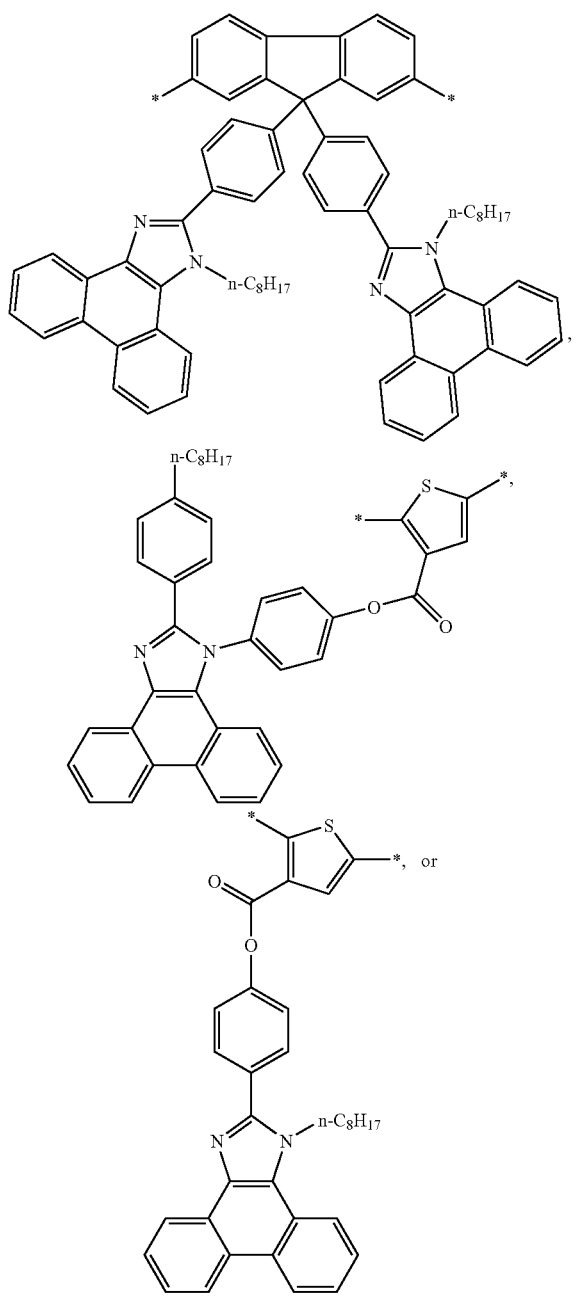

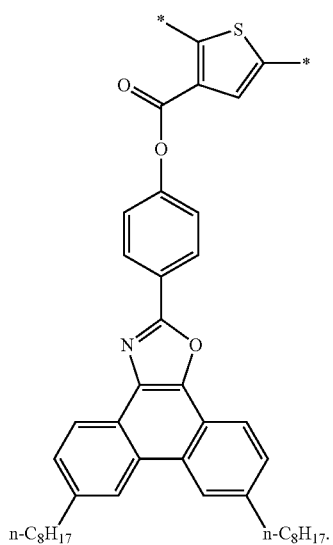

7. An electronic device or a component therefore, comprising the polymer according to claim 1.

8. The device according to claim 7 which is an organic light emitting diode.

9. OLEDs, organic integrated circuits (O-ICs), organic field effect transistors (OFETs), organic thin film transistors (OTFTs), organic solar cells (O-SCs), thermoelectric devices, or organic laser diodes comprising one or more of the polymers according to claim 1.

10. A polymer according to claim 1, wherein A is a 5-, 6-, or 7-membered heteroaromatic ring, containing at least one nitrogen atom and at least one further heteroatom selected from nitrogen, substituted nitrogen, oxygen and sulfur.

\* \* \* \* \*